United States Patent [19]

Yannone

[11] 3,924,140

[45] Dec. 2, 1975

[54] SYSTEM FOR MONITORING AND CONTROLLING INDUSTRIAL GAS TURBINE POWER PLANTS INCLUDING FACILITY FOR DYNAMIC CALIBRATION CONTROL INSTRUMENTATION

[75] Inventor: Robert A. Yannone, Aldan, Pa.

[73] Assignee: Westinghouse Electric Corporation, Pittsburgh, Pa.

[22] Filed: Mar. 14, 1972

[21] Appl. No.: 234,580

[52] U.S. Cl. ............ 290/40; 60/39.28; 235/121.21; 307/87; 340/214

[51] Int. Cl.² ............................................ H02P 9/04

[58] Field of Search ........ 73/18, 4 R; 340/214, 411; 60/39.28; 290/40, 40.2; 235/121.21; 307/85, 86, 87

[56] References Cited

UNITED STATES PATENTS

| | | | |
|---|---|---|---|
| 3,033,042 | 5/1962 | Clement et al. | 73/509 |
| 3,515,893 | 6/1970 | Park | 307/52 |
| 3,529,174 | 9/1970 | Smith | 307/43 |
| 3,564,273 | 2/1971 | Cockrell | 290/40 |
| 3,606,754 | 9/1971 | White | 60/39.28 |
| 3,616,647 | 11/1971 | Johnson | 60/39.28 |
| 3,643,437 | 2/1972 | Birnbaum | 290/40 |

OTHER PUBLICATIONS

Electrical World Mar. 4, 1963 pp. 29–32.

"Compute Starts, Runs, Stops, Little Gysps" 1963.

Instrumentation Technology 7–1968 pp. 56–60.

*Primary Examiner*—G. R. Simmons
*Attorney, Agent, or Firm*—S. A. Seinberg

[57] ABSTRACT

A gas turbine power plant having a hybrid digital computer control system is provided with an industrial gas turbine which drives a rotating brushless exciter generator coupled to a power system through a breaker. Control inputs representative of selected operating parameters are continuously available to provide highly responsive control over a broad range of gas turbine and generator operating conditions. Predictable errors are effectively eliminated by means of programmed computer operations to thereby ensure highly accurate control variable derivation essential to maintaining gas turbine operation at or near design limits while providing synchronized operation of turbine and generator.

9 Claims, 41 Drawing Figures

SYSTEM FOR MONITORING AND CONTROLLING INDUSTRIAL GAS TURBINE POWER PLANTS INCLUDING FACILITY FOR DYNAMIC CALIBRATION CONTROL INSTRUMENTATION

Detection means are also provided for monitoring the actual value of a selected turbine parameter. This detection means, in response to the occurrence of a predetemined event, generates one or more dynamic calibration signals representative of the difference between the actual values of the selected parameter and a predetermined value. The generated signals are then utilized by the plant control system to effect dynamic calibration of the means used to measure the selected parameter.

Reference is hereby made to the following related applications, all of which are assigned to the present assignee:

U.S. patent application Ser. No. 82,470, filed on Oct. 20, 1970 in the names of J. Reuther and T. Giras, entitled "System and Method For Operating Industrial Gas Turbine Apparatus and Gas Turbine Electric Power Plants Preferably With A Digital Computer Control System," now abandoned in favor of U.S. patent application Ser. No. 319,114, filed on Dec. 29, 1972 as a streamline continuation thereof;

U.S. patent application Ser. No. 82,469, filed on Oct. 20, 1970, in the names of R. Kiscaden and R. Yannone, entitled "System And Method For Accelerating And Sequencing Industrial Gas Turbine Apparatus And Gas Turbine Electric Power Plants Preferably With a Digital Computer control System," now abandoned in favor of U.S. patent application Ser. No. 252,948, filed on May 12, 1972 as a streamline continuation thereof, and U.S. pat. application Ser. No. 252,131, filed on May 10, 1972 as a divisional of the originally filed, above mentioned, U.S. patent application Ser. No. 82,469;

U.S. patent application Ser. No. 82,467, filed on Oct. 20, 1970, in the name of T. Reed, entitled "Improved System And Method For Operating Industrial Turbine Apparatus And Gas Turbine Electric Power Plants Preferably With A Digital Computer Control System;"

U.S. patent application Ser. No. 205,263 filed on Dec. 6, 1971 in the name of J. Reuther, entitled "Industrial Gas Turbine Power Plant Control System Having Capability For Effecting Automatic Fuel Transfer Under Load Preferably Employing A Digital Computer," now abandoned favor fabor of U.S. patent application Ser. No. 308,892 filed on Nov. 22, 1972 as a streamline continuation thereof;

U.S. patent application Ser. No. 99,491, filed on Dec. 18, 1970 in the name of J. Reuther, entitled "System And Method Employing A Digital Computer For Automatically Synchronizing A Gas Turbine Or Other Electric Power Plant Generator With A Power System," now abandoned in favor of U.S. patent application Ser. No. 276,508, filed on July 31, 1972 as a streamline continuation thereof;

U.S. patent application Ser. No. 99,493, filed on Dec. 18, 1970 in the name of T. Reed, entitled "System And Method Employing A Digital Computer With Improved Programmed Operation For Automatically Synchronizing a Gas Turbine Or Other Electrical Power Plant Generator With A Power System," now abandoned in favor of U.S. patent application Ser. No. 276,343, filed on July 31, 1972 as a steamline continuation thereof;

U.S. patent application Ser. No. 155,905 filed on June 23, 1971, in the names of R. Yannone and T. Reed, entitled "Improved System And Method For Monitoring And Controlling Operation Of Industrial Gas Turbine Apparatus And Gas Turbine Electric Power Plants Preferably With a Digital Computer Control System," now abandoned in favor of U.S. patent application Ser. No. 317,839, filed on Dec. 26, 1972 as a streamline continuation thereof;

U.S. patent application Ser. No. 189,632, filed on Oct. 15, 1971 in the names of R. Yannone and R. Kiscaden, entitled "Improved Digital Computer Control System And Method For Monitoring And Controlling Operation Of Industrial Gas Turbine Apparatus To Drive Simultaneously An Electric Power Plant Generator And Provide Exhaust Gases To An Industrial Process," now abandoned in favor of U.S. patent application Ser. No. 323,593, filed on Jan. 15, 1973 as a streamline continuation thereof;

U.S. patent application Ser. No. 189,633 filed on Oct. 15, 1972 in the names of J. Reuther and T. Reed, entitled "Improved Digital Computer Control System And Method For Monitoring And Controlling Operation Of Industrial Gas Turbine Apparatus Employing Expanded Parametric Control Algorithm," now abandoned in favor of U.S. patent application Ser. No. 326,718, filed on Jan. 26, 1973, as a streamline continuation thereof issued on Feb. 11, 1975 as U.S. Pat. No. 3,866,109;

U.S. patent application Ser. No. 204,944, filed on Dec. 6, 1971 in the name of G. Rankin, entitled patent "Industrial Gas Turbine Power Plant Control System And Method For Implementing Improved Dual Fuel Scheduling Algorithm Permitting Automatic Fuel Transfer Under Load," now abandoned in favor of U.S. patent application Ser. No. 332,457, filed on Feb. 14, 1973, as a streamline continuation thereof.

U.S. patent application Ser. No. 205,261, filed on Dec. 6, 1971, in the names of R. Yannone and R, Kiscaden, entitled "Improved Control System And Method For Controlling Dual Fuel Operation Of Industrial Gas Turbine Power Plants Preferably Employing A Digital Computer," now abandoned in favor of U.S. patent application Ser. No. 310,520, filed on Nov. 29, 1972 as a streamline continuation thereof, issued on Feb. 11, 1975 as U.S. Pat. No. 3,866,109; and U.S. patent application Ser. No. 234,491 filed on Mar. 14, 1972, in the names of T. Reed and R. Yannone, entitled "Improved System And Method For Monitoring Industrial Gas Turbine Operating Parameters And For Providing Gas Turbine Power Plant Control System Inputs Representative Thereof", and U.S. patent application Ser. No. 403,595, filed on Oct. 4, 1973 as a divisional application thereof.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses the gas turbine may have one or more shafts and many other rotor, casing, support, and combustion system structural features which can vary relatively widely among differently designed nits. They may be aviation jet engines adapted for industrial service as described, for example, in an ASME paper entitled "The Pratt and Whitney Aircraft Jet Powered 121MW Electrical Peaking Unit" presented at the New York Meeting in November-December, 1964.

Gas turbine electric power plants are usable in base oad, mid-range laod and peak load power system applications. Combined cycle plants are normally usable or the base or mid-range applications, while the power plant which employs a gas turbine only as a generator Irive typically is highly useful for peak load generation because of its relatively low investment cost. Although he heat rate for gas turbines is relatively high in relation to steam turbines, the investment savings for peak oad application typically offsets the higher cost factor. Another economic advantage for gas turbine is that power generation capacity can be added in relatively small blocks, such as 25MW or 50MW as needed for expected system growth, thereby avoiding excessive capital expenditure and excessive system reserve requirements. Further background on peaking generation can be obtained in articles such as "Peaking Generation", a Special Report of Electric Light and Power lated November, 1966.

Startup availability and low forced outage rates are particularly important for peak load power plant applications of gas turbines. Thus, reliable gas turbine startup and standby operations are paricularly important for power system security and reliability.

In the operation of gas turbine apparatus and electric power plants, various kinds of controls have been employed. Relay-pneumatic type systems form a large part of the prior art. More recently, electronic controls of the analog type have been employed as perhaps represented by U.S. Pat. No. 3,520,133 entitled "Gas Turbine Control System" and, issued on July 14, 1970 to A. Loft, or by the control referred to in an article entitled "Speedtronic Control, Protection and Sequential System", and designated as GER-2461 in the General Electric Gas Turbine Reference Library. A wide variety of controls have been employed for aviation jet engines including electronic and computer controls as described, for example, in a March, 1968 ASME Paper presented by J. E. Bayati and R. M. Frazzini, and entitled "Digatec" (Digital Gas Turbine Engine Control), an April, 1967 paper in the Journal of the Royal Aeronautical Soceity authored by E. S. Eccles and entitled "The Use Of A Digital Computer For On-Line Control Of A Jet Engine", or a July, 1965 paper entitled "The Electronic Control Of Gas Turbine Engines" by A. Sadler, S. Tweedy and P. J. Colburn in the July, 1965 Journal of the Royal Aeronautical Society. However, the operational and control environment for jet engine operations differs considerably from that for industrial jet turbines. In referencing prior art publications or patents as background herein, no representation is made that the cited subject matter is the best prior art.

In connection with prior art gas turbine electric power plant operating and control systems and operating methods therefore, reference is made to copending related U.S. application Ser. No. 82,470 which, in conjunction with other enumerated related patent applications, comprises a description of an improved gas turbine patent operating and control system. The present disclosure represents a further advancement over the prior art discussion herein contained and should be considered as exclusive of the referenced application.

Generally, the operation of industrial gas turbine apparatus and gas turbine power plants has been limited in flexibility, response speed, accuracy and reliability. Further limits have existed in the efficiency or economy with which single or multiple units are placed under operational control and management. Control loop arrangements and control system embodiments of such arrangements for industrial gas turbines have been less effective in operations control than is desirable. Limits have also existed on how close industrial gas turbines can operate to the turbine design limits over various speed and/or load ranges.

More particularly, in gas turbine control, substantially continuous monitoring of turbine parameters accurately reflecting operating conditions at the various operation cycle positions is essential. Optimum operation over a wide range of operating conditions can be assured only by such monitoring and by reliable, accurate control loop response to variations in one or more of such parameters. Further, certain critical parameters must be continuously sensed in order to prevent damage to combustor elements, hot parts, rotor blades, etc., in the event of over-temperature or overload conditions.

Process sensors of various ytpes have been employed to furnish control system inputs. For example, temperature and pressure sensors have been located at various turbine cycle positions and in varying configurations.

Accurate reliable temperature and pressure indications have been increasingly recognized as essential to maintaining the integrity of a system having one or more control loops wherein it is sought to control turbine speed or load in response to a temperature and/or pressure derived fuel demand signal. During turbine startup, accurate combustor shell pressure indications have been found to be of particular importance. Again, under load, accurate pressure readings may become essential to efficient operation.

During those modes of operation characterized principally by temperature control, the accuracy and reliability of such indications determine the degree to which optimum operating conditions may be attained. A description of an improved control system employing optimally arranged turbine system thermocouples, suitable for use in the gas turbine electric power plant of the present invention, may be found in copending U.S. application Ser. No. 155,905.

As gas turbine automatic control systems developed, it became increasingly essential to obtain reliable temperature and pressure indications for use as control parameters in developing a fuel control input in the various control modes of operation. It became necessary to continuously review such measurements, not only for the purpose of assuring reliable, safe operation, but further to insure the availability of contorl variables which would enable efficient operation of the gas turbine near design limits to thereby enhance overall efficiency of the automatic control system. Known prior art control systems have lacked a facility for deriving consistently accurate control variables representative of critical parameters such as turbine inlet temperature, combustor shell pressure and turbine exhaust temperatures.

Although known prior art gas turbine control systems have provided multiple control loops in part responsive to temperature and pressure inputs, difficulties in obtaining continuous control over all operating modes has persisted, in a large part, as a result of an inability to obtain precise temperature and pressure inputs over a broad range of operating conditions. Over some portions of gas turbine operation, for example, temperature measuring errors and poor response of temperature measuring instrumentation have produced thermal lag so that response to step impulse inputs has been inadequate to satisfy the highly responsive and flexible control necessary in most applications of gas turbine apparatus. Clearly, an alternative to temperature control has been indicated, in order to reduce undesirable thermal transients. Controlling as a function of combustor shell pressure over this interval of gas turbine operation presents an immediate alternative. However, problems have persisted in such control as hereinbefore indicated.

Problems encountered in controlling fuel system operation as a function of compressor shell pressure during gas turbine start-up and during subsequent modes of operation have indicated reliance on other operating parameters to achieve positive control during this time interval. Characteristically, such systems have not provided adequate control over a broad range of ambient temperatures. Variations in such ambient temperatures are known to cause significant variations in internal temperatures which may shorten the life of turbine components, such as blading and the like. A characteristic prior art control system calls for an initial shot of fuel upon detection of flame at light-off, with a subsequent cut-back from the initial impulse level to reduce thermal shock to hot path parts. At the end of the warm-up period, positive control is resumed as a function of temperature or acceleration. Clearly, such control is inadequate to preventing the effects of thermal transient or thermal shock to the critical turbine components.

Various methods and apparatus exist for obtaining, calibrating and displaying instantaneous values of critical turbine operating parameters. Characteristically, however, calibration of various instrumentation employed in obtaining control system inputs has been limited to a one-time setting prior to turbine start-up of instruments to indicate extreme values of a known scale, e.g., alignment of the particular dial at the zero and maximum setting, for example, a combustor shell pressure transducer, which provides readings from zero to 160 psig. Previously, calibration procedures had suggested an alignment of a dial at zero and 160 psig with an implicit assumption that increments between the two extreme values will be linearly a function of combustor shell pressure. Such procedures have been inadequate to maintaining accuracy of readings over the entire range of calibration of the instruments in question. For the foregoing and for other reasons, difficulties have existed in obtaining the reliable, accurate combustor shell pressure indications necessary to the provision of responsive surge control during gas turbine start-up and during the other operating modes of industrial gas turbine apparatus. Calibration before start-up has been relied upon exclusively.

A variety of field experiences have demonstrated particular problems in calibrating combustor shell pressure transducers so that they repeat exactly to a zero reading after shut-down. The readings in the vicinity of zero pounds are very critical during the initial light-off period since, as discussed previously, combustor shell pressure is desirably considered in preventing compressor surge during this period. Variations in zero setting cause greatly varying light-off temperature control as verified by recorder traces taken in the field. Certain, otherwise adequate control algorithms and systems dictate inhibition of start-up if the pressure transducer is uncalibrated by more than one half pound at the zero point. Thus the problem of transducers repeating to zero pounds has affected availability and reliability.

Problems have existed in obtaining consistently accurate readings from other instruments. Analog signals representative of other critical parameters may have similar error components known to effect control system integrity. Problems have existed in obtaining consistently reliable inputs in the form of analog signals representative of discrete times, e.g., predicted times-to-go until the occurrence of critical events in plant sequencing or turbine operation cycles. One such critical event may be best appreciated by a reference to copending related U.S. application Ser. No. 99,493 wherein there is disclosed a system and method for the automatic synchronization of a gas turbine or other electric power plant generator with a power system.

More specifically, instrumentation providing analog inputs to an industrial gas turbie control system is subject to a phenomenon commonly referred to as drift. Synchronization of the operation of industrial gas turbines with the operation of the load unit sought to be efficiently and economically operated desirably should be within very small tolerances which may be expressed in terms of small fractions of seconds. The example hereinabove cited, copending U.S. application Ser. No. 99,493, depicts a system in which phase angle matching is extremely critical. Here, the criterion for precise efficient matching is the timed operation of a circuit breaker such that phase coincidence occurs coincident with breaker closing. Known prior art calibration techniques have lacked a facility for providing consistently reliable indications of time remaining until phase coincidence. Manual adjustment of devices such as potentiometers in systems for both manual and automatic synchronization have not provided the precision sought.

SUMMARY OF THE INVENTION

One or more industrial gas turbines or gas turbine power plants are operated by a control system which preferably employs a programmed digital computer in a hybrid control system arrangement. The control system operates in a gas turbine control loop arrangement, preferably to control fuel flow and thereby provide load and loading rate control over the turbine and generator or other load unit and further provide speed, surge and temperature limit control with non-linear control loop characterization. Control system inputs representative of a variety of gas turbine and generator operating parameters provide a continuous basis for accurate, highly responsive flexible control.

More specifically, after appropriate analog to digital conversion, raw system inputs are converted and/or scaled into highly accurate control system variables for use in deriving control actions or directives. A facility is provided for error checking and dynamic calibration of the various instruments employed in turbine and generator process monitoring. Programmed computer operations are performed on a periodic basis to maintain current calibrated basis for correction of readings obtained from turbine and generator process sensors and instrumentation.

DESCRIPTION OF THE PREFERRED EMBODIMENT

A. POWER PLANT

1. General Structure

Figure 1:
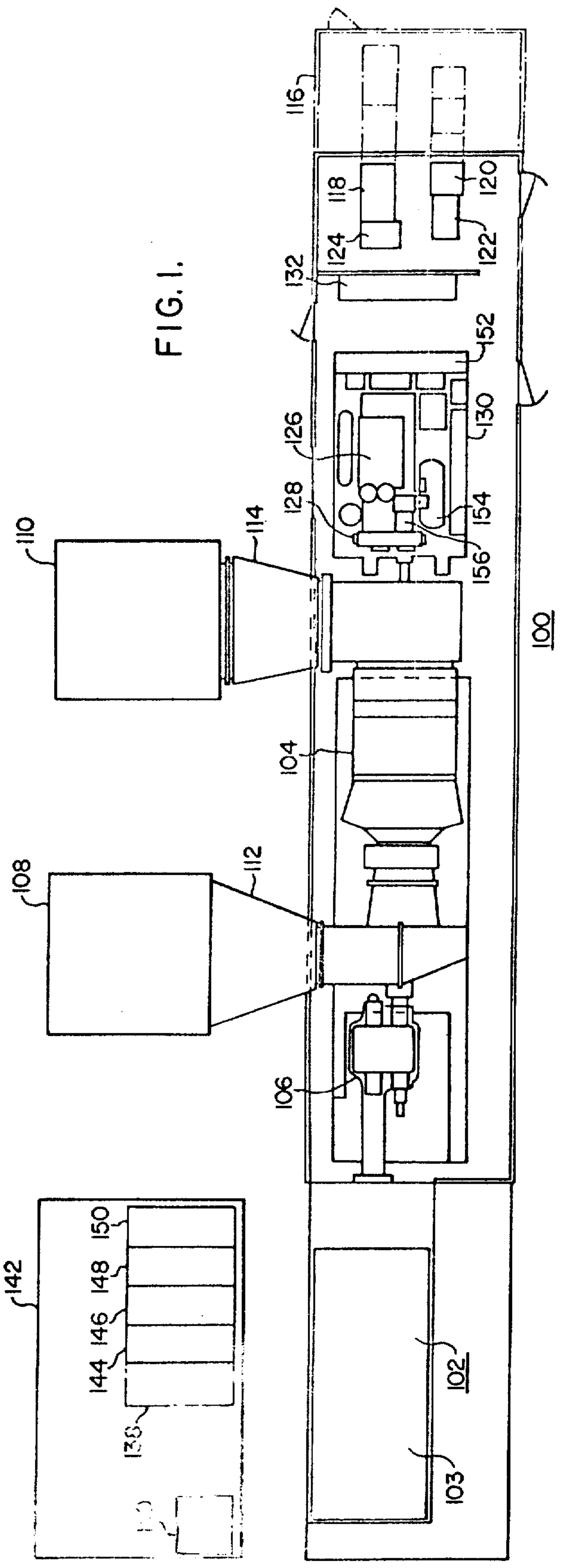
FIG. 1 shows a top plan view of a gas turbine power plant arranged to operate in accordance with the principles of the invention.

More particularly, there is shown in FIG. 1, a gas turbine electric power plant 100 which includes an AC generator 102 driven by a combustion or gas turbine 104 through a reduction gear unit 106. In this application of the invention, the gas turbine 104 is the W-215G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shafts or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristicly associated with turbine power plants.

Digital computer and other control systems circuitry in a cabinet 118 provides for operation of the power plant 100 when a single plant unit is selected by the user. Associated therewith in an operator's panel 120, an automatic send/receive printer 313 and a protective relay panel 124 for sensing abnormal electric power system conditions. The number of basic master and slave units 118 through 124 provided may vary according as the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and its includes motor starters and other devices to provide for operating the various auxiliary equipment items associated with the plant 100.

A plant battery 132 is disposed adjacent to one end of the auxiliary bedplate or skid. The battery provides power for emergency lighting, auxiliary motor loads, and DC computer and other control power for a period following shutdown of the plant 100 due to a loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

2. Generator and Exciter

Figure 2:
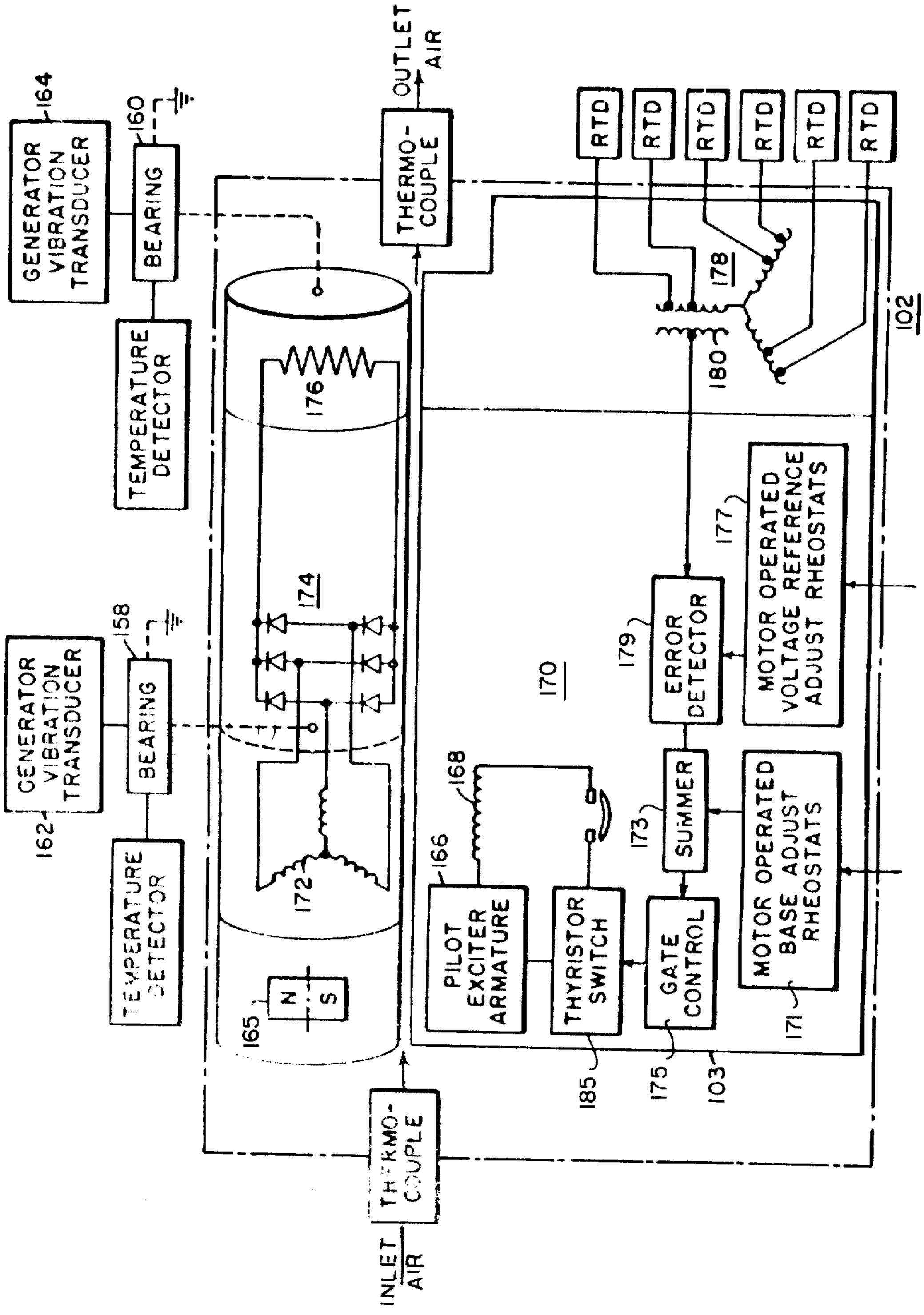
FIG. 2 shows a schematic view of a rotating rectifier exciter and a generator employed in the gas turbine power plant of FIG. 1.

The generator 102 and its brushless exciter 103 are schematically illustrated in greater detail in FIG. 2. Structural details as well as details of operation are considered more fully in the aforementioned copending U.S. application Ser. No. 82,470, Section A2, pages 21 to 24.

Briefly, a permanent magnet field member 165 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided with generate input data for the plant control system. Included are vibration transducers 162 and 164, resistant temperature detectors embedded in the stator winding and thermocouples installed to measure air inlet discharge temperature and bearing oil drain temperatures. In this manner, alarm conditions are provided to the control system. Additional control functions are provided to adjust base adjust rheostats 171 and 177 to provide fine generator voltage control.

3. Gas Turbine a. Compressor

Figure 3:
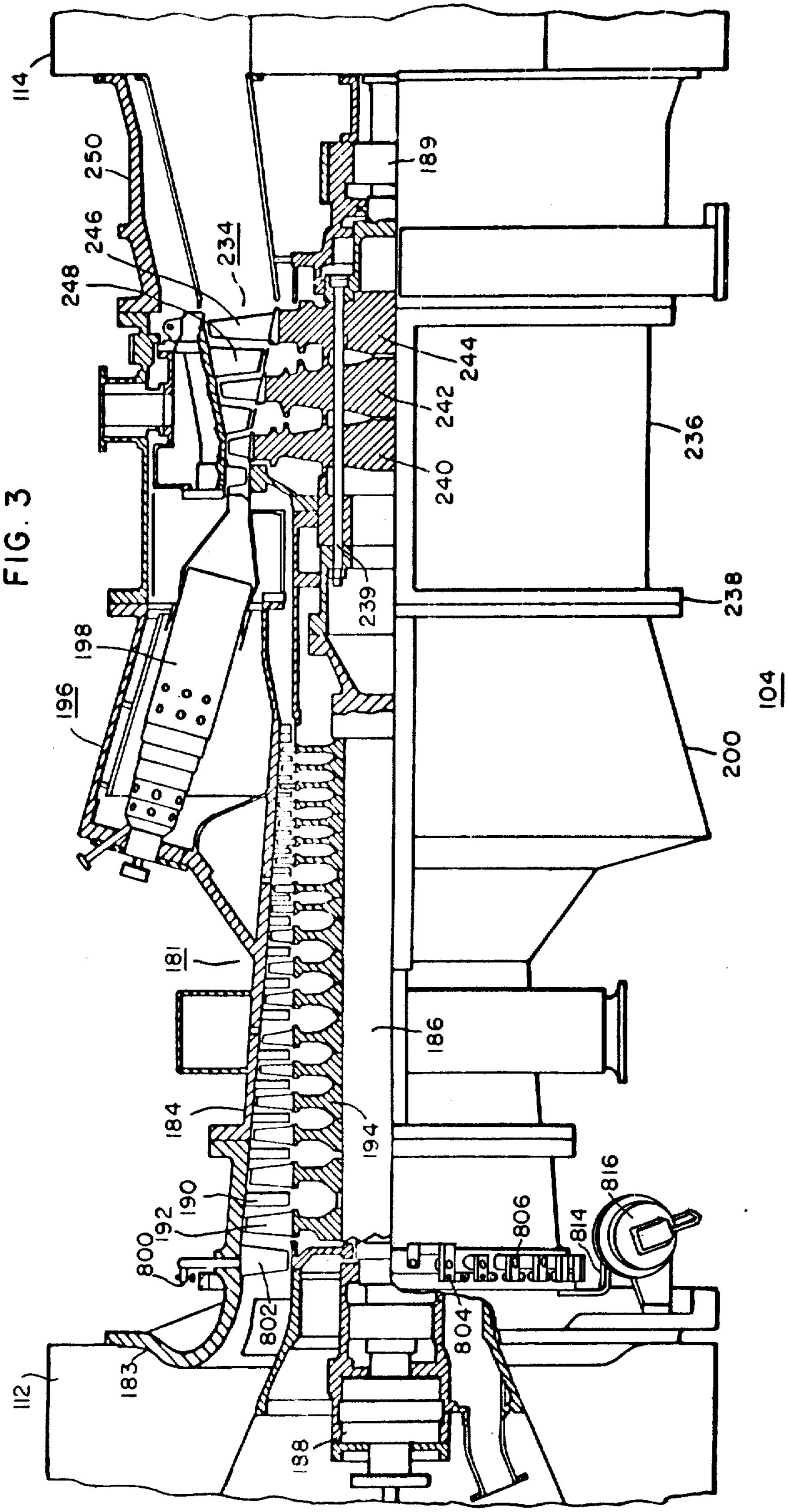
FIG. 3 shows a front elevational view of an industrial gas turbine employed in the power plant to drive the generator and it is shown with some portions thereof broken away.

The gas turbine 104 in this case is the single shaft simple cycle type having a standard ambient pressure ratio of 9.0 to 1 a rated speed of 4894 rpm and it is illustrated in greater detail in FIG. 3. Filtered inlet air enters a multistage axial flow compressor 181 through a flanged inlet manifold 183 from the inlet ductwork 112. An inlet guide vane assembly 800 includes vanes supported across the compressor inlet to provide for surge prevention particularly during startup. The angle at which all of the guide vanes are disposed in relation to the gas stream is uniform and controlled by a pneumatically operated positioning ring coupled to the vanes in the inlet guide vane assembly 800.

The compressor 181 is provided with a casing 184 which is split into base and cover parts along a horizontal plane. The turbine casing sturcture including the compressor casing 184 provides support for a turbine rotating element including a compressor rotor 186 through bearings 188 and 189. Vibration transducers (FIG. 9) are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control form intermediate compressor stages to prevent surge during startup.

Figure 9:
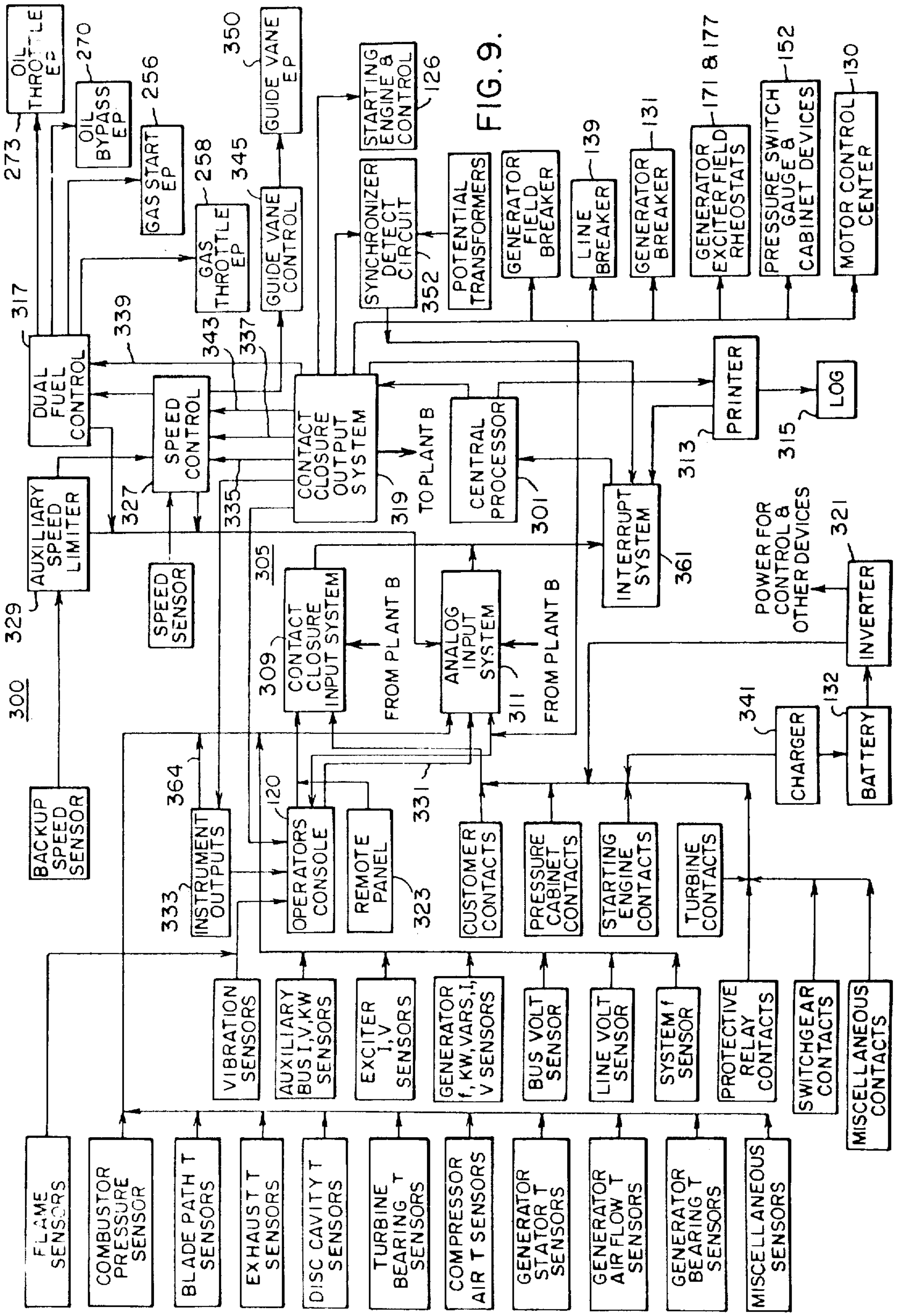
FIG. 9 shows a block diagram of a digital computer control system employed to operate the gas turbine power plant of FIG. 1.

The compressor inlet air flows annularly through a total of eighteen stages in the compressor 181. Blade 192 mounted on the rotor 186 by means of wheels 194 are appropriately designed from a aerodynamic and structural standpoint for the intended service. A suitable material such as 12% chrome steel is employed for the rotor blades 192. Both the compressor inlet and outlet air temperatures are measured by suitably supported thermocuples (FIG. 9).

b. Combustion System

Pressurized compressor outlet air is directed into a combustion system 196 comprising a total of eight combustor baskets 198 conically mounted within a section 200 of the casing 184 about the longitudinal axis of the gas turbine 104. In accordance with one aspect of the principles of the present invention, control system inputs representative of combustor shell pressure are obtained by a suitable strategically located, sensor (FIG. 9) coupled to the compressor combustor flow paths located in the pressure switch and gauge cabinet 152. The pressure detector/transducer can for example, be one such as that described in Product Bulletin (PB)-107-109 published by Hagan Computer and Instrumentation Division of Westinghouse Electric Corporation and designated "Transducer High Pressure Model-109".

Figure 4:
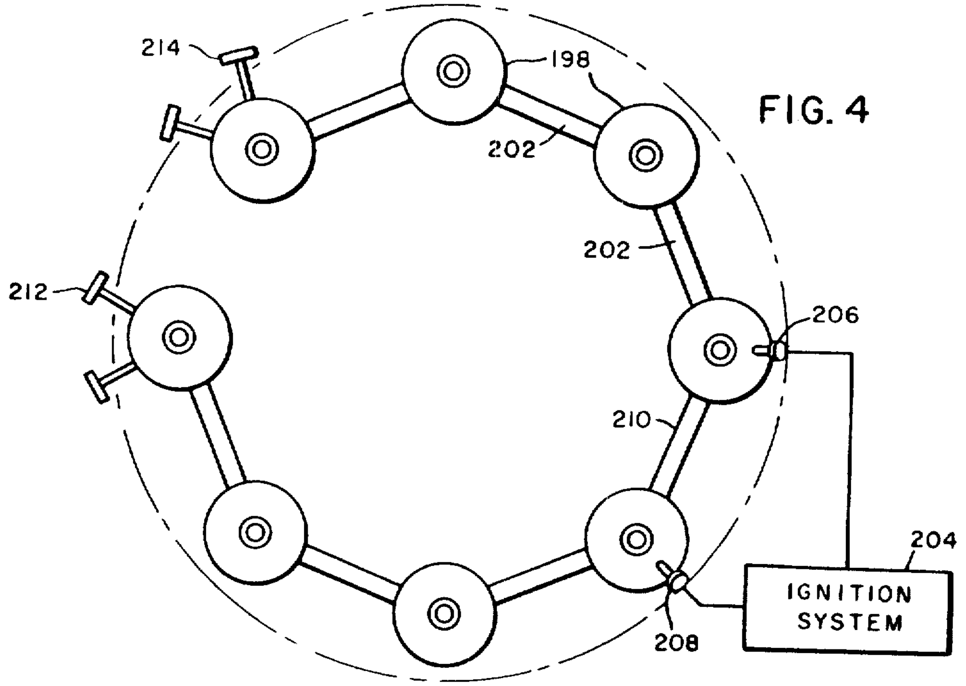
FIGS. 4–6 show a fuel nozzle and parts thereof employed in the gas turbine of FIG. 3.

As schematically illustrated in FIG. 4, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ingition has been executed.

A pair of ultraviolet flame detectors 212 and 214 are associated with each of the end combustor baskets in the respective basket groups in order to verify ignition and continued presence of combustion in the eight combustor baskets 198. The flame detectors 212 and 214 can for example be Edison flame detectors Model 424-10433.

Figure 5:
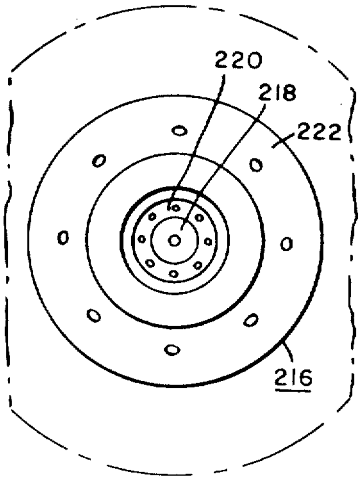

In FIG. 5, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle is disposed about the atomizing air nozzle 220 to complete the assembly of the fuel nozzle 216.

Figure 6:
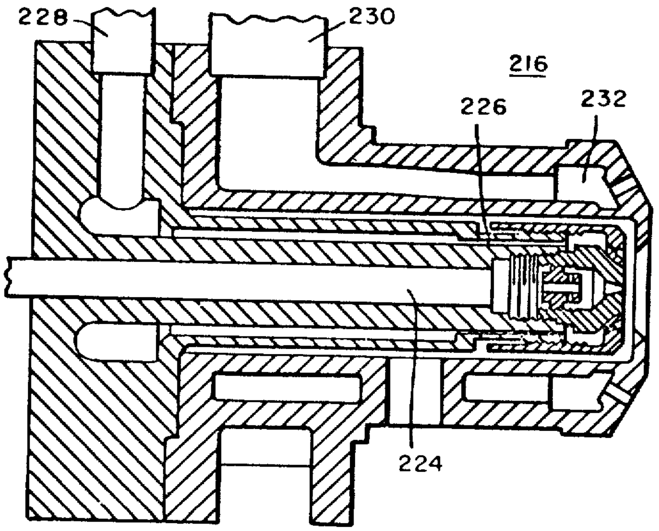

As indicated in the broken away side view of FIG. 6, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 110 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234 (FIG. 3). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas into turbine rotation, i.e. to drive the compressor 181 and the generator 102. The turbine rotor is formed by a stud shaft 239 and three disc blade assemblies 240, 242 and 244 mounted on the stub shaft by through bolts. Thermocouples (FIG. 9) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the ocmpressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

Figure 15:
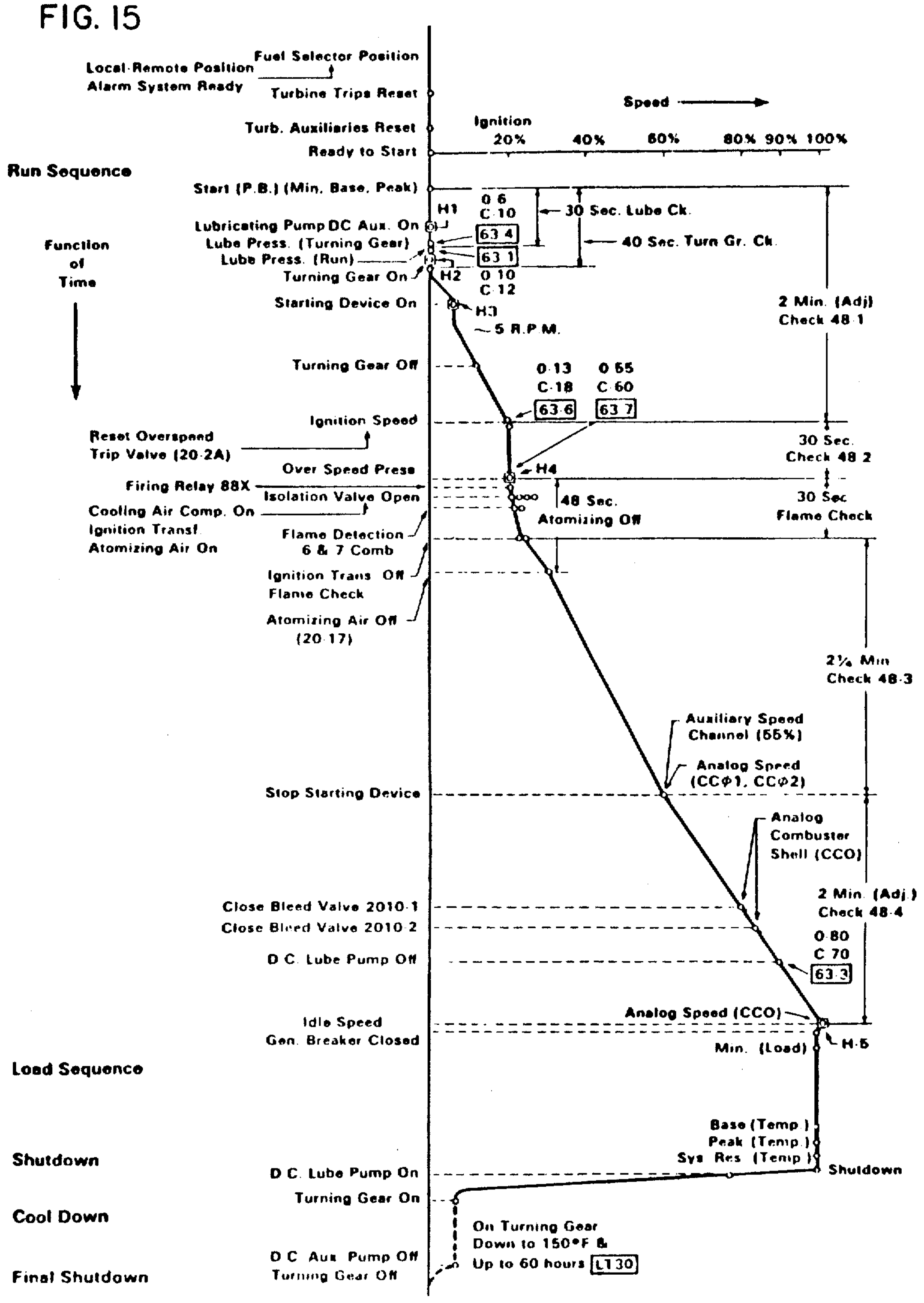
FIGS. 15A–B show a sequence chart for startup and shutdown of the gas turbine power plant.
Figure 15A:
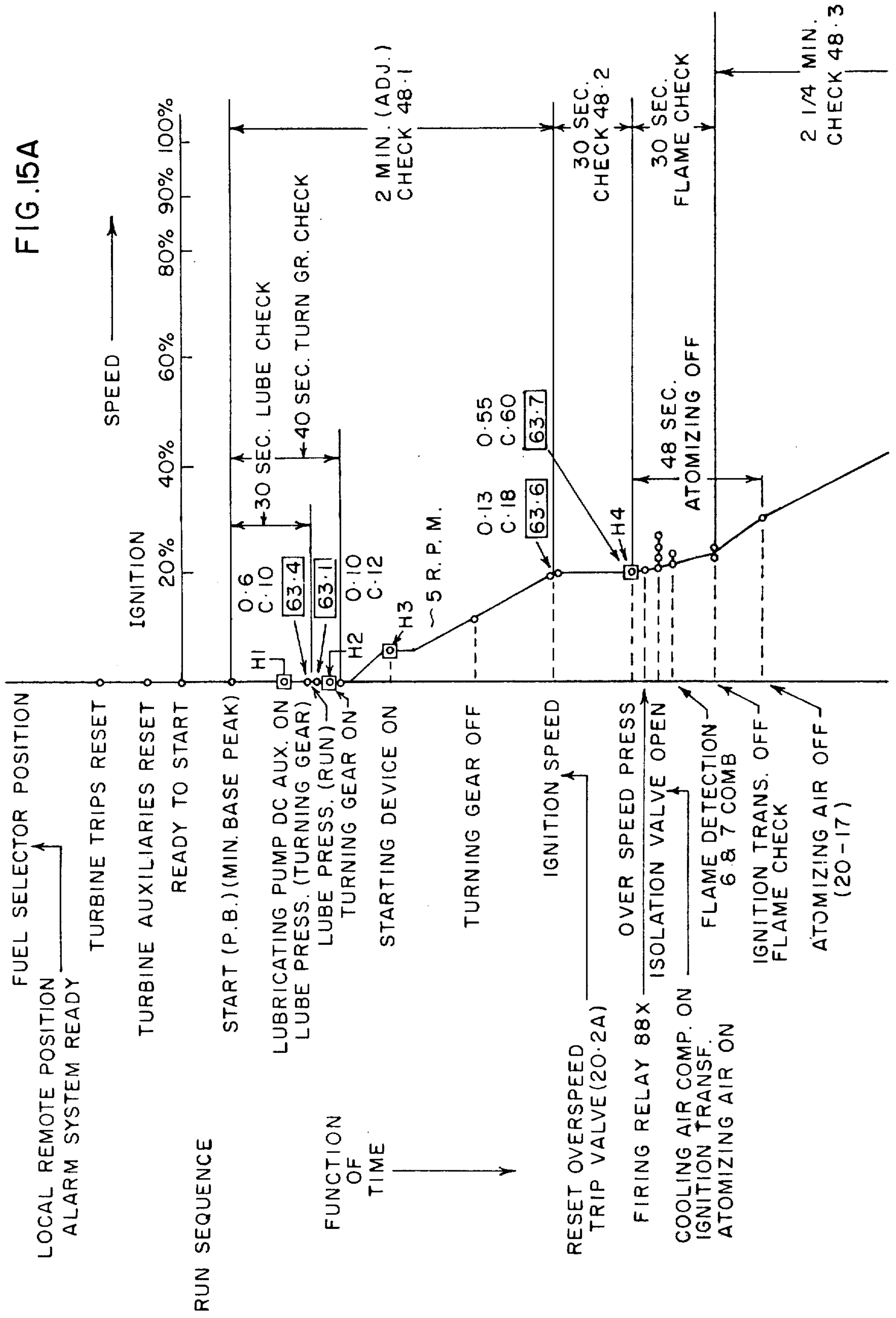
Figure 15B:
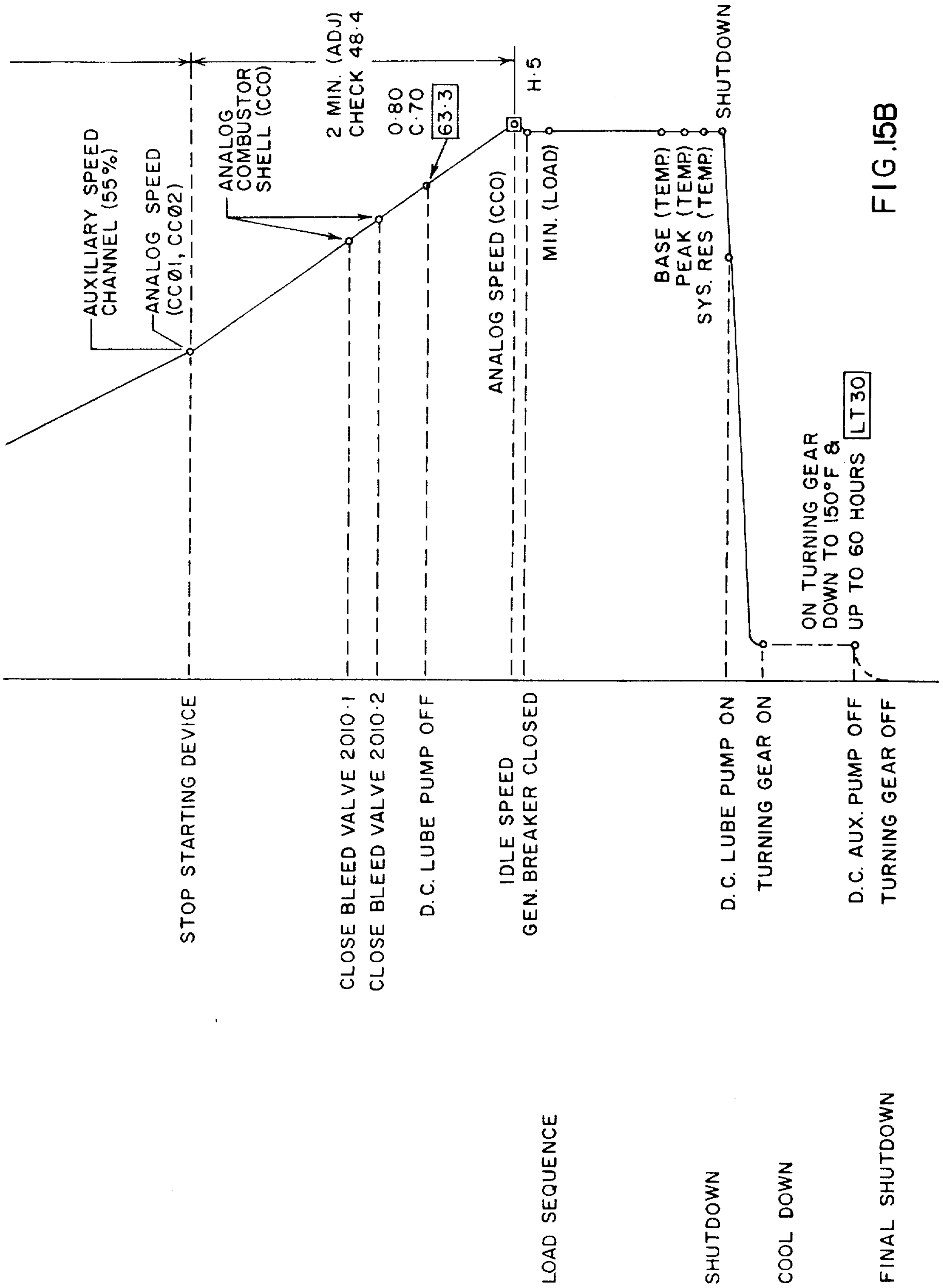

The generator and gas turbine vibration transducers (FIG. 9) can be conventional velocity transducers or pickups which transmit basic vibration signals to a vibration monitor for input to the control system. A pair of conventional speed detectors (FIGS. 9 and 15A) are associated with a notched magnetic wheel (FIG. 15A) supported at appropriate turbine-generator shaft locations. Signals generated by the speed detectors are employed in the control system in determining power plant operation.

Thermocouples (FIG. 9) are associated with the gas turbine bearing oil drains. Further, thermocouples (FIG. 9) for the blade path are supported about the inner periphery of the exhaust manifold 250 to provide a fast response indication of blade temperature for control system usage particularly during plant startup periods. Exhaust temperature detectors (FIG. 9) are disposed in the exhaust ductwork 114 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

e. Fuel System

Figures 7, 8:
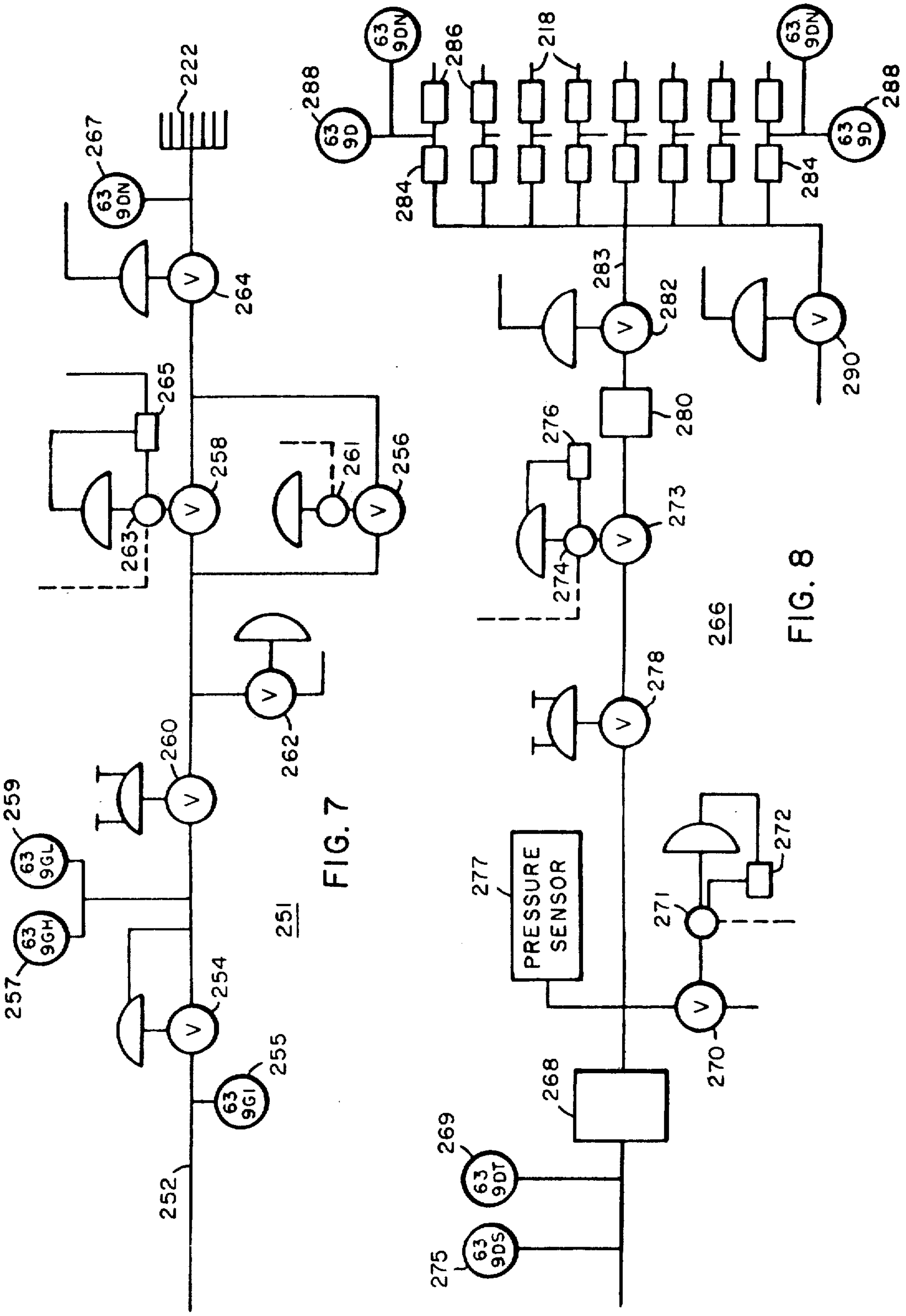
FIGS. 7 and 8 respectively show schematic diagrams of gas and liquid fuel supply systems employed with the gas turbine of FIG. 3.

A fuel system 251 is provided for delivering gaseous fuel to the gas nozzles 222 under controlled fuel valve operation as schematically illustrated in FIG. 7. Gas is transmitted to a diaphragm operated pressure regulating valve 254 from the plant gas source via line 252. A pressure switch 255 provides for transfer to oil fuel at a low gas pressure limit. Pressure switches 257 and 259 provide high and low pressure limit control action on the downstream side of the valve 254. It is noted at this point in the description that IEEE switch-gear device numbers are generally used herein where appropriate as incorporated in American Standard C37.2-1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 9). A pressure switch 267 indicates fuel pressure at the inlet to the nozzle 222.

As schematically shown in FIG. 8, a liquid fuel supply system 266 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 277. A bypass valve 270 is pneumatically operated by an electro-pneumatic converter 271 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 273 is held at a minimum position during the ramp pressure control action on the discharge pressure regulator valve 270. A pressure switch 269 provides for DC backup pump operation on low pressure, and a pressure switch 275 indicates whether the pump 268 has pressurized intake flow.

After pressure ramping, the pneumatically operated throttle valve 273 is positioned to control liquid fuel flow to the nozzles 218 as determined by an electropneumatic converter 274 and a booster relay 276. An electric control signal determines the converter position control action for the throttle valve 273. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valve 282 provides on/off control of liquid fuel to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzles 218. A manifold drain valve 290 is pneumatically operated under electric signal control during turbine shut-down to drain any liquid fuel remaining in the manifold 283.

4. Plant Performance Characteristics

Details concerning plant performance characteristics are contained in the aforementioned related U.S. application Ser. No. 82,470, Section A4, pages 32 to 36.

B. POWER PLANT OPERATION AND CONTROL

1. General

The preferred embodiment of the integrated turbine generator control system 300 (FIG. 9) employs analog digital computer circuitry to provide sequenced start-stop plant operation, monitoring and alarm functions for plant protection and accurately, reliably and efficiently performing speed/load control during plant startup, running operation and shutdown. The plant control system 300 is characterized with centralized systems packing having a single operator's panel and embracing elements disposed in the control cabinet 118, the pressure switch and gauge cabinet 152 and other elements included in the electric power plant 100 of FIG. 1. If multiple plants like the power plant 100 may be operated, plural control cabinets may be required to provide the additional circuitry needed for the additional plant operations.

The control philosophy embodied in the control system 300 provides flexible operator/control system interfaces. Under automatic control, the power plant 100 can be operated under local operator control or it can be unattended and operated by direct wired remote or supervisory control.

2. Control Loop Arrangement — Characterization

Figures 10, 11A, 11C:
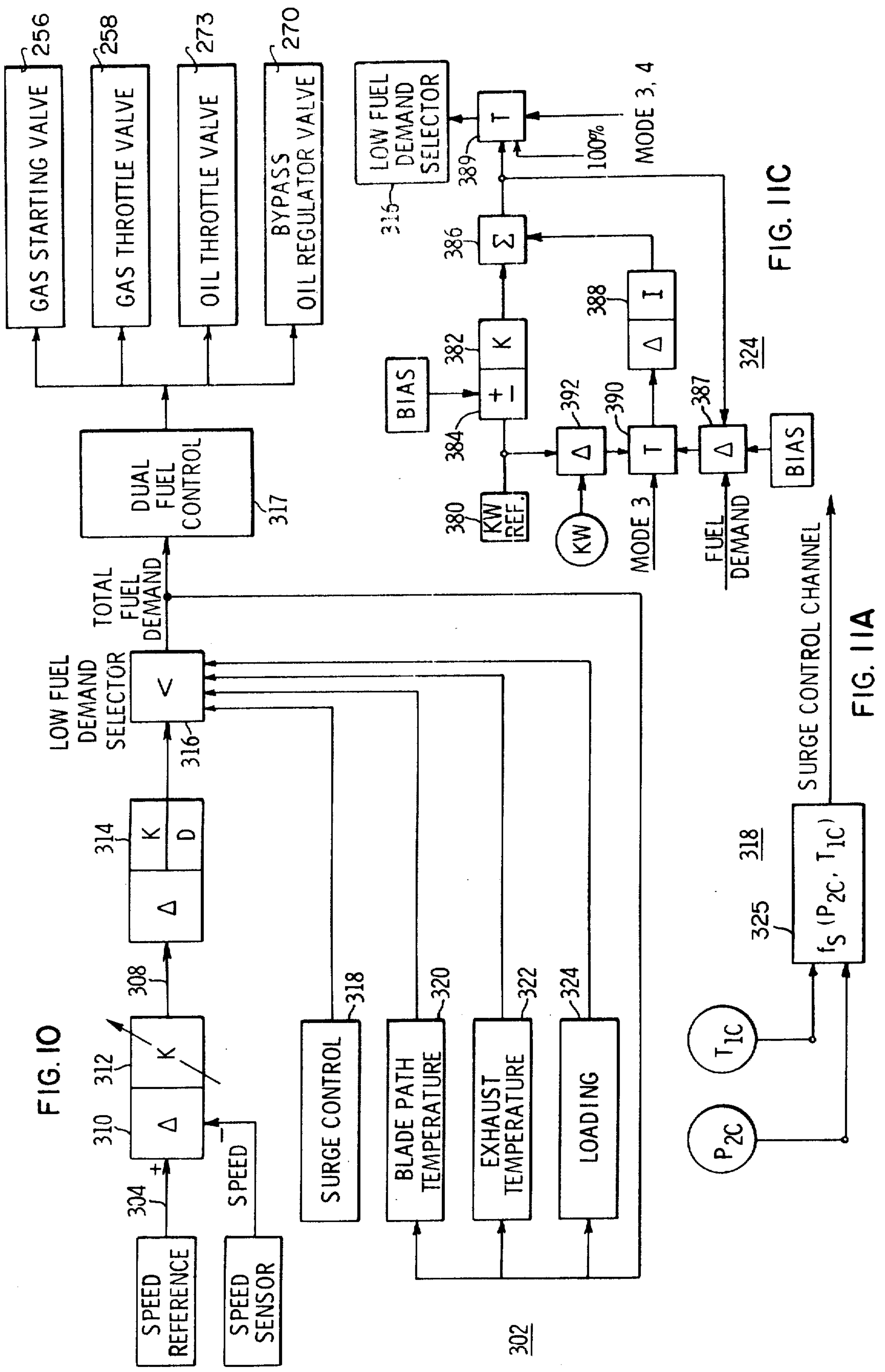
FIG. 10 shows a block diagram of a control loop which may be employed in operating the computer control system of FIG. 9 and the power plant of FIG. 1.
FIGS. 11A–C, show schematic diagrams of control loops which may be employed in operating the computer control system of FIG. 9 and the power plant of FIG. 1.

In FIG. 10, a control loop arrangement 302 represented by SAMA standard function symbols characterizes the preferred general control looping embodied in the preferred control system 300 and applicable in a wide variety of other applications of the invention. Reference is made to the aforementioned U.S. application Ser. No. 82,470, Section B2, pages 39 to 51, wherein they is contained a more detailed discussion of the control loop 302.

Briefly, the control loop arrangement 302 comprises an arrangement of blocks in the preferred configuration of process control loops for use in operating the gas turbine power plant 100 or other industrial gas turbine apparatus. No delineation is made in FIG. 10 between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, in the various control mode sequences to be hereinafter more fully discussed, the plant 100 is started from rest under control of loop 302, accelerated under accurate and efficient control to synchronous speed, preferably in a normal fixed time period, synchronized manually or automatically with the power system, and loaded under preferred ramp control to a preselectable constant or temperature limit controlled load level, thereby providing better overall power plant management.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative, after synchronization, with the limit blocks 318, 320 and 322. Thus, the operation of the plural control loop 302 as a function of the various limit representations varies during the various control modes of operation.

At the output of the low fuel demand selector 316, the fuel demand representation is applied to a dual fuel control 317 where the fuel demand signal is processed to produce a gas fuel demand signal for application to the gas starting and throttle valves or a liquid fuel demand signal for application to the oil throttle and pressure bypass valves or as a combination of gas and liquid fuel demand signals for application to the gas and oil valves together.

In order to start the plant 100, the control system 300, operating in control Mode 0, requires certain status information generated by the various process sensors. Once it is logically determined that the overall plant status is satisfactory, the plant startup is initiated. Plant devices are started in parallel when possible to increase plant availability for power generation purposes.

As control is transferred through the various control modes, a feedforward characterization is preferably used to determine representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably non-linear in accordance with the non-linear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required.

Figure 11B:
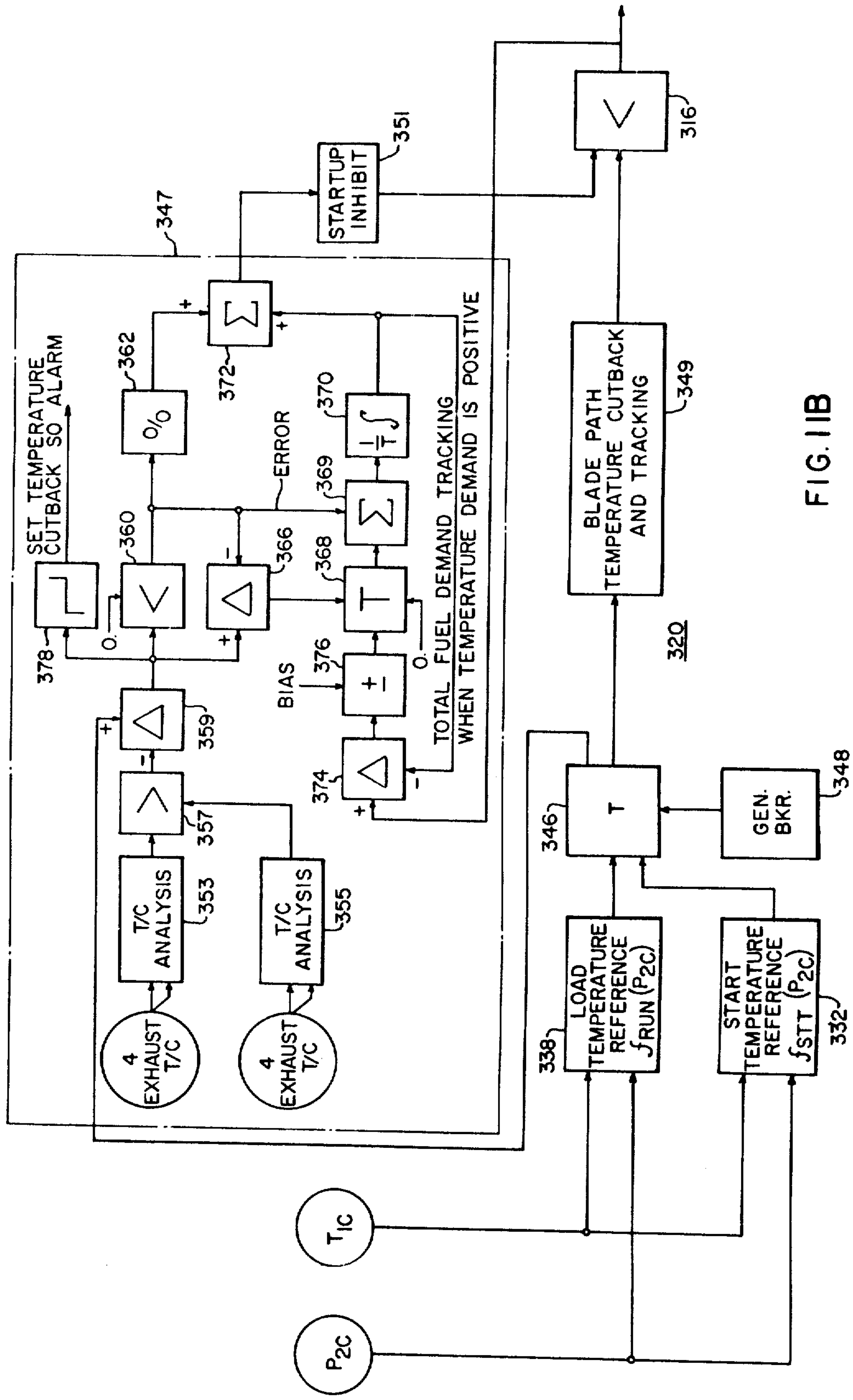

As will be appreciated from the foregoing discussion, control arrangement 302 is implemented such that different process variables are given greater weight in determining the control function to be performed as control progresses sequentially through the various modes of operation. Attention is directed to the critical startup period from light-off to attainment of synchronous speed. It is within this time frame of reference that surge control is of particular importance in minimizing risk of exceeding gas turbine design temperature limits. The surge control 318 includes a characterization block 325 which responds to sensed combustor shell pressure and compressor inlet temperature to generate the surge limit representation for compressor surge prevention as illustrated in FIG. 11B.

Figure 12:
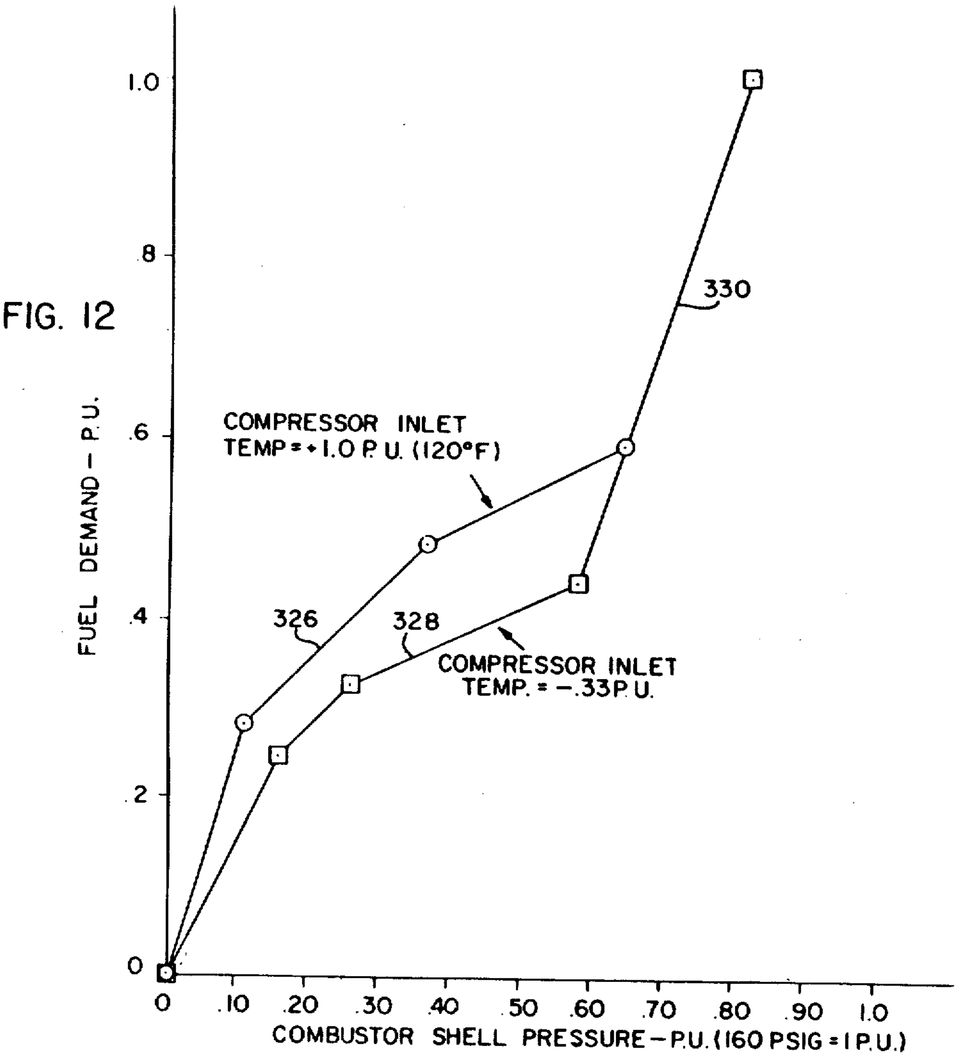
FIGS. 12, 13 and 14 illustrate various curve data employed in the control system computer in the operation of the gas turbine power plant.

Referring to FIG. 12, the curve 326 limits startup fuel demand for an ambient temperature of 120°F and the curve 328 limits startup fuel demand for an ambient temperature demand of −40°F. (Common curve portions 330 are operative to provide a substantially linear surge limit during subsequent load operations.

Figure 13:
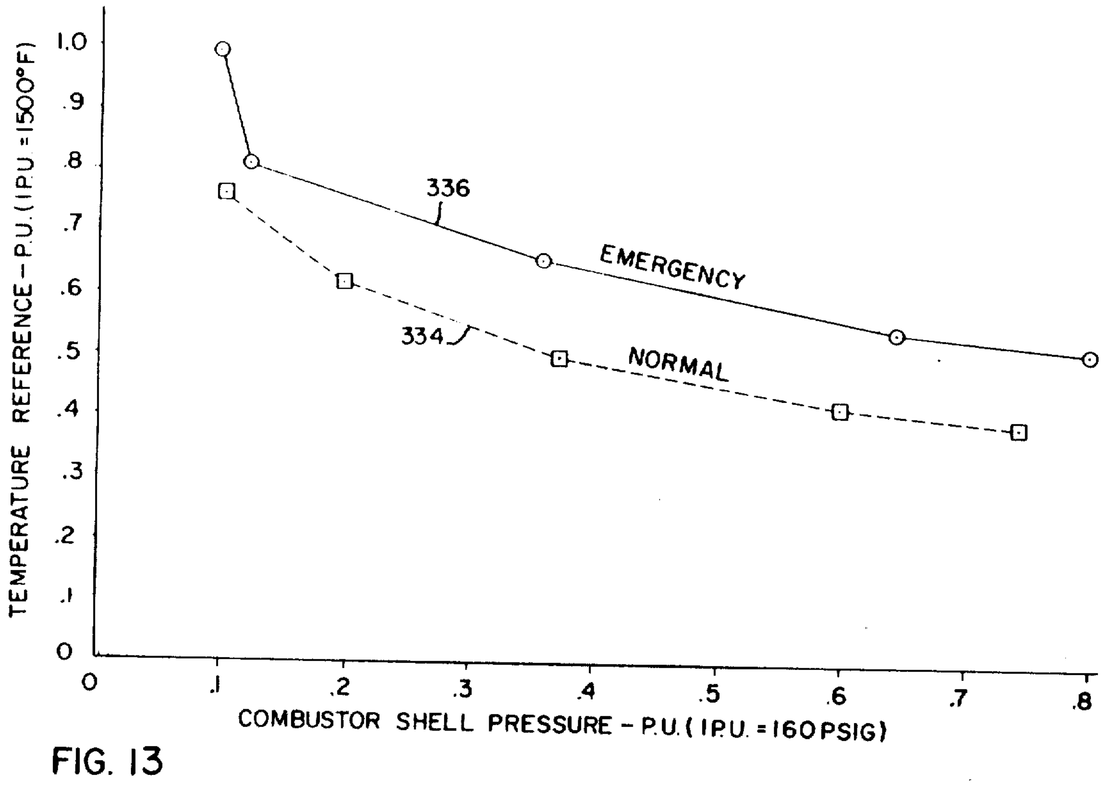
Figure 14:
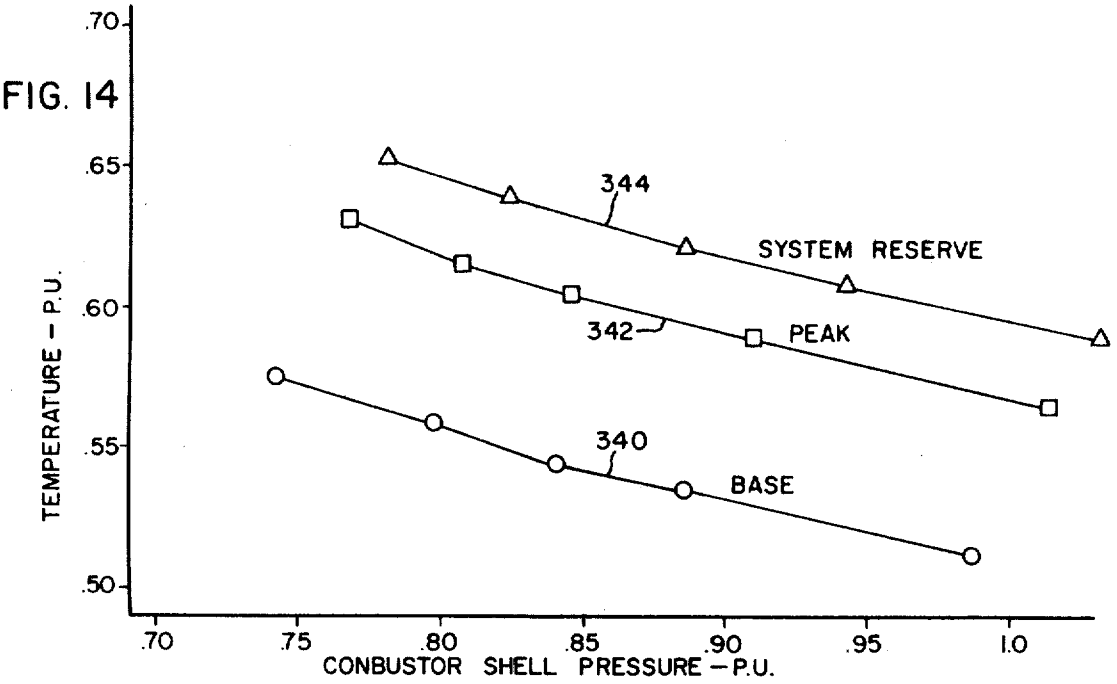

As shown in FIG. 11C, the blade path temperature control 320 includes a block 332 which responds to combustor shell pressure in accordance with a preferably nonlinear temperature reference characteristic 334 for normal startup and a second preferably nonlinear temperature reference characteristic 336 for emergency startup as illustrated in FIG. 13. The exhaust temperature control 322 includes a block 338 which responds to combustor shell pressure in accordance with temperature reference characteristic 340 for base load operation, 342 for peak load and 344 for system reserve load operation as shown in FIG. 14. Again each characteristic is preferably nonlinear. The startup curves 334 and 336 correspond respectively to 1200°F and 1500°F turbine inlet temperature while the load curves correspond to respectively higher values of turbine inlet temperature operations.

The control loop features described above provide the most accurate and reliable turbine control during startup operations, i.e., over the operation time interval indicated, control as a function of combuster shell pressure is found to be the most reliable. Difficulties in metering fuel and firing at low speeds are overcome. Low air flow, further complicated by temperature measuring errors and slow response of temperature sensors creates a control environment in which parametric fuel scheduling, required to reduce thermal transients, is highly desirable. Thermal shock, contributing to considerable wear and early deterioration of turbine components, is significantly reduced.

As will be hereinafter more fully described, the control system implemented in accordance with the principles of the present invention provides for positive highly responsive control over all modes of turbine operation. The low fuel demand select features in the described system allow precise control consistent with satisfying the most appropriate constraint at any given time. Instruments known to provide the best indications of operating conditions at any given time are calibrated dynamically yielding error free control variables, significantly enhancing accurate response.

Control over early time intervals as a function of combustor shell pressure eliminates problems encountered in systems wherein approximate fuel requirements dictate initial scheduling at a level corresponding to an impulse step control input. As seen by a reference to FIG. 12, 13 and 14, temperature and pressure are simultaneously considered in deriving a most favorable fuel schedule for efficient operation.

3. Control System

The control system 300 is shown in block diagram detail in FIG. 9. It includes a general purpose digital computer system comprising a central processor 301 and associated input/output interfacing equipoment such as that sold by Westinghouse Electric Corporation under the trade name Prodac 50 (P50). Generally, the P50 computer system employs a 16,000 word core memory, with a word length of 14 bits and 4.5 microsecond cycle time.

More specifically, the interfacing equipment for the computer 301 includes a contact closure input system 309 and a conventional analog input system 311. Sixty-four input/output channels each having 14 bit parallel paths into and out of the main frame are provided. Each of the employed interrupt inputs causes a separate and unique response within the computer main frame without need for additional input operations thereby allowing the processing of interrupt input signals with very little main frame duty cycle.

Process inputs are provided by the contact closure input system 309 and the analog input system 311. The contact closure input (CCI) system is coupled to the operator's console panel 120 and remote operator's panel 323. Characteristic CCI's are those related to the starting engine contacts. Also, a facility exists for customer selection of devices to be coupled to the CCI system.

Characteristic inputs to the analog input system 311 are the outputs from the various plant process sensors and detectors, namely, turbine 104 sensors such as blade path and exhaust manifold thermocouples. Additional inputs are those from a combustor shell pressure sensor and the main and backup speed sensors. The speed sensor outputs are coupled to the analog input system 311 through an analog speed control 327 and an auxiliary speed limiter 329, respectively.

The computer supplies essential outputs of various description for display at the operator's console 120 or the like. They are also applied as analog inputs as indicated by reference character 364. The contact closure output system 319 transfers digital speed reference, speed/load limit and fuel transfer outputs to is external circuitry as indicated respectively by the reference characters 335, 337 and 339.

The coupling of the contact closure output system 319 with the analog speed control 327 is within the frame-work of the preferred software/hardware hybrid control system. Another contact closure output 343 to the analog speed control 327 provides for a minimum fuel flow into the turbine combustor system in order to prevent flame-out after ignition.

An analog dual fuel control system 317 is operated by the speed control 327 to determine the position of the liquid and gas fuel valves considered in connection with FIGS. 9 and 10. A contact closure output coupling to the dual fuel control 317 provides for transfer between fuels or relative fuel settings for two fuel or single fuel operation as indicated by the reference character 339.

The contact closure output sytem 319 is also connected to the operator's panel 120 and to sequence the starting engine 126. A synchronizer detection circuit 352 has bus line and generator potential transformers coupled to its input and the contact closure output system 319 signal provides a visual panel indication for manual synchronization. The detection circuit 352 also supplies signals to the analog input system 311 for automatic synchronization when such synchronization is employed as considered more fully in the aforementioned Reuther and Reed copending patent applications.

Other devices operated by the contact closure outputs include the generator field breaker and the generator line breakers 131 and 139. The motor operator generator exciter field rheostat 171 and 177 and various devices in the motor control center 130 and the pressure switch and gauge cabinet 152 also function in response to contact closure outputs. The printer or teletype 313 is operated directly as a special input/output channel by the central processor 301. A guide vane control circuit 345 is also operated by the speed control 327 to control the position of the guide vanes through a guide vane electropneumatic converter 350 which actuates the positioning mechanism.

The foregoing is an abbreviated specification of a control system employed in implementing the preferred embodiment of the present invention, suitable for use in gas turbine power plant control. A more complete discussion of the preferred control system may be found in the aforementioned copending U.S. application Ser. No. 82,470, Section B3, pages 51 to 62.

Analog Circuitry

Figure 16A:
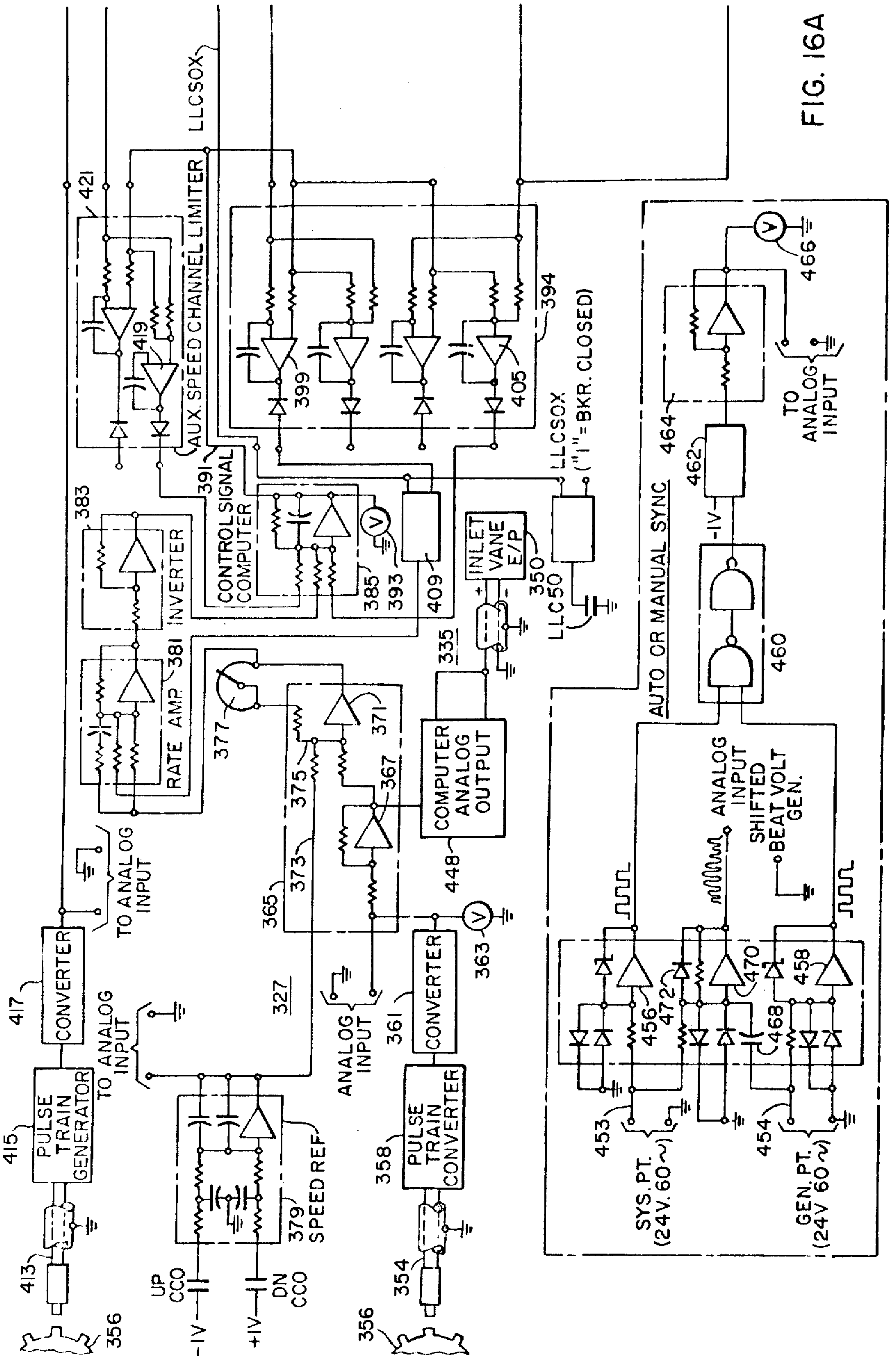
FIGS. 16A and 16B show a schematic diagram of analog circuitry associated with the computer in the control system to provide control over gas turbine fuel supply system operations and certain other plant functions.
Figure 16B:
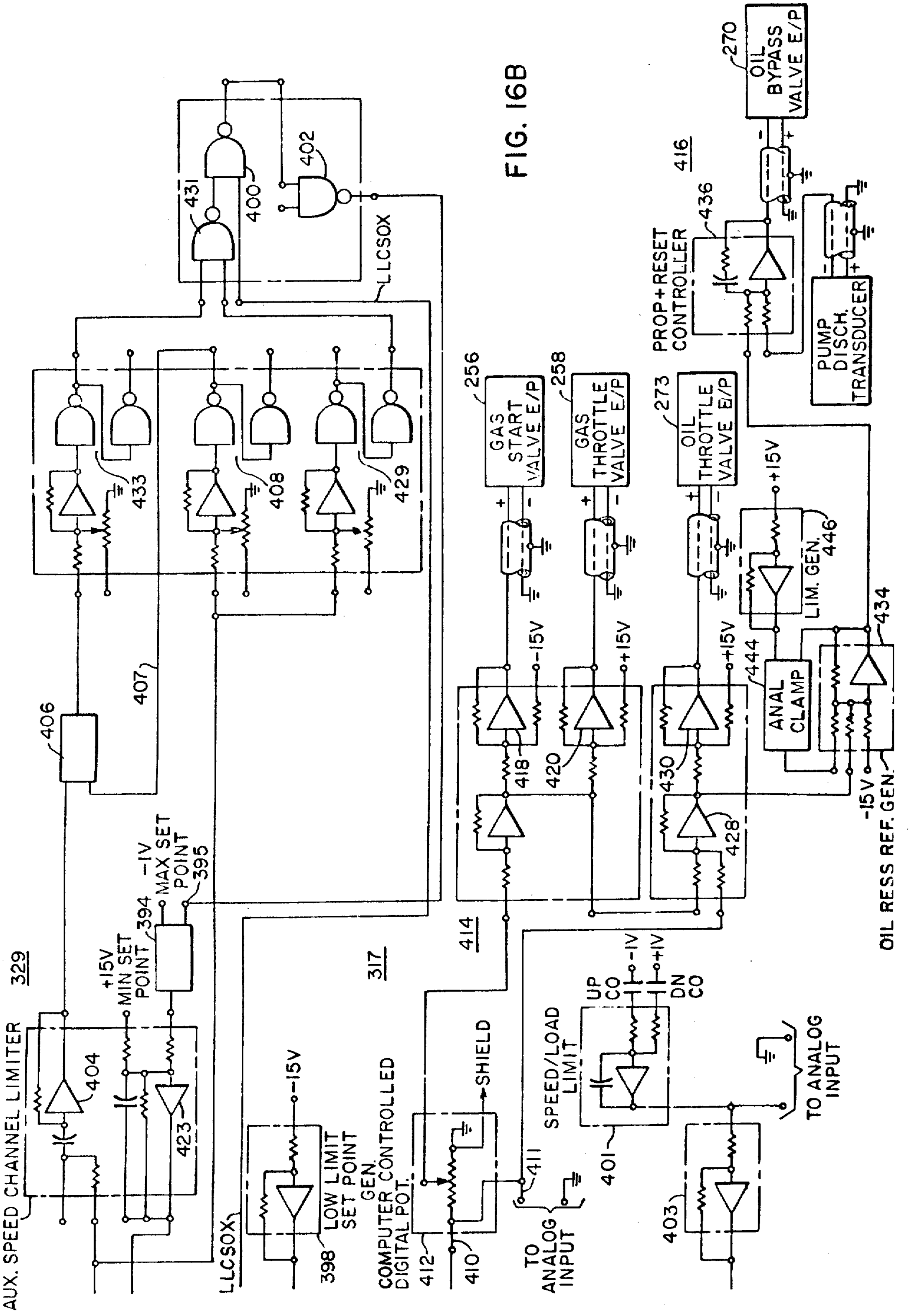

The speed control circuit 327 operates in response to a main speed signal generated by a main turbine speed sensor 354 associated with a 44 tooth magnetic rotor wheel 356 as shown in greater detail in FIG. 16A. The main speed signal is converted into a sinusoidal output waveform having a constant width pulse at twice the input frequency. To derive a representation of the actual turbine speed, circuit block 361 converts the pulse train into a proportional direct voltage output which is then applied to error detector circuit block 365 and to analog input system 311 (FIG. 9).

A speed reference signal 373 derived from an analog output circuit block 379 and a speed regulation feedback signal 375 are also inputs to circuit block 365. The speed reference signal is determined from a digital command value generated by the computer.

Within circuit block 365 actual speed and speed feedback regulation signals are added to the speed reference signals to determine a speed error output signal. In the absence of fuel demand limit action, the speed error, amplified in circuit block 385, is generated on line 391 as the fuel demand signal, or, contact signal output (CSO), and input to the fuel control system 317. Monitoring is provided by meter 393.

Low and high limits are generated by setpoint signal generators 398 and 401 and imposed on the fuel demand signal in circuit block 394 by clamp amplifiers 399 and 405, respectively.

A backup speed limit is imposed on a backup speed limiter 329 in a manner similar to the foregoing. As will be readily appreciated, there exists a one-to-one functional correspondence between circuit elements 354 and 413, 358 and 415, 361 and 417 and other elements shown as similarly disposed in the schematic diagram depicted in FIG. 16A.

Additional clamp amplifier circuit 419 and speed limiter setpoint generator 423 cause the fuel demand signal output from circuit block 385 to be cut back to a predetermined minimum value if either of two logic conditions is satisfied. The first of such conditions is the operation of the turbine in excess of 108% of rated speed. An auxiliary speed signal is applied to the input of comparator circuit 429 which generates an output signal for application to an AND circuit 431 when the speed signal is too high. As shown, AND circuit 400 responds if LLCSOX exists, to generate a switching signal via the logic inverter 402.

In a like manner, a speed derivative signal is processed to detect, as a second logic condition, an excess acceleration between 102% and 108% of rated speed, such that, upon comparison with a predetermined acceleration limit and determination in circuit block 433 that the speed derivative signal is greater, an output to logic switch 425 is generated and coupled to the control input of clamping amplifier 419 as already described. The fuel demand signal generated at the output of the fuel demand amplifier 385 accordingly is representative of the fuel needed to satisfy the computer generated speed reference, the fuel needed to satisfy a computer determined limit action, the low limit fuel demand needed to prevent flameout during normal speed operations, or to cause turbine speed cutback without flameout when overspeed conditions are detected by the auxiliary speed limiter circuit 329.

At an input 410 to the dual fuel control system 337, the fuel demand signal is applied across a computer controlled digital potentiometer 412 which is illustrated schematically as an analog potentiometer. The fuel demand signal is also applied to the computer analog input system 311 for programmed computer operations. The total fuel demand signal is ratioed between the gas fuel control systems 414 and 416 to produce the individual fuel flows which satisfy gas turbine operation demands.

The gas fuel demand signal is applied to signal range adjuster amplifiers 418 and 420 which provide predetermined operation characterization for the gas start valve and the gas throttle valve respectively. A signal range adjuster amplifier 430 operates on the liquid fuel demand signal to produce control on the liquid fuel throttle valve electropneumatic converter again, in accordance with a predetermined operation characterization. Additional liquid fuel control is provided by a pressure reference generator 434 and a rate controller 436 which serve to operate the liquid fuel bypass valve electropneumatic converter 270 in accordance with a predetermined pump discharge pressure characterization.

The inlet guide vane control 350 considered previously in connection with FIG. 9, may include a controller 448 which generates a guide vane position control signal as a linear function of the sensed speed signal derived from the error detector block 365 in the main speed channel. The subject is considered in greater detail in copending related U.S. application Ser. No. 189,632 and 189,633.

Additional functions performed by the analog system as indicated in FIG. 9, as well as a more definite discussion of these elements enumerated above may be found in copending U.S. application Ser. No. 82,470, pages 63 to 74.

Control Panels

The operator's panel considered in connection with FIG. 1 is included as part of an operator's console through which various process control functions may be initiated or altered. Additionally, process monitoring is provided in the form of various meters and alarms.

Among the general control functions provided are the following:

a. Breaker pushbutton control,
b. Automatic synchronization ON/OFF,
c. Synchronizing mode selection.

Control functions which may be included specific to the gas turbine, are as follows:

a. Normal start/stop,
b. Emergency start/stop,
c. Fuel selection,
d. Automatic fuel transfer.

Flexible generator control is provided in the form of panel functions which permit selection of manual or automatic voltage regulation.

Alarm condition indicators are provided by alarm lights and a horn blow. Typical conditions giving rise to alarm status indications are those pertaining to system failures during startup. Alarms are provided which are associated with specific process monitoring devices such as generator vibration detectors, combustor basket flame detectors, and blade path and exhaust manifold thermocouples. A facility is provided for initiating computer determined alarm status responsive control functions.

In the preferred embodiment, increased control flexibility is achieved through the provisions of one or more remote control panels which, desirably, duplicate the functions of the local operator's panel.

A detailed discussion of the control panels may be found in the aforementioned copending U.S. application Ser. No. 82,470, at pages 74 through 97 thereof. Included is a listing of local and remote operator's panel contact closure output assignments, and a description of the entering of control parameter changes into the control system 300.

D. PROGRAM SYSTEM 1. General Configuration

Figure 17:
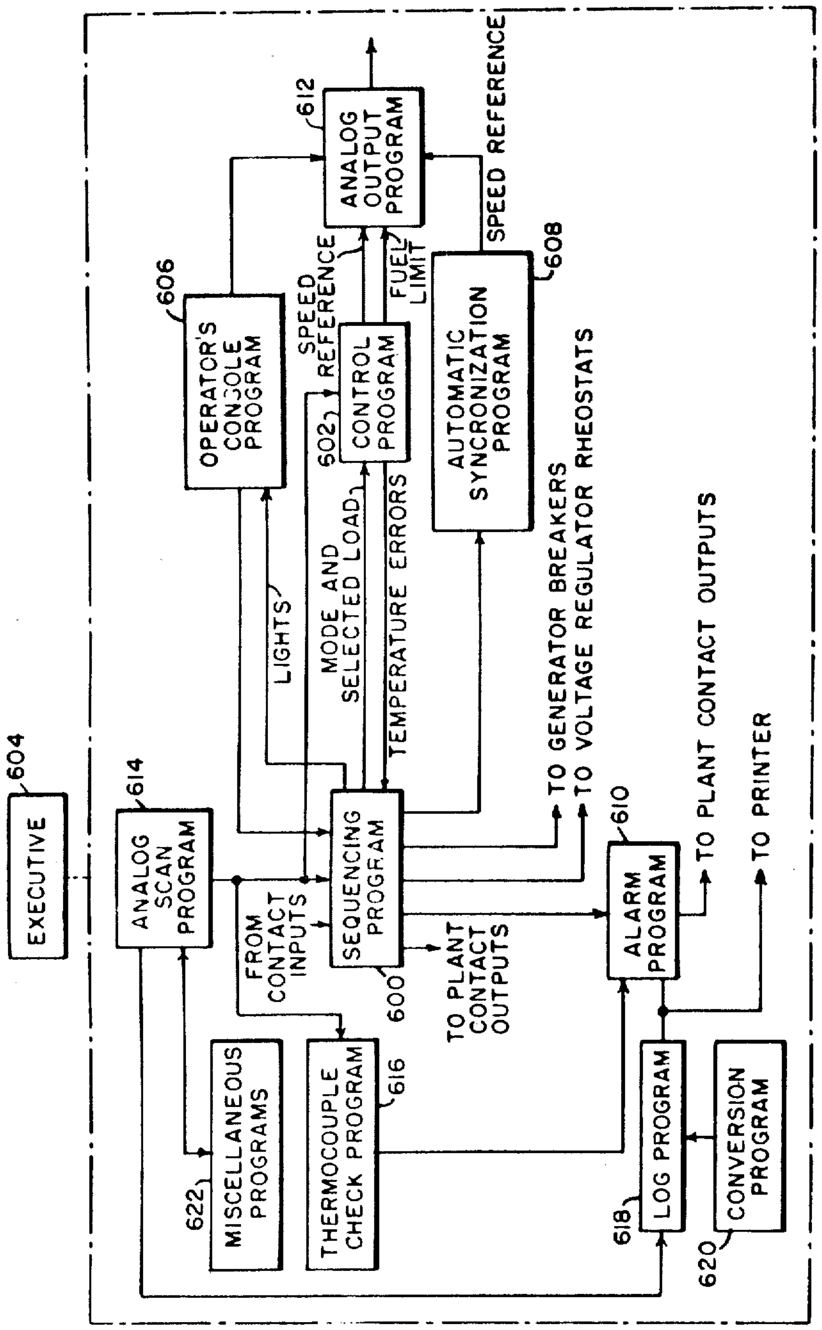
FIG. 17 shows a general block diagram of the organization of a program system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 17, the program system comprises a sequencing program 600 and a control program 602 which make most of the plant operational determinations for output to the control system interfacing and control hardware. An executive program 604 schedules the use of the computer 301 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and housekeeping tasks prior to, during and after startup. As indicated in FIG. 17, the sequencing program 600 supervises the control program 602 by specifying the control mode and the selected load. The control program 602 transmits data to the sequencing program 600 including for example hot blade path temperature indications during load operation which require plant alarm and shutdown.

An automatic synchronization program 608 is also supervised by the sequencing program 600 to provide for generator voltage regulator rheostat operation and turbine speed adjustment during automatic synchronization. The sequencing program 600 processes manual synchronization operation. it also transmits lamp light determinations to the operator's console program 606 and alarm determinations to an alarm program 610.

The operator's console program 606 is a package of subprograms which provides for interfacing the operator's panel 120 with the computer 301. The alarm program 610 provides for printout of detected alarms.

During the various modes of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

A thermocouple check program 616 makes a validity check on the thermocouples not checked by the sequencing program 600 or the control program 602 and generates an alarm for alarm program printout when a thermocouple reading indicates an open circuit.

A log program 618 operates in conjunction with a conversion program 620 to generate a periodic printout of the values of predetermined analog inputs. Other programs included in the program system are classified as miscellaneous programs 622.

2. Executive System

In the program system, the individual programs are repeatedly executed under control of executive program 604, typically with only the program variables changed. An executive priority system consisting of sublevel structured dominant and secondary levels defines the order in which programs are executed.

Dominant sublevel programs are executed according to real time, i.e. a program which is first bid is executed first if two programs are bidding to run simultaneously. Secondary sublevel programs are executed according to a preestablished hierachy.

3. Programmer's Console Package

The progammer's console programs are provided to facilitate communication with the P50 computer. Generally, the console package provides a means for loading programs into the computer, executing programs, loading constants or instructions and dumping areas of main and extended core memory. Core locations can be dumped in binary on tape or in octal on a keyboard. The programmer's console package operates within the priority structure of the executive program 604, and its elements are generally classified as a part of that program.

4. Operator's Console Program

Figure 22:
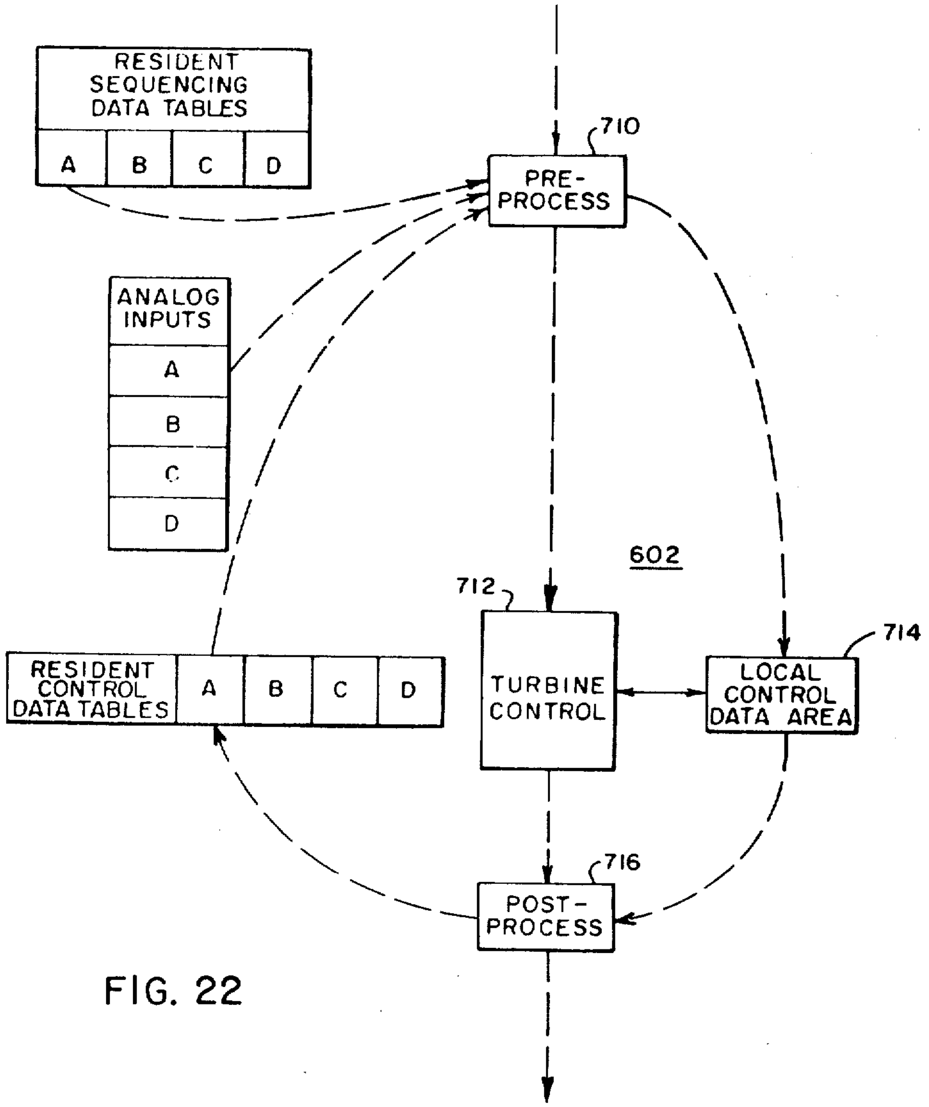
FIG. 22 shows a data flow diagram associated with control program operations during controlled operation of multiple gas turbine power plants with a single control computer.

As indicated in FIG. 22, an operator's console program is provided with interfaces with both the sequencing program 600 and the analog output program 612. Generally, a depressed local operator's pushbutton causes the interrupt routine to bid a dominant level operator's console program, which when active determines the requested action. In the event that generator breaker closing, line breaker closing or emergency shut-down have been requested, priority execution of associated program results. Other indicated actions occasion the requesting of an associated secondary sublevel program, which is then placed into the bidding state. Operator/Executive System communication is provided during all modes of gas turbine control.

5. Analog Scan Program

Generally, the analog scan program provides an executive function in reading all analog points associated with the power plant 100 and any similar plant units. The frequency at which the analog points are read is determined by the needs of the process operation, and in this instance, it is set at 30 points per second. The analog scan program can be executed under hardware or software interrupt lockout.

6. Analog Output Program

As previously considered, the general approach employed for generating analog outputs is to employ external holding type operational amplifiers with the amplifier output measured by the computer through the analog input system 308. The measured value is compared with the desired value and the difference is employed in determining how long raise or lower contact closure outputs must be closed to make the holding amplifier integrate to the desired value. The raise or lower value is computed in tenths of a second, and it is determined by an element of the analog output program 612, which is run on a secondary level while the actual contact closure output pulsing is performed by a pulser element of the analog output program 612, run on a dominant level every tenth of a second. The secondary level analog output program element is run every second for speed reference and load limit and every 5 seconds for the remaining outputs.

The foregoing brief discussions of system components 2 through 6 are herein included to provide in summary form a general description of the control environment which is more fully described in copending U.S. application Ser. No.82,470, Sections D2 through D6, pages 101 through 115.

7. Sequencing Program a. Functional Philosophy

Figure 18:
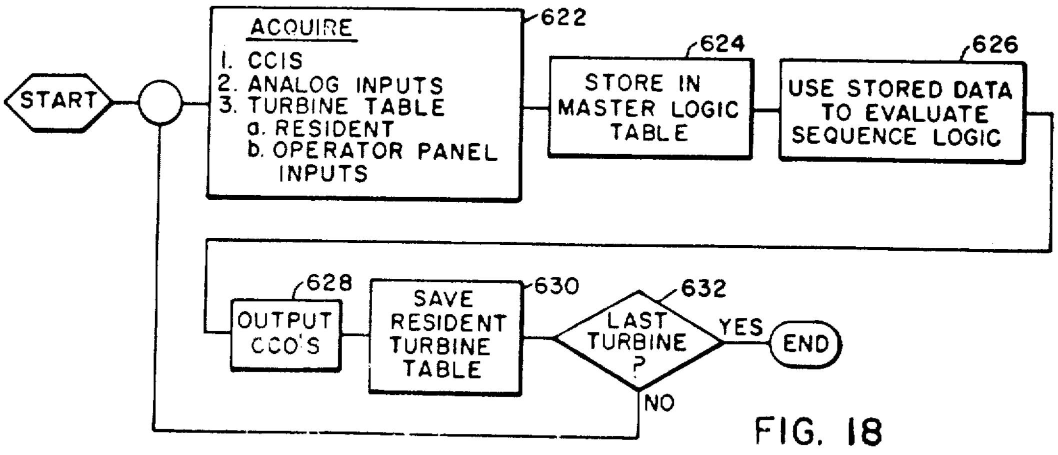
FIG. 18 illustrates a flowchart for a sequencing program associated prinicipally with startup operations for the gas turbine.

Generally, the sequencing program 600 is represented by a flowchart shown in FIG. 18 and it is run once every second to provide the plant sequencing operations required during turbine startup, to provide certain alarm detections and to provide sequencing for various plant tasks during time periods other than the turbine startup time period. As indicated by block 622, certain information regarding the status of the turbine plant 100 and other controlled plants is required for sequencing program execution. The required plant status information which is acquired includes continuous analog data and contact input closures generated by operator panel switches, pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for use by those programs. As indicated by block 628, the results of the evaluation of the sequence logic may also require certain contact closure outputs. In block 630, a resident table of turbine data acquired from core memory by the acquisition block 622 is saved in the original core memory location while non-resident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is reexecuted for the next turbine and the process is repeated until the last turbine has been serviced with sequence logic processing in the current sequencing program execution.

Figure 19:
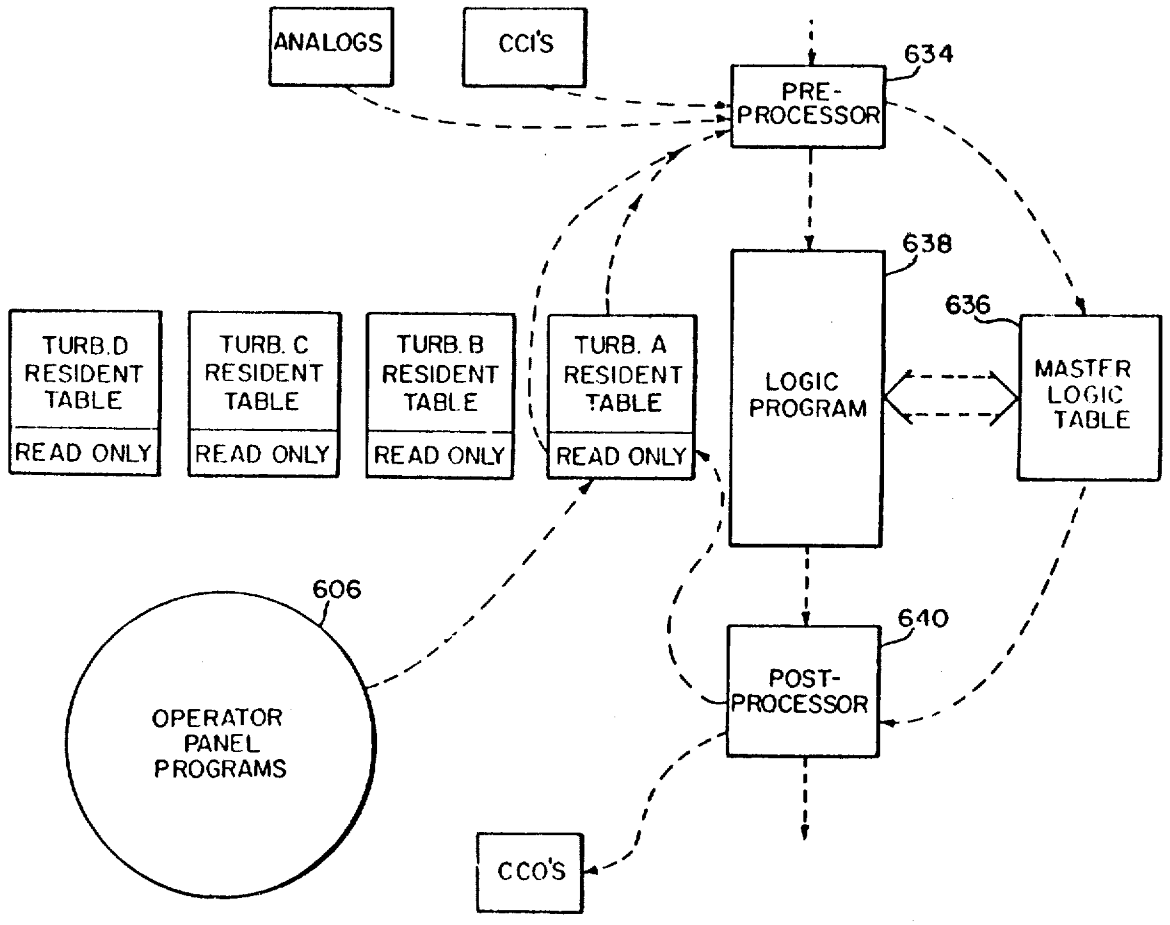
FIG. 19 shows a data flow diagram which illustrates the manner in which the sequencing program is executed to provide multiple power plant operations with a single control computer.

In FIG. 19, there is illustrated a data flow map for the sequencing program 600. As shown, there are four turbine data tables for the rsepectively designated gas turbines A, B, C and D. Each gas turbine data table comprises a resident portion and a read only portion which is derived from the operator panel program 606. A preprocessor block 634 corresponds to the block 622 shown in FIG. 18, and it obtains data from analog inputs, contact closure inputs, the resident turbine A table and the read only turbine A table. The acquired data is stored in a master logic table as indicated by block 636 which corresponds to block 624 in FIG. 18. The master logic table is employed in the execution of logic program block 638 which corresponds to block 626 in FIG. 18.

After the sequence logic has been evaluated by the program 638, a postprocessor 640 is entered and it corresponds to blocks 628, 630 and 632 in FIG. 18. Thus, contact closure outputs are generated and the turbine A resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been employed, an exit is made from the postprocessor block 640.

b. Sequencing Program Table Data Tables and Preprocess and Postprocess Routine

Information on core organization of the turbine read/write and read only tables, contact closure input and output data tables, the master logic table and turbine alarm data tables may be found in Section D7*b*., pages 117 to 150 of the aforementioned copending application Ser. No. 82,469. Additional information on the contact closure input routines, analog input routines, contact input and contact closure output routines employed in blocks 622 and 628 is included therein.

c. Plant Sequence Functions

Generally, the sequence control subsystem embraces certain logic operations which provide for an orderly advance of the process through startup, run and shutdown operations while providing many operating advantages. In providing sequence operations, the sequence control subsystem includes the sequencing program which interacts with the control program and with plant devices to provide direction to process events and simultaneously to provide plant and turbine protection.

In the startup process, a programmed computer master contactor function and operation selectors are employed to force the sequence of starting and operation to assure that turbine startup will normally take place over a fixed predetermined time interval. The software master contactor serves to establish and disestablish logic conditions necessary for initiating the making and breaking of external control circuits for equipment startup and shutdown operations under predetermined plant and equipment conditions.

After ignition, programmed sequencing logic causes the control system 300 to be placed in Mode 1 operation and the gas turbine speed reference is increased in a program controlled nonlinear manner to determine the fuel valve positioning.

When the turbine 104 has been advanced to idle (or top or synchronous) speed, it is ready to be synchronized and the control system 300 is transferred to Mode 2 operation in which either manual or automatic synchronizing is performed following field breaker closure. When the turbine-generator unit is synchronized and the generator breaker is closed, the control system 300 is transferred to Mode 3 or Mode 4 operation and the speed reference is set at a value of 106% rated speed. Load is ramped to a predetermined level at a predetermined rate under programmed computer operation.

Shutdown of the gas turbine is caused if any of three time checks fail during the startup sequence. The first time check measures time from initiation of the master contactor function to ignition speed. In addition, a check is made on the time from detection of flame in combustor baskets to 60% speed. Further, a check is made on the time from starting engine trip at 60% rated speed to idle speed.

d. Sequence Logic Charts

Figure 20A:
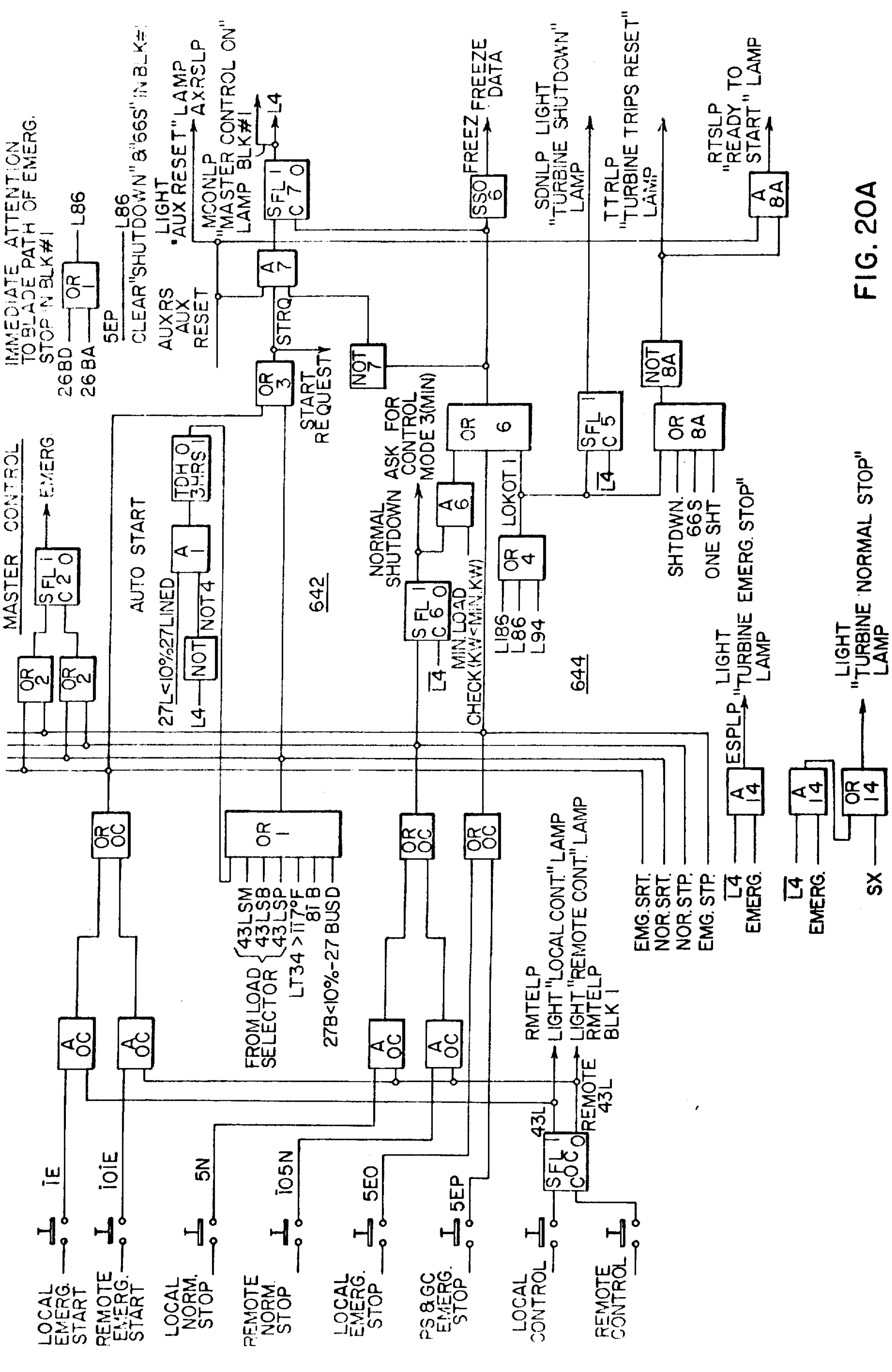
FIGS. 20A–B shows a logic diagram representative of the sequencing logic performed by the sequencing program.
Figure 20B:
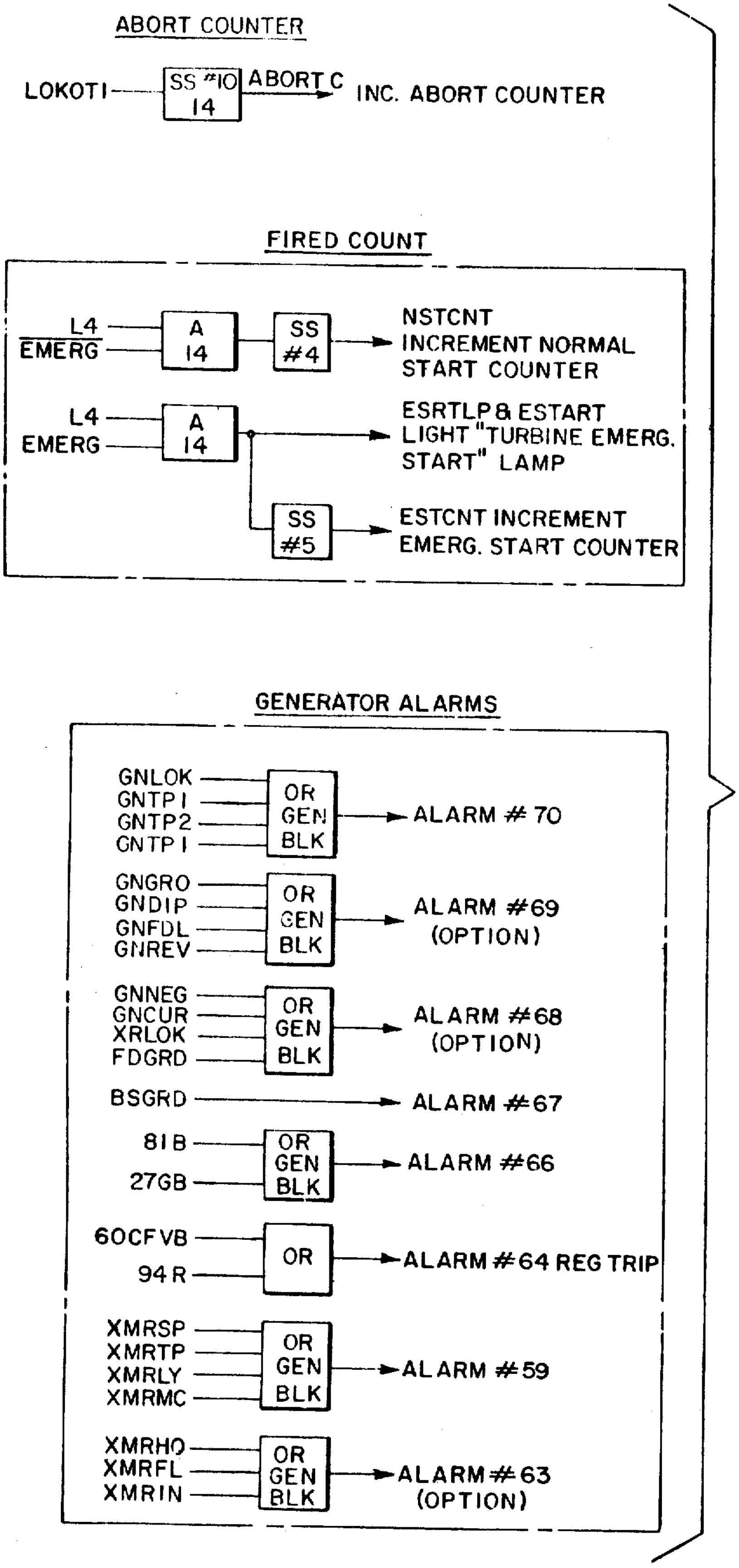

In FIGS. 20A and 20B, there are shown logic diagrams of representative alarm and sequencing functions performed by the sequencing program 600 in the block 626 (FIG. 18) each time it is executed. Predetermined logic building blocks are employed in defining the conditions for the performance of the sequencing program functions. Each block contains a symbol identifying its function and a number of alpha-numeric character providing a program block identification. The logic function identifying symbol is generally located above the program block identification character. The following is a list of the logic symbols and the logic functions to which they correspond:

| | |
|---|---|
| A | And |
| OR | OR |
| FL | FLIP FLOP |
| SS | SINGLE SHOT |
| DB | DEAD BAND |
| NOT | INVERSION |

-continued

| | |
|---|---|
| TDH | TIME DELAY - HOURS |
| TDS | TIME DELAY - SECONDS. |

On

There is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flip FL7 when a shutdown is initiated. In the logic diagram 644, alarm shutdowns are initiated by line L86 through block OR4. On shutdown, single shot block 6 provides for registering predetermined data.

Other sequencing program logic functions set forth in logic diagram form in FIGS. 20A and 20B include a plurality of generator alarms designed as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

Further description of the plant sequence functions, associated sequence logic charts, macro instructions for sequencing logic and logic subroutines and macros related thereto may be found in the aforementioned copending U.S. application Ser. No. 82,467, Section D7*c.* through D7*e.* found at pages 151 to 164 thereof.

8. Control Program

The following brief discussion of a control program suitable for use in the preferred embodiment of the present invention may be considerably amplified by a reference to the corresponding section of one of the aforementioned copending U.S. applications, e.g., Ser. No. 82,470.

Figure 21:
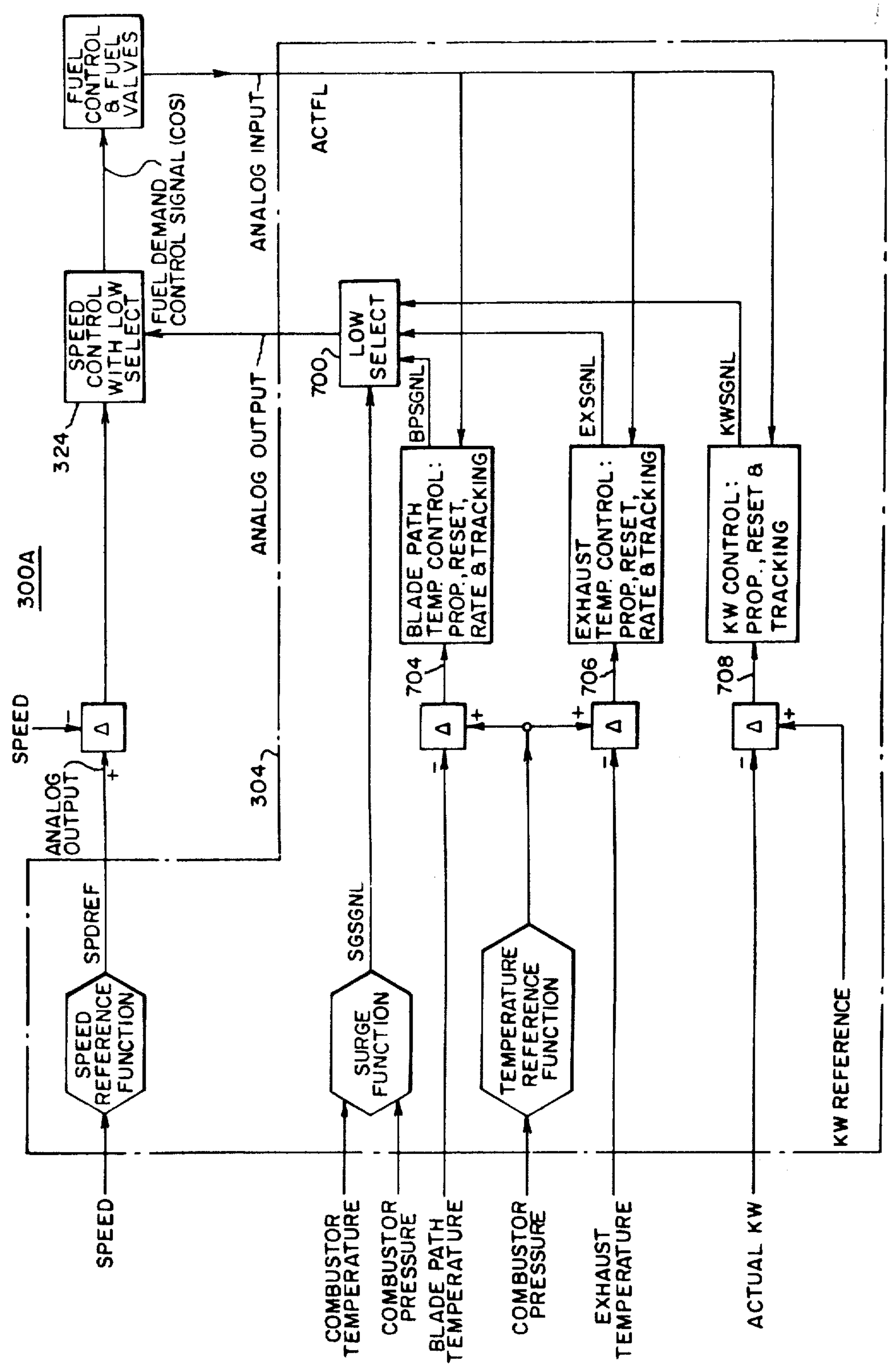
FIG. 21 shows a block diagram of a control loop arrangement implemented in the preferred embodiment.

As indicated in FIG. 17, the control program 602 interacts with the sequencing program 600 providing control loop determination of the operation of the gas turbine plant 100 and like plants if provided. A preferred control arrangement is considered in FIG. 21. Upon determination by the sequencing program 600 of the control mode in which the control program 602 is to be operated and the accomplishment of the sequencing steps previously discussed, control program 602 becomes active, operating in the control loop arrangement 300A. The hybrid interface depicted provides for software speed reference generation and selection of a single low fuel demand limit in software low select block 700 for application to analog hardware speed control 327.

The output fuel demand signal is selected as the lowest of a speed error fuel demand signal and the computer output fuel demand limit signal as previously considered. The actual fuel demand control signal ACTFL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Referring now to FIG. 22, execution of control program 602 proceeds as follows:

a. Preprocessing by block 710 of the resident control data table containing various parameters indicating current turbine status and a pointer to the sequencing table which contains a control mode indicator and the selected load and start-up status;

b. Analog control program data acquisition including blade path, exhaust and compressor inlet temperatures, combustor shell pressure, actual fuel demand signal and actual kilowatt output;

c. Reliability testing of acquired analog temperature readings to prevent overheating of critical turbine parts;

d. Execution of turbine control block 712, to be hereinafter outlined;

e. Block 716 postprocessing including table updates as indicated by the circular data flow.

The foregoing steps are repeated cyclically for turbines B, C and D, if provided.

Figures 23, 30:
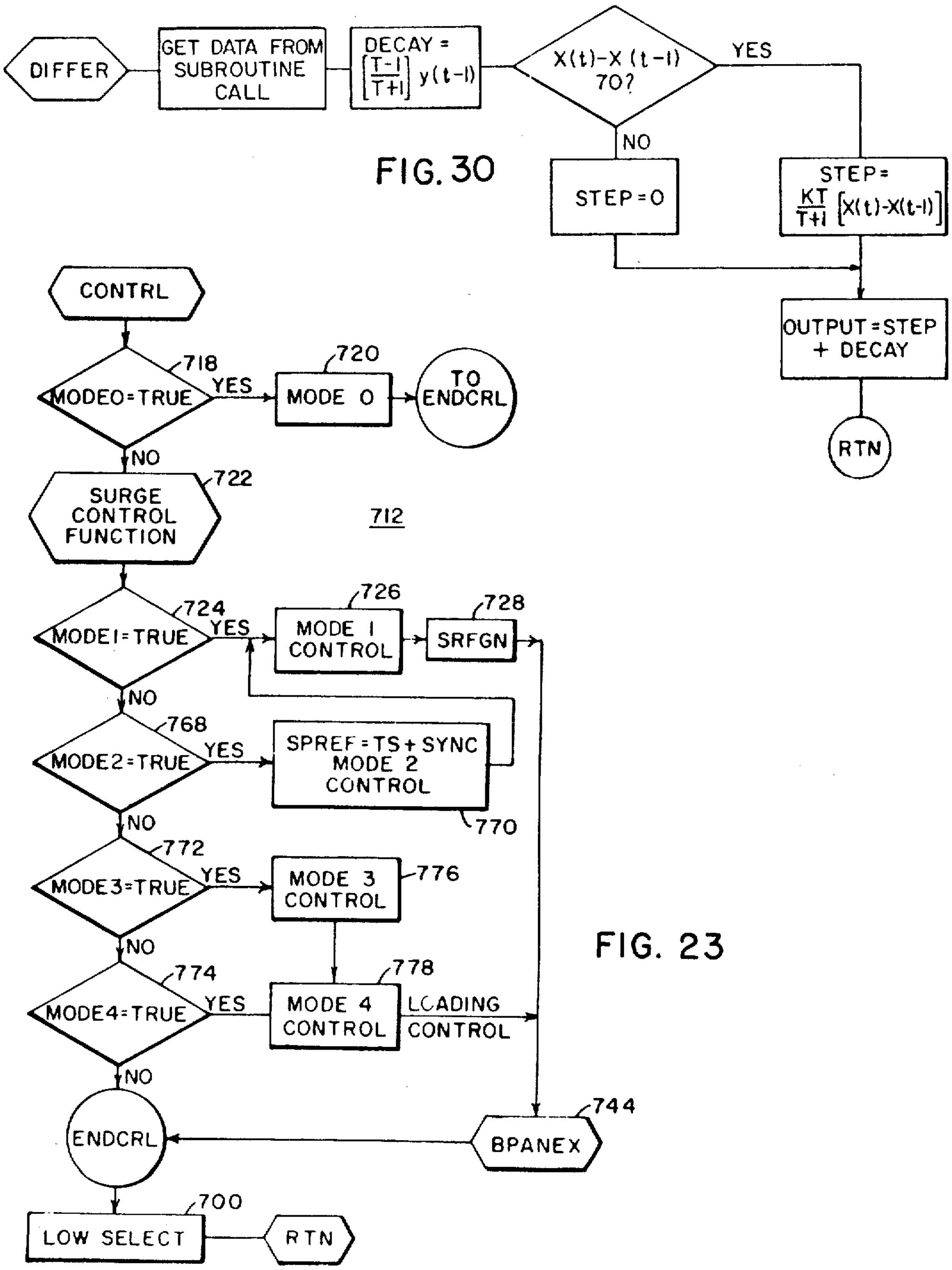
FIG. 23 illustrates a flowchart which represents control program operations in the preferred embodiment.
FIG. 30 shows a flowchart for a rate function employed in temperature limit operations.

Turbine control block 712 is shown in greater detail in FIG. 23. As shown, control actions are directed consistent with turbine control mode directives. If block 718 determines that the turbine is in Mode 0 status, initialization is accomplished by the execution of block 720. Actual turbine speed tracking is provided so that a smooth transition is made in the computer generated speed reference during transfer from Mode 0 to Mode 1.

Figure 31A:
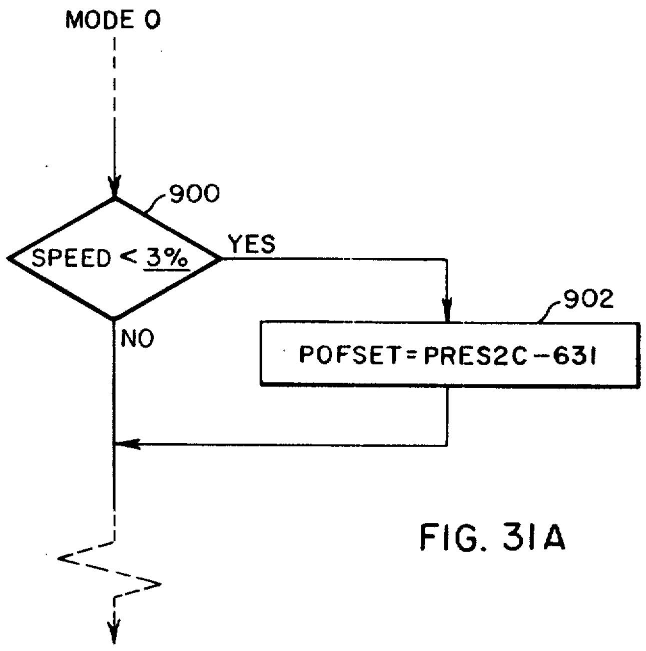
FIGS. 31A–B show flow diagrams for the program steps employed in accomplishing the dynamic calibration and error correction of the present invention in operating Modes 0 and 1, respectively.

Referring to FIG. 31A, a flowchart is shown for those steps of the control program implemented in accordance with the principles of the present invention which are executed in Mode 0. Block 900 determines whether the turbine has reached a speed corresponding to that desirably attained at light-off. As shown an offset value is computed as the difference between a scaled analog input value PRES2C (½ the combustor shell pressure) and a constant $631_8$ which is the actual equivalent of ½ the number corresponding to 1 volt, the voltage level representing a pressure transducer reading of 0 psig. (Various scaling techniques are used throughout the control program system. In this instance results are carried at half value). Execution of block 902 occurs once each second until light-off. Thus, upon the occurrence of such event location OFFSET contains a scaled number representative of an error attributable to instrumentation drift at shutdown, i.e., drift compensation is dynamic through initial program execution and becomes fixed at the shutdown value at light-off. In this manner improper transducer rezeroing is eliminated.

If the control is not in Mode 0, block 722 next determines the surge control function for use in the surge control loop (FIG. 21) in all other modes of operation. To prevent compressor surge under excessive pumping demands, the surge control function determines a maximum fuel demand limit as a function of the compressor inlet temperature and the combustor shell pressure. A discussion of the surge limit function determination may be found in copending U.S. application Ser. No. 82,470, beginning at page 186 thereof. Analog inputs representative of temperature are reliability checked as described in copending related U.S. application Ser. No. 155,905. Combustor shell pressure readings are extremely accurate, having been obtained as a result of the dynamic calibration and error correcting system and method of the present invention.

In mode 1, control block 726 is executed to provide acceleration control from ignition speed of approximately 1000 RPM to the top speed of 4894 RPM. Fuel demand signal tracking is provided and a nonlinear temperature reference is generated in a manner similar to that employed in surge limit functional determination, again, as discussed in the aforementioned copending U.S. application, Ser. No. 82,470. Temperature references as a function of combustor shell pressure are determined for both normal and emergency startups.

Repeated executions of the control routine 712 are made during the time period that the gas turbine 104 is placed under sequencing and acceleration operations in Mode 1 control. A speed reference for analog output to the speed control 327 is provided in block 728. Such reference is derived from previously input nonlinear curve representative of optimum fixed time acceleration for both normal and emergency startup as previously indicated. A linear interpolation routine similar to that described in connection with the surge limit functional determination is employed to derive acceleration values at working time points between the time points corresponding to the stored curve points. The speed reference algorithm may be found at page 50 of copending U.S. application Ser. No. 82,470.

Figure 24:
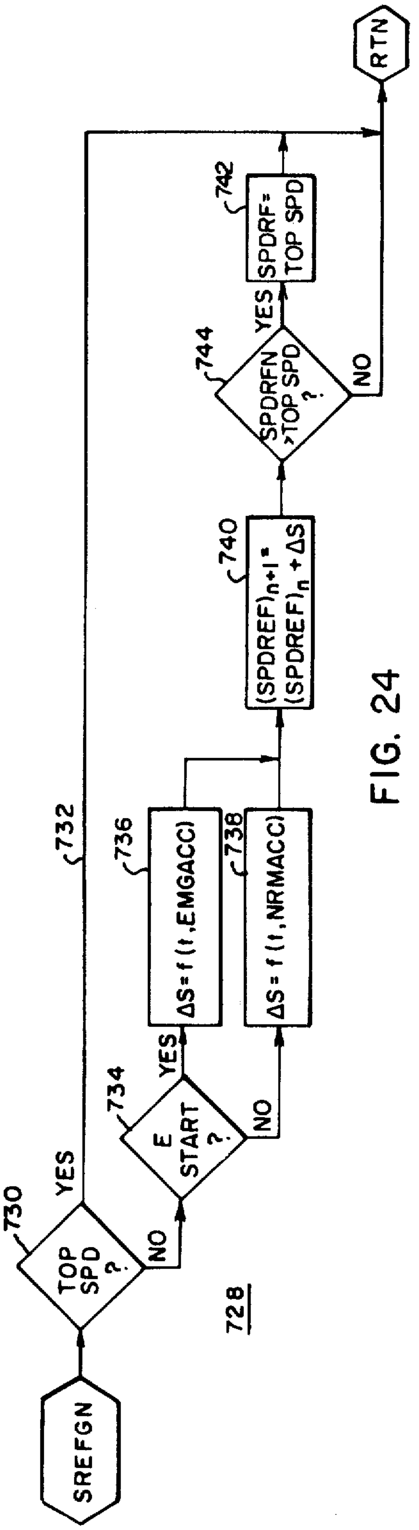
FIG. 24 shows a more detailed flowchart for a speed reference generation function included in the program of FIG. 23.

The speed reference generation program is shown in greater detail in FIG. 24. Block 730 first determines if the gas turbine 104 has attained top or substantially synchronous speed. If this condition is satisfied, the speed reference routine is bypassed and a return is made to the turbine control program execution. If not, block 734 determines whether an emergency start has been requested. Block 736 and 738 correspond respectively to emergency and normal startups, and as shown a change in the speed reference required for the next sampling time interval is calculated. In block 740, the speed reference step change is added to the preceding speed reference.

A top speed limit is next placed on the speed reference by block 742 if block 744 detects an excessive speed reference value. If not, the speed reference value is stored and a return is made to the execution of the control block 712.

Figure 25:
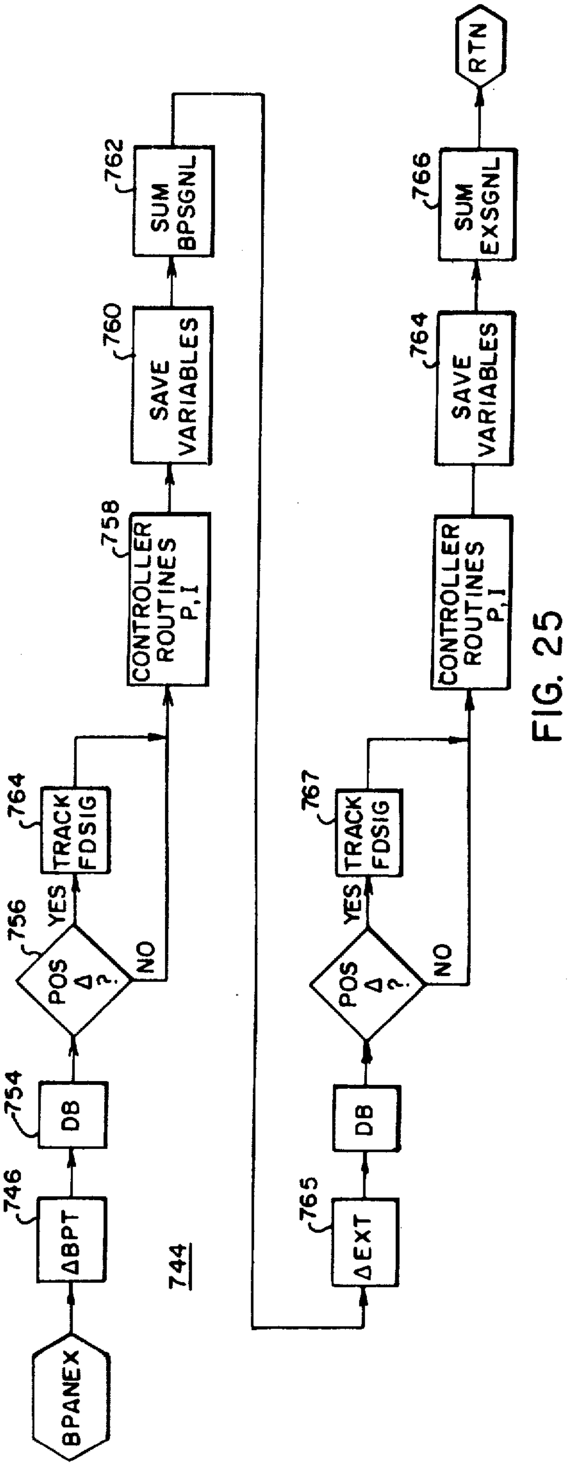
FIG. 25 shows a more detailed flowchart for a gas turbine blade path and exhaust temperature limit function employed in the program of FIG. 29.

Temperature control is provided as shown in FIG. 25. In the temperature limit routine 744, a temperature error is first determined by taking the difference between the temperature reference previously derived and the actual and preprocessed average blade path temperature. The output of block 746 is compared with a predetermined deadband in block 754. If an error exists outside the deadband, the sign is determined in block 756. If the blade path temperature error is negative, control action is imposed by block 758 with a proportional routine and an integral routine. Blade path temperature and temperature error variables are stored by block 760 and block 762 sums the results of the proportional and integral operations of block 758 to generate the blade path output limit representation BPSGNL.

If the blade path temperature error is positive, fuel demand signal tracking block 764 is executed so that faster control action may follow a change in temperature error from positive to negative, since through this device the reset routines do not have to integrate back from some saturated output value. In particular, the tracking action is such that the reset block output never exceeds the fuel demand signal by more than a difference value.

To obtain the tracking action, the desired difference value is added to the low selected fuel demand signal and the result is differenced from the output of a reset or integrator routine and applied to the input of the reset routine. The output of the integration operation accordingly tracks the fuel demand signal with a positive bias. Such tracking operation allows the tracking control loop to enter quickly into fuel control if required by a change in the error quantity controlled by the tracking control loop. The integration routine may be found at page 202 of copending U.S. application Ser. No. 82,467.

After execution of the block 762, the exhaust temperature control or tracking action is determined in a series of blocks similar to those just considered in connection with blade path temperature control and tracking action. Further, a save variable block 769 provides for storing the exhaust temperature error and the track function output initiated by block 769. After the exhaust temperature output limit is determined in block 766, a return is made to the routine 713 in FIG. 23. Next, a software low selection is made by block 700 in Mode 1 control program execution.

Figure 31B:
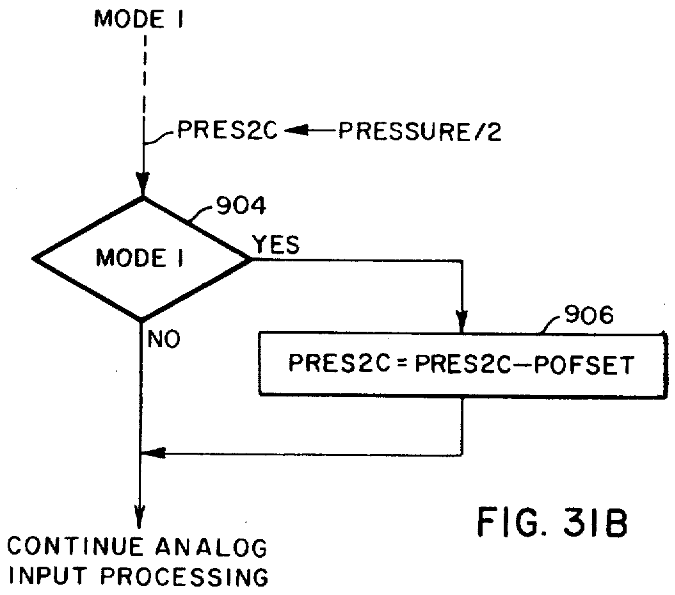

Throughout Mode 1, drift offset error corrections are made in deriving a combustor shell pressure value for use in surge limiting. Referring to FIG. 31B, the initial pressure value obtained from an analog input table is divided by 2, consistent with internal program scaling previously discussed, and stored in PRES2C. If Mode 1 program switch is set on (block 904), the value in PRES2C is replaced by the value PRES2C - OFFSET as indicated at 906. Thus, the dynamic calibration and error correction steps of the present invention are accomplished.

Consistent with the assumption that the pressure transducer is calibrated over its full range and that the error is in the form of a constant offset, then any transducer reading is given as:

$$P2C_{transducer} = P2C_{actual} + P2C_{error}. \qquad (1)$$

When the unit is on, turning gear $P2C_{actual}$ should equal zero. Thus (1) becomes $$P2C_{transducer} = P2C_{error}. \qquad (2)$$

Therefore, a reading taken at shutdown in a direct measure of the error. After start, a corrected pressure reading may be obtained by substracting $P2C_{error}$ from $P2C_{transducer}$. Thus, $$\begin{aligned} P2C_{corrected} &= P2C_{transducer} - P2C_{error} \\ &= P2C_{actual} + P_{error} - P_{error} \qquad (3) \\ &= P_{actual} \end{aligned}$$

To briefly examine an example of the operation of the principles of the present invention, consider the case where the pressure transducer had returned to a 1 lb. setting instead of to 0. This would be read and noted by the computer and saved in memory. If the transducer slowly drifted back toward 0 during the shutdown period, the successive changes would also be noted. Assume that upon restarting P2C reads 0.6 pounds. Then the reading saved would be 0.6 lbs. Thus at startup $P_{corrected} = 0.6_{psig} - 0.6_{psig} = 0$. All future readings would then be offset by a similar amount.

One synchronous speed is reached, block 768 in FIG. 23 directs the program into Mode 2 control operations. In block 770, the speed reference is set equal to the top speed value plus any speed change entered into the control loop by manual synchronization operations or by automatic synchronization program execution. Further, the program operations are redirected through blocks 726, 728, 744 and 700 as in the case of Mode 1 control.

Figure 26A:
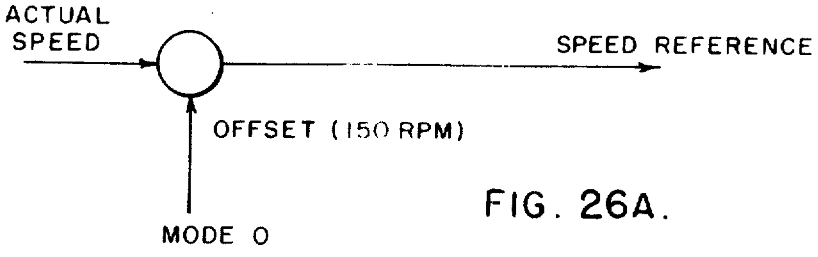
FIGS. 26A–D shows respective control configurations of software elements associated respectively with Mode 0 through Mode 4 operations.
Figure 26B:
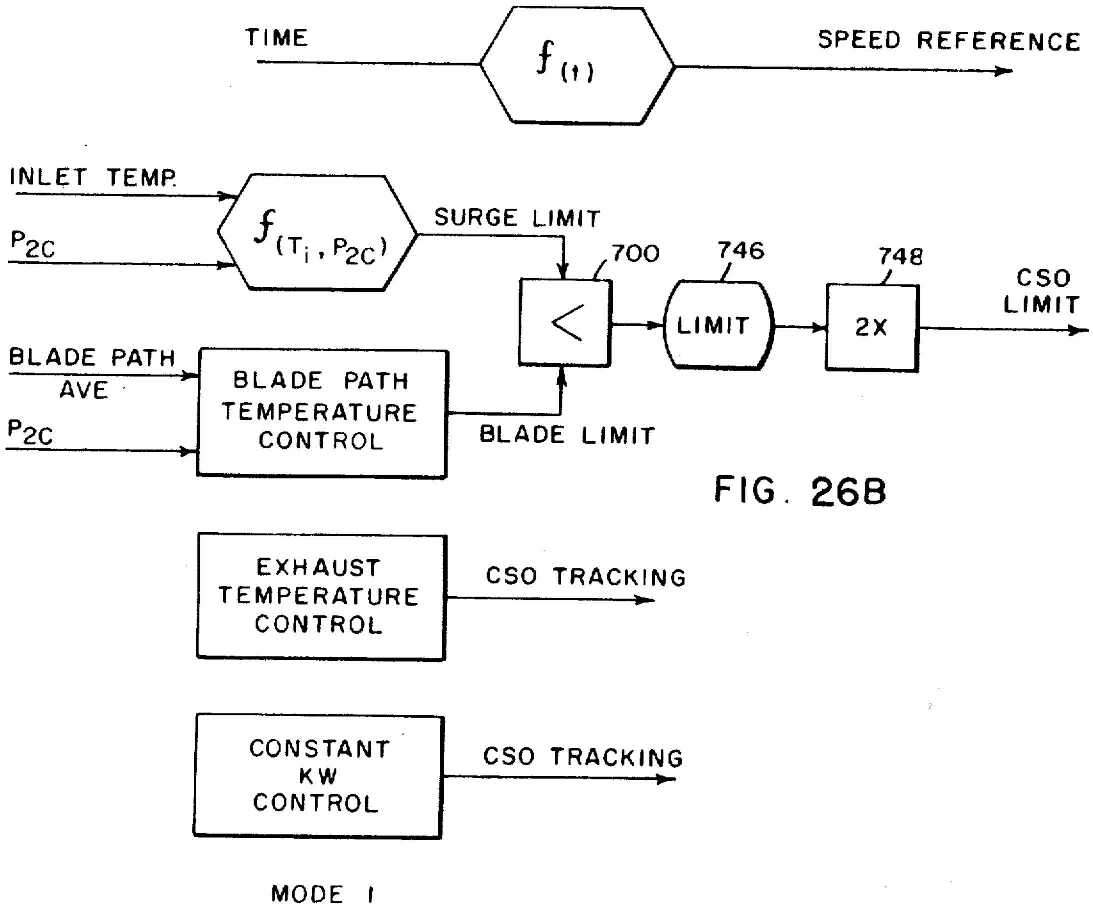
Figure 26C:
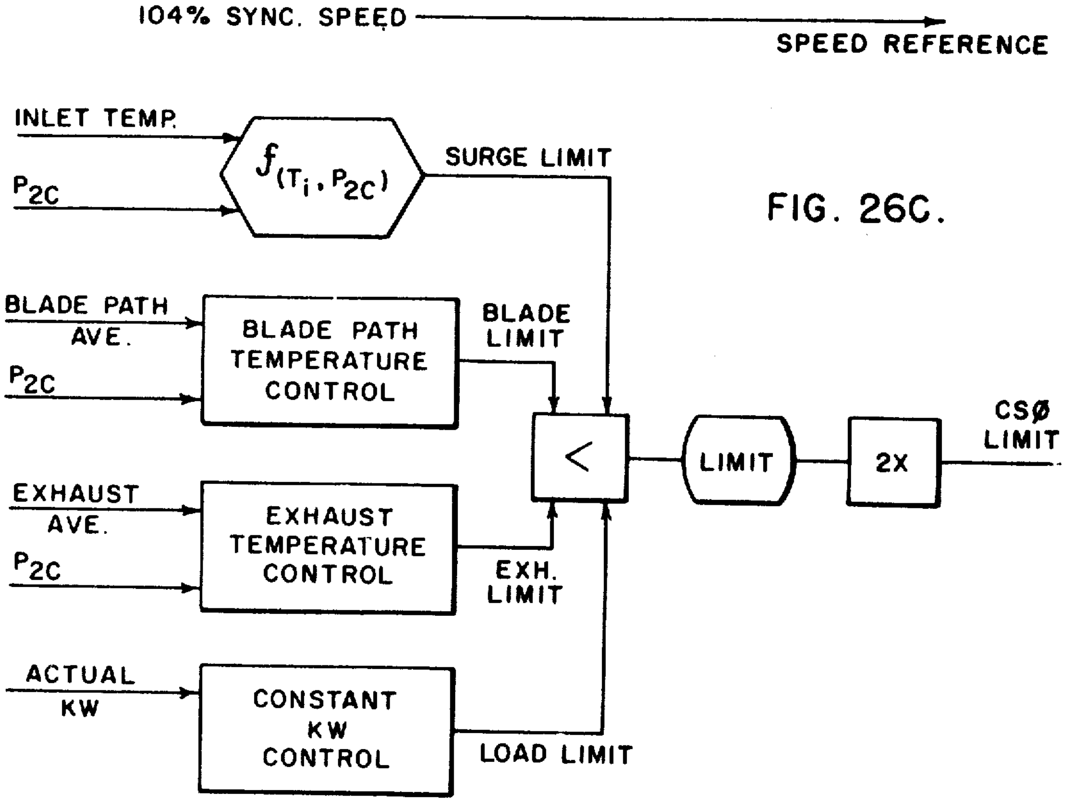

After synchronization, block 772 or 744 directs control program operations to a Mode 3 control block 766 or a Mode 4 control block 778 according to the operator's panel selection. Mode 3 control, depicted in FIG. 26C, provides for determining kilowatt error from the difference between a kilowatt reference and actual kilowatts. Proportional and integral control routines are then applied to the kilowatt error and the resultant controller outputs are summed in order to provide for constant kilowatt control with temperature limit backup. Further, a loading rate limit is imposed to prevent excessive thermal transients due to excessive loading rates under automatic or manual incremental loading. A discussion of the loading limit subroutine and its operation in Modes 1, 2 and 3 may be found at page 194 of copending U.S. application Ser. No. 82,470.

Initially, in Mode 3 operation, the kilowatt reference is set at a minimum value pending operator selection of a reference value which may not exceed a value corresponding to the base load exhaust temperature limit. Thus, the primary Mode 3 controls are the exhaust temperature control and the constant kilowatt control, with blade path and surge controls providing backup protection.

Figure 26D:
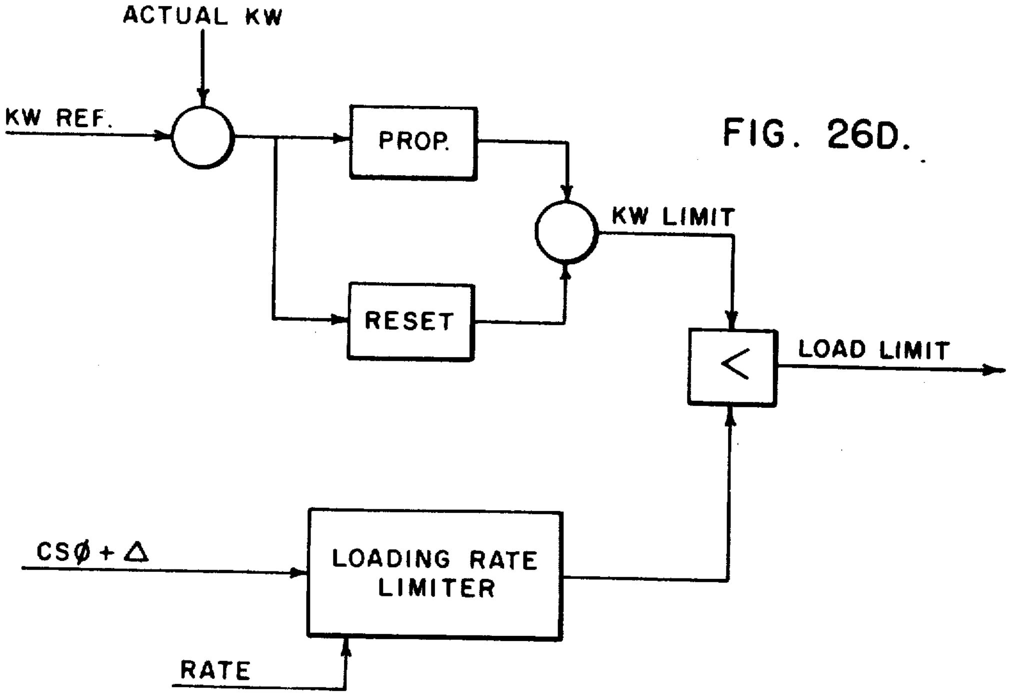
Figure 27A:
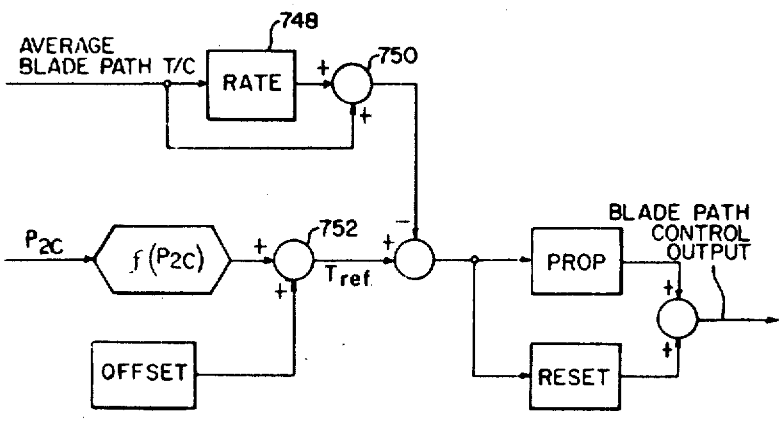
FIGS 27A–B respectively show software control configurations for the blade path temperature and exhaust temperature limit functions.
Figure 27B:
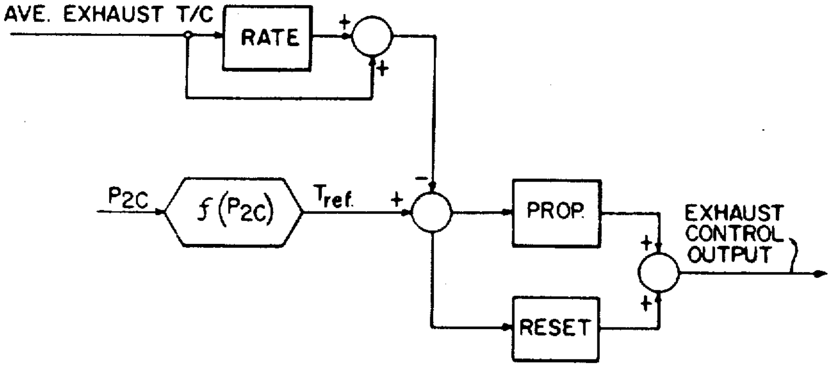
Figure 28:
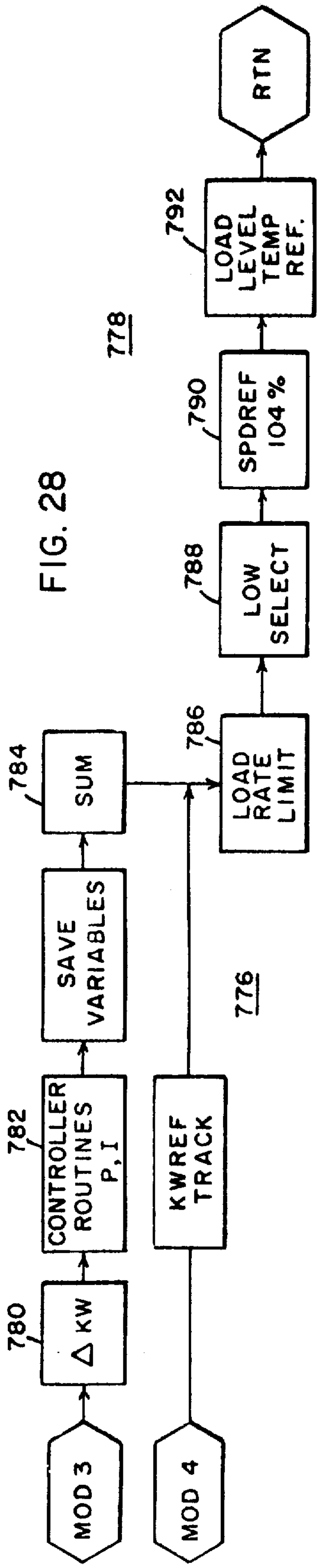
FIG. 28 shows a flow diagram for control program operations which provide load control and load limit functions for the gas turbine power plant.
Figure 29:
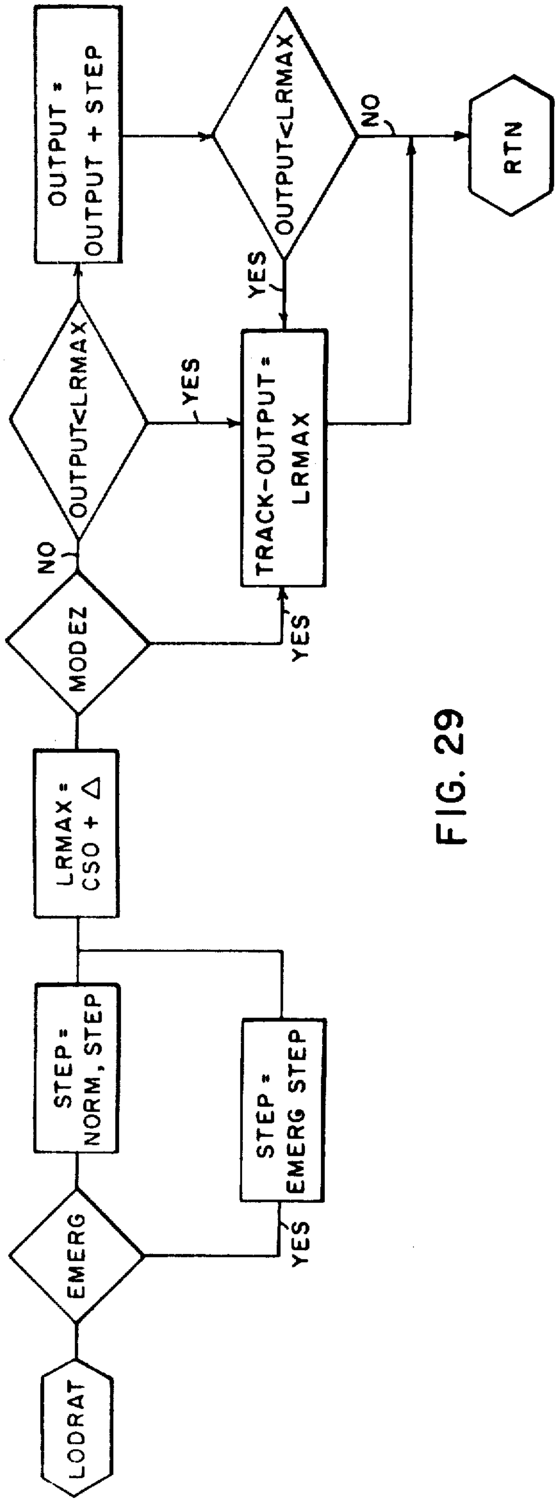
FIG. 29 illustrates a flowchart for a load rate limit function employed in the load control and limit operations illustrated in FIG. 28.

Mode 4 control (FIG. 26D) differs from Mode 3 control in that no constant kilowatt function is provided for Mode 4. However, a loading rate limit is imposed. A temperature reference is determined for use in the blade path and exhaust temperature limit control block 744.

In both Mode 3 and Mode 4, the block 744 is executed in a manner considered previously in connection with Mode 1. Since no constant kilowatt function is provided for Mode 4, the block 744 provides for a temperature loading operation through exhaust temperature limit action. Under temperature control, the generated power varies with the ambient error temperature such that more power is generated with lower inlet air temperature.

Load Mode 3 and load Mode 4 program executions are completed through low select block 700 which selects the lowest fuel demand representation associated with the temperature, surge and load limits to provide the control operation as described. Control program execution through the block 766 and/or 788, 744 and 700 continues for the duration of Mode 3 or Mode 4 load control.

A second application of the principles of the present invention may be best appreciated by a reference to the aforementioned copending related U.S. application Ser. No. 99,491 wherein there is presented an automatic synchronization system and method suitable for use in the gas turbine power plant of the present invention. Other applications of the principles of the present invention exist where there arises a need for calibration of the various instrumentation from which analog signals are derived. Dynamic calibration and corrections as herein described may be applied to instruments and to analog signals over the various gas turbine operating modes. Such signals may be derived at widely varying sampling rates.

As concerns dynamic calibration and error correction as applied to the aforementioned automatic synchronization system and method, there exists a one-to-one correspondence between the steps required to insure precise 5 volt readings at 0 phase angle difference at breaker closing and those required to eliminate errors due to combustor shell pressure transducer drift. Flowcharts identical to those presented in FIGS. 31A-B may represent such steps performed in correcting phase angle instrumentation drift. Referring again to FIG. 31A, blocks 900 and 902 might be replaced respectively by a block for determining an event at which a constant drift offset is to be finally computed and a block for performing the offset computation.

Reference is made to FIG. 16A. Attention is directed to operational amplifier block 464 and to volt-meter 466. Relating the calibration and error correction techniques of the present invention to the automatic synchronization function; a reading on meter 466 of 5 volts, and equivalently an analog input to the control system of 5 volts, represents a generator and power system waveform phase angle difference of 0°. A waveform phase angle difference of 180° is represented by a voltage level of 0 volts. An internal computer representation of 5 volts is $10000_8$.

The 5 volts ($10000_8$) is used as an aiming point value in synchronizing the turbine generator with the power system. As readily appreciated, the operational amplifier block 464 must furnish an output of 5 volts at phase coincidence. Experience has shown that this may not be the case. The problem has existed that drift or change in the output signal used for comparison with an internally stored value representative of the aiming point (ideally $10000_8$) can go undetected causing the breaker to close early or not at all, depending on whether the signal has increased or decreased.

In the flowchart block 900 one might substitute an event such as breaker closing. In this manner, block 900 would perform the task of differentiating between an actual 0 phase angle reading and the ideal value. The computation in block 902 would then be such as to derive an offset or difference value between the actual count and $10000_8$. For example, a computed value of $10031_8$ would indicate a $31_8$ drift from ideal.

An appropriate operation to be substituted in block 904 might be the determination that gas turbine operation had been advanced to Mode 2. As will be recalled this is the synchronizing mode. The offset value computed at the most recent breaker closing would then enter into the computation of a corrected phase angle difference for current phase angle matching. Thus, there is shown an application of the principles of the present invention in automatic synchronization. The calibration and correction techniques may be extended to other applications as well.

A variety of special control program macros and subroutines are employed in the preferred implementation of the control program 602. A discussion of such may be found in Section D8 of the aforementioned copending application Ser. No. 82,467, pages 198 to 203.

9. Alarm and Thermocouple Check Programs

In the alarm system, alarms are generated in response to sensors considered in connection with FIG. 9. Printout of alarms is made as in the following example:

| Time | Status | Turbine Identification | Description |
|---|---|---|---|
| 12:30 | ALRM | A | Flame A |

The status conditions of the alarms are listed below:

NORM - Normal
ALRM - Alarm

Alarms are determined by the sequencing program 600 and the thermocouple check program 616 as previously considered. The alarm program 610 is periodically executed to print out all points in alarm. Multiple confusing alarm lightings as encountered with conventional annunciator panels are thus avoided.

The thermocouple check program 616 also runs on a periodic basis. When it is executed, a check is made of the values stored for all thermocouples not checked by the control program 602 to determine if the thermocouple value is more negative than a predetermined check number stored in location CHKNO. An excessive negative number is considered an open circuit and an alarm bit is set for the alarm program 610.

10. Data Logging Program

A formated log is printed in response to execution of the log program 618 on a periodic basis selected by the plant operator within the range of 15 minutes to 2 hours. The printed readings are instantaneous values obtained from the last analog scan cycle. The plant operation may select any 20 analog points per turbine under control.

Generally, the analog conversion program 602 provides for converting entered analog values into the engineering value represented by the input and vice versa. Generally, four types of conversion are provided, i.e., flow straight-line, thermocouple, and segmented straight-line.

11. Miscellaneous Programs

The miscellaneous programs 622 include a programmer's console function program, a dead switch computer program, a power failure and restart program, and a horn and alarm lamp program. Additional programmer's console functions designated herein as being implemented by miscellaneous programs rather than the executive program include a CCI print status program, an analog engineering units print program, a contact output operate program, a test dead computer system program and a time program.

The alarm and thermocouple check programs, data logging program, and miscellaneous programs are more fully discussed in the aforementioned copending application Ser. No. 82,470, Section D9 to Section D11, pages 204 to 210.

The program system described in Section D herein substantially embraces that described in the corresponding section of application Ser. No. 82,470. Contained herein is the description of a preferred embodiment of an increment thereto giving rise to an enhanced monitoring and control capability.

Although the detailed flowcharts corresponding to the appended program printout may have certain differences from certain aspects of the described flowcharts, the list of programs do provide for an essential implementation of the subject matter described herein.

Most developed system software may be characterized with relatively minor faults known as bugs which sometimes take long periods of time to detect and/or diagnose. Ordinarily the correction of such faults is within the skill of control and system programmers. The program listing which follows accordingly may be expected to contain some faults of this kind but all such faults which have been detected have required only programmer's skill for correction in field applications.

```
-----------------------------------------------------
:   PROGRAM -        CONTROL                          :
:   COMPUTER -       WESTINGHOUSE P-50                :
:   GENERATION UNIT - 501-AA GAS TURBINE              :
:   DATE COMPILED - APRIL 1, 1971                     :
:                                                     :
-----------------------------------------------------
        EJE

                               THIS IS THE MACRO TO ENTER THE ACCUMULATOR
AL1     MAC FROM,INDIR
        ENL FROM,INDIR
        TER

                               THIS IS THE MACRO TO STORE THE ACCUMULATOR.
AS1     MAC WHERE,INDIR
        STL WHERE,INDIR
        TER

                               THIS IS THE TRANSFER MACRO.  IT TRANSFERS THE
                               CONTENTS OF ONE WORD INTO ANOTHER.
XFR     MAC FROM,TO
        ENL FROM
        STL TO
        TER

                               FOLLOWING IS THE LOGICAL SET MACRO.  IT IS USED
                               TO MAKE A VARIABLE EITHER TRUE OR FALSE.
                               THE TRUE CONDITION SETS THE MOST SIGNIFICANT BIT
                               =1 (NEG NUMBER), AND THE FALSE COND SETS THE
                               MOST SIGNIFICANT BIT =0 (+NUMBER).

MAK     MAC VAR,COND
        DLE COND*1
        CMB VAR
        DLE 1-COND*1
        SMB VAR
        TER

                               THIS IS THE P-50 JUMP TO MACRO. LABEL IS SOME
                               UNIQUE MNEMONIC.
JPT     MAC LABEL
        JMP LABEL
        TER

                               THIS IS THE IF MACRO FOR THE P-50.  IF THE LOGIC
                               CONDITION IS MET, THE JUMP WILL OCCUR.
IFF     MAC VAR,COND,LABEL
        DLE -VAR/VAR+1*1
        RSH VAR
        DLE COND*1
        PJP LABEL
        DLE 1-COND*2
        PJP L+2
        JPT LABEL
        TER

                               THIS IS THE DEADBAND MACRO.  THE INPUT, ON,
                               AND OFF ARGUMENTS MUST REFER TO ANALOG TYPE
                               QUANTITIES.
                               THE OUTPUT ARGUMENT IS A LOGICAL VARIABLE
                               AND MUST BE IN THE TURBINE RESIDENT TABLE.

DBD     MAC INPUT,ON,OFF,OUTPUT
        ENL ON
        SUB INPUT
        PJP L+3
        SMB OUTPUT
        JMP L+5
        ENL INPUT
        SUB OFF
        PJP L+2
        CMB OUTPUT
        TER
                               THIS IS THE MACRO FOR THE DIFFERENCING BLOCK.
                               EXIT WITH (AL) =PLUS - MINUS.  THERE IS A
                               CHECK FOR OVERFLOW INCLUDED IN THE MACRO.
DIF     MAC PLUS,MINUS
        EDR 0)
        ENL PLUS
        SUB MINUS
        RJP CHKOVF
        TER
```

–Continued

```
                     THIS MACRO UNPACKS THE WORD SPECIFIED
                     BY WORD INTO THE LOCATIONS SPECIFIED BY TABLE
                     THE FIRST WORD OF TABLE CORRESPONDS TO BIT 1 OF
                     WORD

UPK     MAC WORD,TABLE
        DLE -WORD/WORD+1*1
        ENL WORD
        RJP UNPACK
        DEC TABLE+13
        TER

                     THIS MACRO IS USED FOR A SUMMING BLOCK.  THE
                     RESULT IS LEFT IN AL, AND THERE IS A CHECK FOR
                     OVERFLOW
SUM     MAC N,I1,I2,I3,I4,I5
        EDR 0)
        ENL I1
        DLE 5-N
        ADD I5
        ADD I4
        ADD I3
        ADD I2
        RJP CHKOVF
        TER

                     THIS MACRO CAUSES THE CONTENTS OF THE 2
                     LOCATIONS - UPPER AND LOWER TO BE RIGHT
                     SHIFTED N TIMES  THE MOST SIGNIFICANT BITS
                     ARE IN UPPER.  THE CONTENTS OF BIT 0 IN UPPER
                     ARE SHIFTED INTO BIT 13 OF LOWER.

RSA     MAC N
        ENL N)
        RJP RSASUB
        TER

                     THIS IS THE MULTIPLY MACRO.  THE MACRO
                     PARAMETER SPECIFIES WHAT AL IS TO BE MULTIPLIED
                     BY.  THE RESULTS COME OUT W/ HIGH ORDER IN UPPER
                     AND THE LOW ORDER IN LOWER.

MPL     MAC BY
        RJP MULTPY
        DEC BY
        OCT LOWER
        STL UPPER
        TER

                     THIS IS THE DIVIDE MACRO.  IT DIVIDES THE
                     CONTENTS OF UPPER AND LOWER BY A SPECIFIED
                     NUMBER.  THE RESULT COMES BACK IN AL AND THE
                     REMAINDER IS LEFT IN UPPER.

DIV     MAC BY
        ENL UPPER
        RJP DIVIDE
        OCT LOWER
        DEC BY
        OCT UPPER
        TER
                     THIS IS THE CALL TO THE 2 DIMENSIONAL FUNC.
                     GENERATOR.  GIVE THE FUNCTION NAME, THE X VALUE
                     AND THE Y VALUE.
F2D     MAC FNAME,XVALUE,YVALUE
        ENL XVALUE
        STL VARIN1
        ENL YVALUE
        STL VARIN2
        ENL FNAME+NUMPTS+1)
        RJP 2DIMEN
        TER

                     THIS IS THE CALL TO THE 1 DIMENSION FUNCTION
                     GENERATOR.  GIVE THE FUNCTION NAME, AND THE
                     VALUE OF THE INDEPENDENT VARIABLE.

F1D     MAC FNAME,XVALUE
        ENL XVALUE
        STL VARIN1
        ENL FNAME+NUMPTS-1)
        RJP 1DIMEN
        TER

                     THIS IS THE DIFFERENTIATOR MACRO.  IT INITIATES
                     A JUMP TO THE DIFFERENTIATOR SUBROUTINE.  THE
                     INFORMATION FURNISHED INCLUDES - THE GAIN,
                     THE PAST VALUE OF THE INPUT, AND THE PRESENT
                     VALUE OF THE INPUT.
DFF     MAC TCON,OLDVAL,NEWVAL,OUTPUT,GAIN
        ENL TCON
        RJP DIFFER
        DEC OLDVAL
        DEC NEWVAL
        DEC OUTPUT
        DEC GAIN
        TER
```

–Continued

```
                    THIS IS THE INTEGRATOR MACRO.

       IGT      MAC GAIN,OLDVAL,NEWVAL,OUTPUT
                ENL GAIN
                RJP INTEGR
                OCT OLDVAL
                OCT NEWVAL
                OCT OUTPUT
                TER

                                  THIS MACRO CHECKS THE VALUE IN AL FOR A + SIGN
                                  IF THE VALUE IS +, THERE IS A JUMP TO LABEL
       IFP      MAC LABEL
                PJP LABEL
                TER

                                  THIS IS THE LOW SELECT MACRO.  IT SELECTS THE
                                  LOWER OF THE TWO INPUTS AND LEAVES ITS VALUE
                                  IN AL.

       LOS      MAC A,B,C
                ENL A
                SUB B
                PJP L+3
                ENL A
                JMP L+4
                ENL C)
                STL CONVAR
                ENL B
                TER
                EJE

                                  THE FOLLOWING ARE THE VARIABLES USED BY THE
                                  CONTROL PROGRAM

                                  ........ DDC SYSTEM TERMS AND SYSTEM
                                      CONFIGURATION DEFINED ..................
00001  TRUE     EQU 1
00000  FALSE    EQU 0
00000  XX       EQU 0
00000  AL       EQU 0
00005  NUMPTS   EQU 5             NUMBER OF POINTS PER FUNCTION

                                  TURBINE DESIGNATIONS DEFINED

00000  A        EQU 0
00001  B        EQU 1
00002  C        EQU 2
00003  D        EQU 3
                EJE
00000  UNIT     EQU A             ***** THIS IS AN ASSEMBLY FOR THE A UNIT ****
00002  NTURB    EQU 2             2 UNIT SYSTEM


                                      *****************
                                      *               *
                                      *               *
                                      *    OPTIONS    *
                                      *****************

                                  SET EMGOPT FOR EMERGENCY START OPTION
00001  EMGOPT EQU TRUE
                              SPEED R/L ADDRESS FOR UNIT A
27043  SPDA   8EQU NTURB*22-1+27000
00012  CTLLVL EQU 10              CONTROL PROGRAM LEVEL.
30400  CMASTR8EQU 30400
                                  MAXSPD IS TOP SPEED WHERE THE REF ROUTINE LEVELS
                                  OFF.
06426  MAXSPD8EQU 6426            = 102.3 PCT.
05612  BLDABS8EQU 5612  (=1200 DEG F ADC) MAX ALLOWABLE BLADE TEMPERATURE (1)
04610  EXHABS8EQU 1142*4          ABSOLUTE ALLOWABLE EXHAUST    TEMP

00400  TOPLOP8EQU 400
00416  TOPEND8EQU 416
00470  SPBPC 8EQU 470             SUB-PROGRAM ORIGIN TABLE.
00202  MULTPY8EQU 202
00204  DIVIDE8EQU MULTPY+2
01310  RELINK8EQU 1310            RELINQUISH SUBROUTINE START


06006  RMCHER8EQU 6006            IN AUTO SYNC
06012  UNEMPT8EQU 6012            IN AUTO SYNC
```

–Continued

```
                 EJE
                                    ....... SEQUENCING AND SUBROUTINE INTERFACE ...

                                    ***********************************************
                                    *                                             *
                                    *    THE FOLLOWING ARE DEPENDENT UPON THE     *
                                    *    LOCATION OF THE SEQUENCING PROGRAM       *
                                    *                                             *
                                    ***********************************************

24400    ANLOGA8EQU 24400
24000    PWR02 8EQU 24000

10000    RESA  8EQU 10000           TURBINE A SEQUENCING RESIDENT TABLE
00114    FRSPAK8EQU 114             FIRST PACKED WORD IS THIS FAR DOWN IN THE
                                    SEQUENCING RES. TABLE.
36400    2DIMEN8EQU 36400
36403    1DIMEN8EQU 2DIMEN+3
36410    UNPACK EQU 1DIMEN+5        LOCATION OF THE UNPACKING ROUTINE.
36464    VARIN18EQU 2DIMEN+64
36465    VARIN28EQU VARIN1+1        LOCATION OF FUNC. GEN. INPUT ARGUMENTS
                 EJE
                                    ....... ANALOG INTERFACE ................

                                    THE FOLLOWING ARE THE INDICES THE A/I POINTS
                                    WOULD HAVE IN A 1 UNIT SYSTEM
                                    COMMERCIAL ANALOG DEFINATIONS.

00117    LT9IX 8EQU 117

00156    LT1IX 8EQU 156
00162    LT5IX 8EQU LT1IX+4
00154    KWIX  8EQU 154
00012    INLIX 8EQU 12              LT33 INDEX
00166    CSOIX 8EQU 166
00170    CPRSIX8EQU 170
00152    SPDIX 8EQU 152
00172    EXA1IX8EQU 172
00173    BPA1IX8EQU EXA1IX+1
                 EJE
         ANL     MAC  NAME,INDEX
         NAME    8EQU INDEX*NTURB+NTURB-1+ANLOGA
                 TER

                                    THE FOLLOWING EQU CARDS DEFINE THE ANALOG INPUT
                                    VALUE LOCATIONS FOR THE A UNIT IN A SYSTEM
                                    WITH ANY NUMBER OF UNITS

                                    VALUE LOC FOR LT9 THE FIRST EXHAUST T/C
                 ANL  EXHVAL,LT9IX
24637    EXHVAL  EQU  LT9IX*NTURB+NTURB-1+ANLOGA

                                           LT1 VALUE LOC
                 ANL  LT1VAL,LT1IX
24735    LT1VAL  EQU  LT1IX*NTURB+NTURB-1+ANLOGA
                                           LT5 VALUE LOC
                 ANL  LT5VAL,LT5IX
24745    LT5VAL  EQU  LT5IX*NTURB+NTURB-1+ANLOGA
                                           KILOWATT OUTPUT
                 ANL  ACKW,KWIX
24731      ACKW  EQU  KWIX*NTURB+NTURB-1+ANLOGA
                                           INLET TEMPERATURE    LT33
                 ANL  TINLET,INLIX
24425    TINLET  EQU  INLIX*NTURB+NTURB-1+ANLOGA
                                           FUEL DEMAND    AFLIND
                 ANL  FUELDM,CSOIX
24755    FUELDM  EQU  CSOIX*NTURB+NTURB-1+ANLOGA
                                           CPMBUSTOR PRESSURE   COMBR
                 ANL  CPRES,CPRSIX
24761     CPRES  EQU  CPRSIX*NTURB+NTURB-1+ANLOGA
                                           ACTUAL SPEED   MNSPD
                 ANL  ACSPED,SPDIX
24725    ACSPED  EQU  SPDIX*NTURB+NTURB-1+ANLOGA
                                    EXHAUST AVERAGE
                 ANL  ANEXAV,EXA1IX
24765    ANEXAV  EQU  EXA1IX*NTURB+NTURB-1+ANLOGA
                                    BLADE AVERAGE
                 ANL  ANBPAV,BPA1IX
24767    ANBPAV  EQU  BPA1IX*NTURB+NTURB-1+ANLOGA
                 EJE
30400            ORG  CMASTR

                                    XXXXXXXXXXXXXXXXXXXXXXXXXXXXXXXXXXXXXXXXXXXXXX

                                           BEGIN CONTROL RESIDENT TABLE
                                    XXXXXXXXXXXXXXXXXXXXXXXXXXXXXXXXXXXXXXXXXXXXXX

30400    1STCRL SYN L               FIRST LOCATION FROM RESIDENT CONTROL TABLE

                                    THE VARIABLES 26B AND 26E ARE SET FOR THE
                                    SEQUENCING PROGRAM, WHEN IT FINDS THEM SET,  IT
                                    ALARMS AND CAUSES SHUTDOWN.

                              ...... FOLLOWING ARE THE DIFFERENTIAL TEMP. ERROR
                                    ALARMS SET WHEN ACTUAL TEMP. EXCEEDS THE REF
                                    BY A GIVEN AMT
```

–Continued

```
00000  26BD   OCT               BLADE DIFFERENTIAL ERROR
00000  26ED   OCT               EXH.  DIFFERENTIAL ERROR

                         ...... FOLLOWING ARE ABSOLUTE OVERTEMPERATURE ALARMS.
                                THEY ARE SET IF ANY 1 T/C EXCEEDS ITS SPECIFIED
                                MAX. VALUE

00000  26BA   OCT               BLADE ABSOLUTE ALM
00000  26EA   OCT               EXH   ABSOLUTE ALM

00000  LASLOD OCT          LOAD BITS FROM PREVIOUS PASS THROUGH PROGRAM.
00000  FRACT  OCT       B5 ACCUMULATED FRACTIONAL PART OF THE SPEED REF.

                        EJE
                                     ***************************************************
                                          THE FOLLOWING 2 VARIABLES ARE THE ONLY
                                          OUTPUTS FROM THE CONTROL PROGRAM.
                                          THEY ARE THE SPEED REFERENCE AND THE
                                          CSO LIMIT
                                     ***************************************************

        30406  SPDREF SYN L          ADC VALUE FOR SPEED REF
30406   00000  SPDOUT OCT            SPEED REFERENCE FOR OUTPUT ALREADY IN CORRECT
                                     UNITS.
30407   00000  LOWEST OCT            LOWEST OF THE CONTROLLER OUTPUT SIGNALS.
                                     THIS VALUE IS READY FOR OUTPUT.  IT IS THE
                                     TEMPERATURE LIMIT ON CSO.

30410   30406  PBADR  OCT SPDREF     ADDRESS TO BE CHANGED BY R/L PB S  VARIES W/ MOD

        30411  SECBAK SYN L          COUNT TO DELAY 26BD, 26ED ALARMS IN GOING FROM
30411   00000         OCT 0          MODE 3,4 TO 2.

30412   00000  CONVAR OCT            THE CONTROLLING VARIABLE IS DETERMINED
                                     BY LOOKING AT THIS WORD IN THE DESIGNATOR REG.
                                     THE VARIABLE CAN BE DETERMINED AS FOLLOWS

                                     1 - BLADE       CJP
                                     2 - SURGE       OJP
                                     4 - KW          PJP
                                     8 - EXHAUST     ZJP

                        EJE

30413   00000  KWIIN  OCT            PREAENT INPUT TO KW INTEGRATOR
30414   00000  LSKWIN OCT            LAST VALUE OF KWIIN
30415   00000  KWIOUT OCT            LAST VALUE OF THE INTEGRATOR OUTPUT
30416   00000  KWSGNL OCT            OUTPUT OF THE KW CONTROL BLOCK
30417   00000  KWOUPT OCT            OUTPUT OF CONST KW CONTROL BLOCK
30420   00000  LRLIM  OCT            OUTPUT OF LOAD RATE LIMITER
30421   00000  LRFRAC OCT            FRACTIONAL PART LOADING RATE

30422   00000  LSBPAV OCT            PREV INPUT TO THE BLADE PATH RATE BLOCK
30423   00000  LSBPIN OCT            PREVIOUS BPIIN
30424   00000  BPIOUT OCT            OUTPUT OF BLADE PATH INTEGRATOR
30425   00000  BPRATE OCT            PUTPUT OF BLADE PATH RATE FUNCTION
30426   00000  BPSGNL OCT            BLADE PATH CONTROLLER OUTPUT

30427   00000  BLTIMR OCT            TIMER FOR DELBP
30430   00000  DELBP  OCT            CURRENT OFFSET ADDED TO BPREF IN MODES 3,4
30431   21020  INCWRD OCT 21020      LEFT SHIFTED AS A TIMER. ORIGINALLY EVERY 5TH
                                     BIT IS SET.

30432   00000  LSEXAV OCT            PREV INPUT TO THE EXHAUST RATE BLOCK
30433   00000  LSEXIN OCT            PREVIOUS EXIIN
30434   00000  EXIOUT OCT            OUTPUT OF EXHAUST INTEGRATOR
30435   00000  EXRATE OCT            OUTPUT OF EXH RATE FUNCTION
30436   00000  EXSGNL OCT            OUTPUT OF THE EXHAUST CONTROLLER
30437   00000  SGSGNL OCT            OUTPUT OF THE SURGE CHANNEL CONTROLLER

30440   00000  TKFLG  OCT            FLAG TO INDICATE SPEED IS TRACKING IN MODE 4.

30441   00000  POFSET OCT            PRESSURE OFFSET USED IN MODE 1 TO CORRECT FOR
                                     DRIFT IN THE XDUCER 0 POINT.

30442   00000  LASREF OCT            LAST VALUE FOR TEMPERATURE REF.
30443   00000  REFKW  OCT            REFERENCE KILOWATTS
30444   00000  WASMD3 OCT            FLAG TO SHOW WE ARE IN MODE 3
30445   00000  WASMD4 OCT            SET TO SHOW WE WERE IN MODE4.
30446   02400  TOSSIT OCT 2400       THROW AWAY VALUE FOR T/C S.  SET AT RUN TIME.
                                     INSURE THAT THE RESIDENT READ/WRITE AREA
                                     IS ALWAYS 53 OCTAL LOCATIONS LONG.

                       8RPT 53-L+1STCRL
30447   00000           OCT 0
30450   00000
30451   00000
30452   00000

                                     HOLDSP IS A FLAG TO INDICATE A DESIRE ON THE
                                     PART OF THE OPERATOR TO HOLD SPEED DURING AN
                                     ACCELERATION.  IT IS SET BY THE OP CONSOLE
                                     PROGRAM.  IT CAUSES THE SPEED REFERENCE
                                     FUNCTION GENERATOR TO HOLD AT THE PRESENT

30453   00000  HOLDSP OCT
        30453  ENDWRT SYN L-1
```

– Continued

```
                        EJE

                                           THE READ ONLY AREA ACCESSED BY OTHER PROGRAMS
                                           BEGINS HERE.
                                           ************************************************

                                           THIS IS THE SPEED REFERENCE IN MODE 4.
30454      00000    M4LMIT OCT

                                           THESE ARE THE CONTROLLER GAINS.  ALL GAINS ARE
                                           AT A B OF 11.
                                           THESE ARE SAVED IN CONTROL RESIDENT TABLE
           30455    GNKW1   SYN L          GAIN FOR PROP BLOCK IN KW CONTROLLER
30455      02000            DEC .5B11
           30456    GNKW2   SYN L          GAIN FOR RESET BLOCK IN KW CONTROLLER
30456      00146            DEC .05B11

           30457    BPGNK1 SYN L           GAIN FOR PROPORTIONAL BLOCK OF BLADE PATH CNTRL.
30457      02000            DEC .500B11

           30460    BPGNK2 SYN L           GAIN FOR RATE BLOCK OF BLADE PATH CONTROLLER
30460      00040            DEC .5B6
           30461    BPTCN   SYN L          BLADE PATH RATE TIME CONSTANT
30461      00012            DEC 10    = 12 SEC T.C.

           30462    BPGNK3 SYN L           GAIN FOR RESET BLOCK IN BLADE PATH CONTROLLER
30462      00400            DEC .125B11

                                           FOLLOWING RATE GAINS ARE USED IN BLADE PATH
                                           LOOP DURING LOADING.
30463      00140    BPGNLD DEC 1.5B6     = OVERALL RATE GAIN OF 2.5 AT LOAD
30464      00144    BPTCLD DEC 100       = 2 MIN   RATE T.C.          AT LOAD


           30465    EXGNK1 SYN L           GAIN FOR PROPORTIONAL BLOCK OF EXHAUST CONTROL
30465      01000            DEC .25B11

           30466    EXGNK2 SYN L           GAIN OF RATE BLOCK OF EXHAUST CONTROLLER
30466      00140            DEC 1.5B6
           30467    EXTCN   SYN L          EXHAUST CONTROL RATE TIME CONSTANT
30467      00144            DEC 100      = 120 SEC T.C.

           30470    EXGNK3 SYN L           GAIN OF THE RESET BLOCK OF THE EXHAUST CNTRL.
30470      00463            DEC .15B11
                            EJE
30471      00000    MAXKW   OCT  FILL AT RUN        MAX VAL OF KW REF
           30472    DELCSO  SYN L          DELTA ADDED TO CSO BEFORE STORING IN ACTFL
30472      00140            OCT 140

           30473    DIFERR SYN L           DIFFERENTIAL TEMPER. ERROR LIMIT
30473      00145            OCT 145  (ADC/2 VALUE ) = 80 DEG. F

                                           THE FOLLOWING ARE 251-AA VALUES TIMES 4 BECAUSE
                                           THE 501 AVERAGING DOES NOT NEED ADC/4 VALUES
           30474    IDLTOS SYN L           VALUE FOR TOSSIT IN MODE 0.
30474      00400            OCT 100*4   =100 DEG F  (ADC)
           30475    RUNTOS SYN L           VALUE FOR TOSSIT WHILE RUNNING.
30475      00400            OCT 100*4


           30476    NRMRMP  SYN L          NORMAL RAMP RATE
30476      00100            DEC 1.0B6
           30477    EMGRMP  SYN L          EMERGENCY RAMP RATE
30477      01100            DEC 9.0B6      2 MIN. LOADING
           30500    FSTRMP  SYN L          FAST RAMPING RATE
30500      00300            DEC 3.0B6      5 MIN LOADING

           30501    MINKW   SYN L          NOMINAL VALUE OF KW REF IN MIN LOAD
30501      00121            OCT 121    = 4 MEGAWATTS  (ADC/2)
                            EJE
                        BDLE 1-EMGOPT*21
                                           THIS IS THE FUNCTION FOR EMERGENCY ACCEL.

           30502    EMGACC SYN L
                                           SPEED VALUES
                                           TO GET RPM TO DECIMAL ADC COUNTS MULTIPLY
                                           BY .91 -   .91 = 3280 ADC COMNTS/ 3600-RPM

30502      01351            DEC 745        820  RPM
30503      03150            DEC 1640       1800 RPM
30504      04076            DEC 2110       2320 RPM
30505      05240            DEC 2720       2990 RPM
30506      06320            DEC 3280       3600 RPM


                                           ACCELERATION VALUES AT CORRESPONDING SPEEDS

                                           TO GET RPM/SCAN PERIOD MULTIPLY RPM/SEC
                                           BY 35   WHERE
                                           35 =(1.2 SEC/SCAN)*(.91 ADC CNTS/RPM)*(32 FOR B5
30507      00764            DEC 500        14.3 RPM/SEC
30510      00214            DEC 140         4.0 RPM/SEC
30511      00346            DEC 230         6.6 RPM/SEC
30512      00346            DEC 230         6.6 RPM/SEC
30513      01262            DEC 690        19.2 RPM/SEC
```

–Continued

```
                                                THIS FUNCTION IS USED FOR NORMAL ACCEL.

        30514   NRMACC SYN L                    SPEED VALUES

                                                TO GET RPM TO DECIMAL ADC COUNTS MULTIPLY
                                                BY .91 -  .91 = 3280 ADC COUNTS/ 360  RPM

30514   01350           DEC 744                 820  RPM
30515   03150           DEC 1640                1800 RPM
30516   04076           DEC 2110                2320 RPM
30517   05346           DEC 2790                3070 RPM
30520   06440           DEC 3360                3690 RPM

                                                ACCELERATION VALUES AT CORRESPONDING SPEEDS

                                                TO GET RPM/SCAN PERIOD MULTIPLY RPM/SEC
                                                BY 35  WHERE
                                                35 =(1.2 SEC/SCAN)*(.91 ADC CNTS/RPMH*(32+FOR 85

30521   00560           DEC 368                 10.5  RPM/SEC
30522   00756           DEC 494                 14.1  RPM/SEC
30523   00050           DEC 40                   1.14 RPM/SEC
30524   00244           DEC 164                  4.67 RPM/SEC
30525   00053           DEC 43                   1.25 RPM/SEC

                        EJE

                        8DLE 1-EMGOPT*20        THIS IS THE TEMPERATURE FUNCTION FOR AN
                                                EMERGENCY START (1500 DEG.)

        30526   EMERST SYN L                    INDEP. VAR. - COMBR SHELL PRES
30526   00631           OCT 631                 0    PSG
30527   01063           OCT 1063                15   PSG
30530   01314           OCT 1314                30   PSG
30531   02000           OCT 2000                60   PSG
30532   02670           OCT 2670                103  PSG

                                                DEPENDENT VAR  THERMOCOUPLE TEMP AVE
30533   03561           OCT 3561                1500  DEG. F
30534   03230           OCT 3230                1350  DEG. F
30535   02705           OCT 2705                1200  DEG. F
30536   02227           OCT 2227                975   DEG. F
30537   01673           OCT 1673                800   DEG. F

                                                THIS IS THE TEMPERATURE FUNCTION FOR NORMAL
                                                1200 DEG. START.

        30540   NORMST SYN L                INDEPENDENT VAR. P2C (COMBR SHELL PRES)  ADC/2
30540   00631           OCT 631                 0    PSG
30541   00714           OCT 714                 5    PSG
30542   01231           OCT 1231                25   PSG
30543   02063           OCT 2063                65   PSG
30544   02714           OCT 2714                105  PSG

                                            DEPENDENT VAR. BLADE T/C TEMP. REF        ADC/2
30545   01673           OCT 1673                800 DEG. F
30546   01673           OCT 1673                800 DEG. F
30547   02137           OCT 2137                930 DEG. F
30550   01625           OCT 1625                770 DEG. F
30551   01345           OCT 1345                630 DEG. F

                        EJE

                                                THIS IS THE FUNCTION TABLE FOR THE BASE LOAD

        30552   BASELD SYN L                    ALL BASE CURVE VALUES IN  ADC/2
                                                INDEP. VAR. - COMBR SHELL PRES
30552   03023           OCT 3023                112  PSG
30553   03146           OCT 3146                120  PSG
30554   03314           OCT 3314                130  PSG
30555   03463           OCT 3463                140  PSG
30556   03635           OCT 3635                150   PSG

                                                DEPENDENT VAR  THERMOCOUPLE TEMP AVE
30557   01754           OCT 1754                839  DEG. F
30560   01723           OCT 1723                819  DEG. F
30561   01673           OCT 1673                800  DEG. F
30562   01643           OCT 1643                781  DEG. F
30563   01622           OCT 1622                768  DEG. F

                                                THIS IS THE FUNCTION TABLE FOR THE PEAK LOAD
                                                TEMPERATURE REFERENCE.

        30564   PEAKLD SYN L                    ALL PEAK CURVE VALUES IN  ADC/2
                                                INDEP. VAR. - COMBR SHELL PRES
30564   03023           OCT 3023                112  PSG
30565   03146           OCT 3146                120  PSG
```

–Continued

```
30566     03314          OCT 3314        130  PSG
30567     03463          OCT 3463        140  PSG
30570     03635          OCT 3635        150  PSG

                                         DEPENDENT VAR  THERMOCOUPLE TEMP AVE
30571     02043          OCT 2043        883  DEG. F
30572     02010          OCT 2010        861  DEG. F
30573     01760          OCT 1760        842  DEG. F
30574     01732          OCT 1732        825  DEG. F
30575     01707          OCT 1707        810  DEG. F

                                         THIS IS THE FUNCTION TABLE FOR THE SYSTEM
                                         RESERVE TEMPERATURE REFERENCE.

          30576   SYSRLD SYN L           ALL S.R. CURVE VALUES IN  ADC/2
                                         INDEP. VAR. - COMBR SHELL PRES
30576     03023          OCT 3023        112  PSG
30577     03146          OCT 3146        120  PSG
30600     03314          OCT 3314        130  PSG
30601     03463          OCT 3463        140  PSG
30602     03635          OCT 3635        150  PSG

                                         DEPENDENT VAR  THERMOCOUPLE TEMP AVE
                                         ******
30603     02043          OCT 2043             SAME AS PEAK
30604     02010          OCT 2010                  TILL CURVES ARE FURNISHED
30605     01760          OCT 1760                        BY SS AND GT ENGINEERING
30606     01732          OCT 1732                                         ******
30607     01707          OCT 1707

                         EJE
                                         THIS IS THE SURGE FUNCTION FOR THE FUEL DEMAND.

          30610   SURGFN SYN L           Y IS INLET TEMPERATURE IN ADC UNITS

30610     37655          DEC -.040B11    YMIN
30611     00152          DEC .052B11     YMAX

                                         X2 S
                                         COMBR SHELL PRES.
                              MIN. CURVE - THIS CURVE FOR AMBIENT=--40+DEG.
30612     00655          OCT 655         2      PSG
30613     01244          OCT 1244        26     PSG
30614     02245          OCT 2245        76     PSG
30615     02717          OCT 2717        105    PSG
30616     03635          OCT 3635        150    PSG

                                         F(X1,YMIN)
30617     00000          OCT 0           0      VOLTS
30620     01412          OCT 1412        1.9    VOLTS
30621     02315          OCT 2315        3.0    VOLTS
30622     02510          OCT 2510        3.3    VOLTS
30623     04000          OCT 4000        5.0    VOLTS

                                         X1 S
                                         COMBR SHELL PRES.
30624     00655          OCT 655         2      PSG
30625     01121          OCT 1121        18     PSG
30626     01715          OCT 1715        55     PSG
30627     03255          OCT 3255        127    PSG
30630     03635          OCT 3635        150    PSG
                                         F(X2,YMAX)
30631     00000          OCT 0           0      VOLTS
30632     02173          OCT 2173        2.8    VOLTS
30633     02632          OCT 2632        3.5    VOLTS
30634     03270          OCT 3270        4.2    VOLTS
30635     04000          OCT 4000        5      VOLTS

30636     30471   KWTADR OCT MAXKW       ADDRESS OF KW REF LIMIT- USED FOR RAISE/LOWER.
30637     30454   SPLADR OCT M4LMIT      MODE 4 SPEED REF. ADDRESS
30640     30406   SRFADR OCT SPDREF      SPEED REF ADDRESS
30641     30440   TKFADR OCT TKFLG       ADDRESS OF SPEED TRACKING FLAG

          30642   SPDADR SYN L           ADDRESS OF ANALOG OUTPUT SPEED R/L COUNT
30642     27043          OCT -22*UNIT+SPDA
          30643   TNUMBR SYN L           TURBINE DESIGNATION
30643     00000          OCT UNIT
          30644   RESSEQ SYN L           ADDRESS OF THE RESIDENT SEQUENCING TABLE
30644     10000          OCT UNIT*130+RESA

                                         INSURE THAT THE RESIDENT TABLE LENGTH IS ALWAYS
                                         250 OCTAL WORDS.
                       8RPT 250-L+1STCRL
30645     00000          OCT 0
30646     00000
30647     00000
          30647   LASCRL SYN L-1         LAST LOCATION FROM RESIDENT TABLE

                                         XXXXXXXXXXXXXXXXXXXXXXXXXXXXXXXXXXXXXXXXXXXXXXXX

                                                END CONTROL RESIDENT TABLE READ AREA
                                         XXXXXXXXXXXXXXXXXXXXXXXXXXXXXXXXXXXXXXXXXXXXXXXX
```

```
                         EJE
        30650           BORG CMASTR+250
30650   00000   SYNCNW   OCT               FLAG INDICATES THE AUTO SYNC IS IN PROCESS.

                                           FOLLOWING ARE THE LOGICAL INPUTS FROM THE
                                           SEQUENCING LOGIC TABLES.

30651   00000   MODE0    OCT
30652   00000   MODE1    OCT
30653   00000   MODE2    OCT
                              ----
30654   00000   MODE3    OCT
30655   00000   MODE4    OCT
30656   00000   MIN      OCT
                              ----
30657   00000   BASE     OCT
30660   00000   PEAK     OCT
30661   00000   SYSR     OCT
                              ----
30662   00000   START    OCT               SPARE
30663   00000   EMRGRT   OCT               EMERGENCY RATE
30664   00000   FASTRT   OCT               FAST RATE
                              ----
30665   00000   NORMRT   OCT               NORMAL RATE
30666   00000   SX       OCT               INDICATES NORMAL STOP REQUESTED

                         EJE

                                           ALL ANALOG INPUT VALUES ARE RIGHT SHIFTED
                                           ONE TIME SO THEY ARE = THE ADC VALUE DIVIDED
                                           BY 2.    AI VALUE BELOW = ADC/2

                                           ACTUAL TURBINE SPEED.
30667   00000   SPEED    OCT    ADC - THIS ONE ONLY ALL OTHERS ADC/2

30670   00000   PRES2C   OCT               COMBUSTOR PRES 2.
        30671   CSOPLS   SYN L             CSO + A DELTA
30671   00000   ACTFL    OCT               ACTUAL FUEL DEMAND + A DELTA OF DELCSO
30672   00000   TEMPIC   OCT               COMBUSTOR TEMPERATURE.
30673   00000   ACTKW    OCT               ACTUAL KILOWATT OUTPUT

                         EJE
        30674   SPDAHD   SYN L             AMT. SPEED REF TRACKS AHEAD OF ACT. IN MODE 0.
30674   00005            OCT 5  ADC COUNTS


                                           TEMPORARY STORAGE.    ***************

                         EJE
                                           ...........................
                                           :                         :
                                           :   MODE 0 - IDLE         :
                                           :                         :
                                           ...........................
                                           THE MODE ZERO CONTROL LOGIC FOLLOWS.

        30675   MODZRO   SYN L             INITIALIZE THE PROGRAM PARAMETERS

                         AL1 0),
30675   32 0 334 .       ENL 0),           ZERO OUT THE VALUES FOR THE SPEED REF.

                         AS1 FRACT
30676   37 0 005         STL FRACT,

                                           ZERO THE INITIAL VALUES FOR THE BLADE PATH CTRL.
                         AS1 LSBPAV
30677   37 0 022         STL LSBPAV,
                         AS1 LSBPIN
30700   37 0 023         STL LSBPIN,
                         AS1 BPIOUT
30701   37 0 024         STL BPIOUT,
                         AS1 BPRATE
30702   37 0 025         STL BPRATE,
                                           ZERO THE INITIAL VALUES FOR THE EXHAUST CONTROL
                         AS1 LSEXAV
30703   37 0 032         STL LSEXAV,
                         AS1 LSEXIN
30704   37 0 033         STL LSEXIN,
                         AS1 EXIOUT
30705   37 0 034         STL EXIOUT,
                         AS1 EXRATE
30706   37 0 035         STL EXRATE,
                         AS1 BPSGNL
30707   37 0 026         STL BPSGNL,
                         AS1 EXSGNL
30710   37 0 036         STL EXSGNL,
                         AS1 SECBAK
30711   37 0 011         STL SECBAK,
                                           IN MODE 0 SET CSO LIMIT = - 1 VOLT
                         XFR -819),LOWEST
30712   32 0 333 .       ENL -819)
30713   37 0 007         STL LOWEST

                         XFR IDLTOS,TOSSIT
30714   32 0 074         ENL IDLTOS
30715   37 0 046         STL TOSSIT
```

–Continued

```
                                            THE FOLLOWING INSTRUCTIONS ARE DONE SO THAT A
                                            SMOOTH TRANSFER FROM MODE 0 TO MODE 1 IS
                                            POSSIBLE.

                                            ADD AN OFFSET TO THE SPEED SO WE TRACK AHEAD
                                            BY SOME AMOUNT.
30716  32 0 267              ENL SPEED
30717  10 0 274              ADD SPDAHD
30720  37 0 006              STL SPDOUT

                                            SAVE VALUE TO BE USED LATER AS A FUNCTION
                                            GENERATOR INPUT.
                                            CHECK TO SEE IF SPEED LOW ENOUGH SO P2C
                                            OFFSET CAN BE SAVED

30721  11 0 332  .           SUB MAXSPD*3/100+1)
30722  27 0 325              PJP NOOFST

                                            SPEED LOW ENOUGH - SAVE PRESSURE FOR USE
                                            AS AN OFFSET LATER IN MODE 1.
30723  32 0 270              ENL PRES2C
30724  11 0 331  .          8SUB 631)       = ADC/2 EQUIVALENT OF 0 PSIG.
30725  37 0 041              STL POFSET
          30726    NOOFST SYN L
                                            COME HERE DIRECTLY WHEN SPEED LESS THAN 3 PCT
                                            AND DO NOT SAVE P2C OFFSET VALUE.
                             MAK HOLDSP,FALSE
                             DLE FALSE*1
30726  02 0 053              CMB HOLDSP
                             DLE 1-FALSE*1
                             JPT ENDZRO
30727  24 1 330  .           JMP ENDZRO
30730     31110              WRD
30731     00631              WRD
30732     00145              WRD
30733     36314              WRD
30734     00000              WRD
          31000             8ORG CMASTR+400

                                            THIS IS THE CALLING SECTION OF THE DDC
                                            PROGRAMS.  IT IS CALLED ONCE EVERY SCAN PERIOD,
                                            AND IN TURN CALLS THE ACTUAL DDC PROG.

          33200    CTRLA 8EQU CMASTR+2600
          00250    DATDIF EQU LASCRL-1STCRL+1
          33450    CTRLB  EQU CTRLA+DATDIF       CONTROL DATA TABLE FOR TURBINE B
          33720    CTRLC  EQU CTRLB+DATDIF       CONTROL DATA TABLE FOR TURBINE C
          34170    CTRLD  EQU CTRLC+DATDIF       CONTROL DATA TABLE FOR TURBINE D

                                            CALL EACH UNIT SEPARATELY.  JUMP TO RELINQUISH
                                            SUBROUTINE AFTER EACH HAS RUN TO SEE IF ANY
                                            HIGHER PRIORITY ROUTINES WANT TO RUN.

          31000    START1 SYN L
                             DLE 4-NTURB*4
31000  32 0 352  .           ENL CTRLB)     RUN UNIT B
31001  36 1 351  .           RJP PRECRL
31002  32 0 350  .           ENL TOPEND-CTLLVL)
31003  36 1 347  .           RJP RELINK
31004  32 0 346  .           ENL CTRLA)     RUN UNIT A
31005  36 1 351  .           RJP PRECRL
31006  14 1 350              LSH TOPEND-CTLLVL
31007  23 1 345  .           CLJ TOPLOP
                             EJE
31010     00000    CONTRL ...
                                            ------- MODE SELECT -------
                                            SEE WHICH MODE SEQUENCING IS CALLING FOR AND
                                            JUMP TO THE PROGRAM FOR THAT MODE.
                             F2D SURGFN,PRES2C,TEMP1C
31011  32 1 344  .           ENL PRES2C
31012  37 1 343  .           STL VARIN1
31013  32 1 342  .           ENL TEMP1C
31014  37 1 341  .           STL VARIN2
31015  32 0 340  .           ENL SURGFN+NUMPTS+1)
31016  36 1 337  .           RJP 2DIMEN
                             AS1 SGSGNL
31017  37 1 336  .           STL SGSGNL,
                             ASI LOWEST
31020  37 1 335  .           STL LOWEST,
                             XFR 1),CONVAR
31021  32 0 334  .           ENL 1)
31022  37 1 333  .           STL CONVAR
                                            PUTSGSGNL IN LOWEST

                                            CALC LOAD RATE LIMITER OUTPUT HERE.
31023  36 1 332  .           RJP LODRAT

                             IFE MODE2,TRUE,MODTWO
                             DLE -MODE2/MODE2+1*1
31024  16 1 331  .           RSH MODE2
                             DLE TRUE*1
                             DLE 1-TRUE*2
```

```
31025   27 0 026          PJP L+2
                          JPT MODTWO
31026   24 0 152          JMP MODTWO
                                         RESTORE THE PRE-EMPTED BLADE PATH POINTS IF
                                         WE ARE NOT IN MODE 2)
31027   32 1 330  .       ENL TNUMBR
31030   36 1 327  .       RJP UNEMPT
        31031    SKPUNM   SYN L

                                         LOAD DESIGNATOR REGISTER WITH THE CONTENTS OF
                                         BK2TMP. AT THIS POINT, BK2TMP CONTAINS THE
                                         MODE/LOAD WORD FROM THE SEQUENCING RES. TABLE.
                                         THE DESIGNATOR REGISTER APPEARS AS ....
                                          BIT   MODE  DESIGNATOR
                                           0     0    CARRY
                                           1     1    OVERFLOW
                                           2     2    POS.
                                          ......................
                                           3     3    ZERO
                                           4     4    EVEN

31031   05 0 160          EDR BK2TMP
31032   25 1 326  .       CJP MODZRO
31033   26 0 113          OJP MODONE
31034   20 1 325  .       ZJP MODTHR
31035   21 0 161          EJP MODFOR
                                         GO TO MODE 0 IF NO OTHER SET
                          JPT MODZRO
31036   24 1 326          JMP MODZRO
                          EJE
                                         THIS SECTION SELECTS THE LOWEST CONTROL
                                         SIGNAL FROM THE FOUR POSSIBLE SOURCES AND
                                         STORES IT IS THE FINAL SIGNAL OUTPUT LOCATION.
        31037    ENDCRL   SYN L

                          LOS LOWEST,EXSGNL,8
31037   32 1 335          ENL LOWEST
31040   11 1 324  .       SUB EXSGNL
31041   27 0 043          PJP L+3
31042   32 1 335          ENL LOWEST
31043   24 0 046          JMP L+4
31044   32 0 323  .       ENL 8)
31045   37 1 333          STL CONVAR
31046   32 1 324          ENL EXSGNL
                          ASI LOWEST
31047   37 1 335          STL LOWEST,

                          LOS LOWEST,KWSGNL,4
31050   32 1 335          ENL LOWEST
31051   11 1 322  .       SUB KWSGNL
31052   27 0 054          PJP L+3
31053   32 1 335          ENL LOWEST
31054   24 0 057          JMP L+4
31055   32 0 321  .       ENL 4)
31056   37 1 333          STL CONVAR
31057   32 1 322          ENL KWSGNL
                          ASI LOWEST
31060   37 1 335          STL LOWEST,
        31061    NOKWCK   SYN L
                          LOS LOWEST,BPSGNL,2
31061   32 1 335          ENL LOWEST
31062   11 1 320  .       SUB BPSGNL
31063   27 0 065          PJP L+3
31064   32 1 335          ENL LOWEST
31065   24 0 070          JMP L+4
31066   32 0 317  .       ENL 2)
31067   37 1 333          STL CONVAR
31070   32 1 320          ENL BPSGNL
                          ASI LOWEST
31071   37 1 335          STL LOWEST,
                                         THE FOLLOWING ACTS AS A LIMIT ON THE OUTPUT.
                          AL1 LOWEST,
31072   32 1 335          ENL LOWEST,
                          IFP OKVAL
31073   27 0 075          PJP OKVAL
                                         LIMIT LOWEST TO + VALUES
                          XFR 0),LOWEST
31074   32 0 316  .       ENL 0)
31075   37 1 335          STL LOWEST
        31076    OKVAL    SYN L
31076   32 0 113          ENL ONEPU
31077   11 1 335          SUB LOWEST
31100   27 0 102          PJP L+3
31101   32 0 113          ENL ONEPU
31102   24 0 103          JMP L+2
31103   32 1 335          ENL LOWEST
                          ASI LOWEST
31104   37 1 335          STL LOWEST,
31105   14 1 335          LSH LOWEST
                                         THE LSH IS DONE BECAUSE THE OUTPUT PROG.
                                         EXPECTS A B OF 12 AND LOWEST IS AT B11
                          XFR SPDREF,SPDOUT
31106   32 1 315  .       ENL SPDREF
```

```
31107  37 1 315           STL SPDOUT

                                              COME HERE ON RETURN FROM MODE 0.  NO EXTRA
                                              CALCULATIONS HAVE TO BE DONE BECAUSE THE
                                              OUTPUTS ARE ALREADY SET.
31110  36 1 314  .        RJP SETLIT
          31111   ENDZRO  SYN L
31111  24 1 010           RTN
31112     00003   DEC3    DEC 3
31113     03777   ONEPU   OCT 3777            = 1/2 OF MAX ALLOWABLE VALUE FOR LOWEST.
                                              THIS IS MAX VALUE ON LOWEST PRIOR TO ITS
                                              BEGIN DOUBLED AND STORED FOR THE A/O PROGRAM.

                          EJE
                                              ..............................
                                              :                            :
                                              :  MODE 1 - ACCELERATION     :
                                              :                            :
                                              ..............................
                                              MODE ONE IS THE ACCELERATION MODE.  IN THIS
                                              MODE, THE REFERENCE IS SET ACCORDING TO WHETHER
                                              THIS IS A NORMAL OR AN EMERGENCY START.
          31114   MODONE  SYN L

31114  32 1 313  .        ENL SRFADR
          31115   M2ENTR  SYN L               ENTER HERE WHEN COMING FROM MODE 2
31115  37 1 312  .        STL PBADR

                          XFR RUNTOS,TOSSIT
31116  32 1 311  :        ENL RUNTOS
31117  37 1 310  :        STL TOSSIT
                                              SET UP TEMP REF FOR NORMAL START.
                          DLE 1-EMGOPT*5
                          IFF EMRGRT,FALSE,NRMREF
                          DLE -EMRGRT/EMRGRT+1*1
31120  16 1 307  .        RSH EMRGRT
                          DLE FALSE*1
31121  27 0 126           PJP NRMREF
                          DLE 1-FALSE*2
                          FID EMERST,PRES2C            EMERGENCY START = THIS PATH
31122  32 1 344           ENL PRES2C
31123  37 1 343           STL VARINI
31124  32 0 306  :        ENL EMERST+NUMPTS-1)
31125  36 1 305  :        RJP IDIMEN
31126  24 0 132           JMP SRTREF
          31127   NRMREF  SYN L
                                                       NORMAL START = THIS PATH
                          F1D NORMST,PRES2C
31127  32 1 344           ENL PRES2C
31130  37 1 343           STL VARINI
31131  32 0 304  .        ENL NORMST+NUMPTS-1)
31132  36 1 305           RJP IDIMEN

          31133   SRTREF  SYN L
                          AS1 BPREF,
31133  37 1 303  .        STL BPREF,
                          AS1 EXREF,
31134  37 1 302  :        STL EXREF,
31135  36 1 301  :        RJP BPANEX

                                              GENERATE THE SPEED REF. CURVE
31136  36 1 300  .        RJP SREFGN


                                              CLEAR THE EXH. ABSOLUTE ALARM IN MODE1.  THIS
                                              ELIMINATES FALSE ALARMS ON HOT RESTARTS.
31137  02 1 277  .        CMB 26EA

                                              SEE IF WE HAVE BEEN IN THIS MODE LONG ENOUGH
                                              THAT AN ALARM IS REASONABLE.  IF NOT, CLEAR
                                              THE DIFFERENTIAL ALARMS.
31140  32 1 276  .        ENL SECBAK
31141  27 0 142           PJP UNSET
31142  24 0 145           JMP LVESET
                                              NOT BACK LONG ENOUGH - UNSET FLAGS
          31143   UNSET   SYN L
                          MAK 26ED,FALSE
                          DLE FALSE*1
31143  02 1 275  .        CMB 26ED
                          DLE 1-FALSE*1
                          MAK 26BD,FALSE
                          DLE FALSE*1
31144  02 1 274  .        CMB 26BD
                          DLE 1-FALSE*1
31145  01 1 276           DCR SECBAK
          31146   LVESET  SYN L

                          MAK WASMD3,FALSE
                          DLE FALSE*1
31146  02 1 273  .        CMB WASMD3
                          DLE 1-FALSE*1
                          MAK WASMD4,FALSE
                          DLE FALSE*1
31147  02 1 272  .        CMB WASMD4
                          DLE 1-FALSE*1
                                              CAUSE THE KW INTEGRATOR TO TRACK CSO
                          XFR ACTFL,KWIOUT
31150  32 1 271  :        ENL ACTFL
31151  37 1 270  :        STL KWIOUT

                                              SET THE KW REFER = MIN REFERENCE
31152  24 0 060           JMP NOKWCK
```

–Continued

```
                         EJE
                                        ***************************
                                        *                         *
                                        *   MODE 2 - SYNCHRONIZE  *
                                        *                         *
                                        ***************************
        31153   MODTWO SYN L
                                        THIS IS THE LOGIC FOR CONTROL MODE 2.  THIS
                                        IS THE SYNCHRONIZING MODE.  IT IS NOT DEFINED

31153  32 1 330          ENL TNUMBR
31154  36 1 267   .      RJP RMCHER
31155  32 1 266   .      ENL SPDADR
31156  24 0 114          JMP M2ENTR

                         EJE
                                        ***************************
                                        *                         *
                                        *   MODE 4 - TEMP. CONTROL *
                                        *                         *
                                        ***************************
                                        THIS IS MODE 4- TEMPERATURE CONTROL IS BASED
                                        ON THE LOAD CONDITION - BASE, PEAK, OR SYSTEM
                                        RESERVE.
                                        THE REFERENCE IS A FUNCTION OF THE COMBUSTOR
                                        PRESSURE.

31157      00012  TEN    DEC 10
31160      00000  BK2TMP OCT XX           TEMPORARY STORAGE
31161      06747  M34MAX OCT MAXSPD*4/100+MAXSPD     = APPROX 106.3 PCT SPEED

        31162   MODFOR SYN L
                                        CALCULATE ADDR OF TRACKING FLAG THAT IS TO
                                        BE USED FOR THIS UNIT

                                        IF FIRST TIME THROUGH GO TO INITIALIZATION
                         IFF WASMD4,FALSE,SETUP1
                         DLE -WASMD4/WASMD4+1*1
31162  16 1 272          RSH WASMD4
                         DLE FALSE*1
31163  27 0 170          PJP SETUP1
                         DLE I-FALSE*2
                                        SEE IF VALUE IN TKFLG IS STILL = 0
31164  32 1 265   .      ENL TKFLG
31165  20 0 200          ZJP CALSPD     IF =0 CALCULATE REF VALUE
                                        SEE IF LOAD SELECTED HAS CHANGED
31166  32 1 264   .      ENL CURLOD
31167  11 1 263   .      SUB LASLOD
31170  20 0 175          ZJP SPDCRL     IF JUMP TAKEN HERE - TKFLG NOT =0 AND SAME LOAD

        31171   SETUP1 SYN L
                                        COME THROUGH HERE WHEN FIRST IN MODE 4 OR
                                        WHEN ON SPEED CHANGER CONTROL AND A NEW LOAD
                                        IS SELECTED.
                         XFR 0),TKFLG
31171  32 0 316          ENL 0)
31172  37 1 265          STL TKFLG

                         XFR TKFADR,PBADR
31173  32 1 262   .      ENL TKFADR
31174  37 1 312          STL PBADR
31175  24 0 223          JMP STRMAX

        31176   SPDCRL SYN L
                                        ON SPEED CHANGER CONTROL.  CHANGE M4LMIT W/ P.B.
                         XFR SPLADR,PBADR
31176  32 1 261   .      ENL SPLADR
31177  37 1 312          STL PBADR
31200  24 0 217          JMP CHK104

        31201   CALSPD SYN L
                                        THIS SECTION CALCULATES A SPEED REF VALUE THAT
                                        WILL PRODUCE JUST ENOUGH SPEED ERROR TO MAKE
                                        CSO LIMIT THE CONTROLLING VARIABLE.
                                              SPDREF = LIMIT/10
31201  32 1 260   .      ENL LIMIT
31202  24 0 202          JMP L+1        SPARE FOR POSSIBLE OFFSET
31203  24 0 203          JMP L+1
31204  37 1 257   .      STL LOWER
31205  32 0 316          ENL 0)
31206  36 1 256   .      RJP DIVIDE
31207      32401         OCT LOWER
31210      31157         OCT TEN
31211      32400         OCT UPPER
                                        (AL) = LIMIT/10  = (CSO+DELCSO)/10
31212  10 1 255   .      ADD SPLMIT     (AL) = 100 PCT SPEED + CALC ERROR TERM
31213  37 1 254   .      STL M4LMIT
```

–Continued

```
                              XFR SPLADR,BK2TMP
31214  32 1 261               ENL SPLADR
31215  37 0 160               STL BK2TMP
31216  32 1 254               ENL M4LMIT
31217  37 1 160               STL BK2TMP,I

          31220   CHK104 SYN L
                                                IF WE WERE NOT PREVIOUSLY IN MODE4, SET M4LMIT
                                                AND THE P.B. CONTROLLED LOCATION TO 104 PCT
                                                OTHERWISE CHECK TO SEE THAT THE LIMIT HAS NOT
                                                EXCEEDED SOME VALUE = 104 PCT + DELTA VAL.
31220  32 0 321               ENL 4)
31221  10 0 161               ADD M34MAX
31222  11 1 254               SUB M4LMIT
31223  27 0 230               PJP SETSPD
          31224   STRMAX SYN L
                                                SET THE SPEED REF LOCATIONS TO 104 PCT
                              XFR SPLADR,BK2TMP
31224  32 1 261               ENL SPLADR
31225  37 0 160               STL BK2TMP
31226  32 0 161               ENL M34MAX
31227  37 1 160               STL BK2TMP,I
31230  37 1 254               STL M4LMIT

          31231   SETSPD SYN L
                              XFR M4LMIT,SPDREF
31231  32 1 254               ENL M4LMIT
31232  37 1 315               STL SPDREF


                              MAK WASMD3,FALSE
                              DLE FALSE*1
31233  02 1 273               CMB WASMD3
                              DLE 1-FALSE*1
                              MAK WASMD4,TRUE
                              DLE TRUE*1
                              DLE 1-TRUE*1
31234  03 1 272               SMB WASMD4
                                                SET FLAG TO SHOW WE WERE IN MODE 4.
                                                SET KWREF=ACTKW
                              XFR KWTADR,BK2TMP
31235  32 1 253   .           ENL KWTADR
31236  37 0 160               STL BK2TMP
31237  32 1 252   .           ENL ACTKW
31240  37 1 160               STL BK2TMP,I
31241  37 1 251   .           STL REFKW

                                                TRACK CSO W/ THE KW INTEG. OUTPUT
                              XFR ACTFL,KWIOUT
31242  32 1 271               ENL ACTFL
31243  37 1 270               STL KWIOUT

                                                UNCONDITIONALLY SET KWSGNL = LRLIM
                              XFR LRLIM,KWSGNL
31244  32 1 250   .           ENL LRLIM
31245  37 1 322               STL KWSGNL

                                                END OF SPECIAL MODE 4 LOGIC
                              JPT COMLOG
31246  24 1 247   .           JMP COMLOG
31247     31501               WRD
31250     30420               WRD
31251     30443               WRD
31252     30673               WRD
31253     30636               WRD
31254     30454               WRD
31255     33050               WRD
31256     00204               WRD
31257     32401               WRD
31260     32564               WRD
31261     30637               WRD
31262     30641               WRD
31263     30404               WRD
31264     33123               WRD
31265     30440               WRD
31266     30642               WRD
31267     06006               WRD
31270     30415               WRD
31271     30671               WRD
31272     30445               WRD
31273     30444               WRD
31274     30400               WRD
31275     30401               WRD
31276     30411               WRD
31277     30403               WRD
31300     33000               WRD
31301     32013               WRD
31302     32012               WRD
31303     32011               WRD
31304     30544               WRD
31305     36403               WRD
31306     30532               WRD
31307     30663               WRD
31310     30446               WRD
31311     30475               WRD
31312     30410               WRD
31313     30640               WRD
31314     32227               WRD
31315     30406               WRD
```

-Continued

```
31316     00000             WRD
31317     00002             WRD
31320     30426             WRD
31321     00004             WRD
31322     30416             WRD
31323     00010             WRD
31324     30436             WRD
31325     31401             WRD
31326     30674             WRD
31327     06012             WRD
31330     30643             WRD
31331     30653             WRD
31332     32613             WRD
31333     30412             WRD
31334     00001             WRD
31335     30407             WRD
31336     30437             WRD
31337     36400             WRD
31340     30616             WRD
31341     36465             WRD
31342     30672             WRD
31343     36464             WRD
31344     30670             WRD
31345     00377             WRD
31346     33200             WRD
31347     01310             WRD
31350     00404             WRD
31351     33051             WRD
31352     33450             WRD

          31400          8ORG CMASTR+1000
31400     00000   KMXADR OCT
                                  ..............................
                                  :                            :
                                  :   MODE 3 - KW CONTROL      :
                                  :                            :
                                  ..............................

31401     00000   WASNEG OCT

          31402   MODTHR SYN L
                                  CONSTANT KW CONTROL MODE
31402  32 1 377  .       ENL M34MAX
31403  37 1 376  .       STL SPDREF
                                  IF COMING BACK FROM MODE 4, RAMP KW REFER. DOWN
                                  TO MIN SET POINT.
                         XFR KWTADR,KMXADR
31404  32 1 375  .       ENL KWTADR
31405  37 0 000          STL KMXADR
                                  GO TO MIN LOAD SETPOINT IF THE NORMAL STOP IS
                                  REQUESTEDWHILE WE ARE IN MIN LOAD WITH THE KW
                                  SETPOINT ADJUSTED HIGHER THAN THE MIN POINT.
                         IFF 5X,TRUE,GODOWN
                         DLE -5X/5X+1*1
31406  16 1 374  .       RSH 5X
                         DLE TRUE*1
                         DLE 1-TRUE*2
31407  27 0 010          PJP L+2
                         JPT GODOWN
31410  24 0 014          JMP GODOWN
                         IFF WASMD4,TRUE,GODOWN
                         DLE -WASMD4/WASMD4+1*1
31411  16 1 373  .       RSH WASMD4
                         DLE TRUE*1
                         DLE 1-TRUE*2
31412  27 0 013          PJP L+2
                         JPT GODOWN
31413  24 0 014          JMP GODOWN
31414  24 0 020          JMP SETMIN
                                  IF COMING BACK FROM MODE 4 DO NOT CHANGE KW
                                  SETPOINT. IF NOT MODE4, SEE IF FIRST TIME IN
                                  MODE3 AND IF SO SET KW REF TO MIN VALUE.
                                  NOTE ........
                                  THIS FEATURE IS NOT CURRENTLY IN , BUT IT
                                  CAN BE ADDED BY SIMPLY CHANGING THE IFF
                                  INSTRUCTION ABOVE TO JUMP TO BAKFM4

          31415   GODOWN SYN L
                         ALI REFKW
31415  32 1 372  .       ENL REFKW,
31416  11 1 371  .       SUB MINKW
31417  11 0 370  .      8SUB 10)
                                  WHEN WITHIN THIS MANY COUNTS OF MIN - TAKE 1 STE
31420  27 0 032          PJP LOWRIT

          31421   SETMIN SYN L
                         IFF WASMD3,TRUE,KWCTRL
                         DLE -WASMD3/WASMD3+1*1
31421  16 1 367  .       RSH WASMD3
                         DLE TRUE*1
                         DLE 1-TRUE*2
31422  27 0 023          PJP L+2
                         JPT KWCTRL
31423  24 0 035          JMP KWCTRL
31424  32 1 371          ENL MINKW
31425  37 1 000          STL KMXADR,I
```

–Continued

```
          31426   BAKFM4 SYN L
                                   COME HERE TO SET UP MODE3 AFTER RETURNING FROM
                                   MODE4.  THE KW VALUE REMAINS AT ITS PRESENT
                                   SETTING AND DOES NOT RETURN TO THE MIN VALUE.
                                   NOTE ... NOT IN AT THIS TIME.

                                   STORE ADDRESS OF MAXKW IN P.B. CHANGE ADDRESS
                                   PUT THE INST TO STORE P.B. CHANGE ADDRESS HERE
                                   TO AVOID THE CASE WHERE WE GO FORM BASE TO MIN
                                   AND THEN BACK TO BASE WITHOUT GOING ALL THE
                                   WAY DOWN TO THE MINIMUM LOAD VALUE AND CLEARING
                                   THE WASMD4 FLAG.  THIS WOULD RESULT IN NOT BEING
                                   ABLE TO RAISE/ LOWER LOAD IN THE BASE POSN.
                          XFR KWIADR,PBADR
31426  32 1 375           ENL KWIADR
31427  37 1 366   .       STL PBADR
                          MAK WASMD4,FALSE
                          DLE FALSE*1
31430  02 1 373           CMB WASMD4
                          DLE 1-FALSE*1
                          MAK WASMD3,TRUE
                          DLE TRUE*1
                          DLE 1-TRUE*1
31431  03 1 367           SMB WASMD3
                          JPT KWCTRL
31432  24 0 035           JMP KWCTRL
                                   LOWER THE REFERENCE BY SOME AMOUNT
          31433   LOWRIT  SYN L
31433  32 1 000           ENL KMXADR,I
31434  11 1 365   .       SUB LRATBO       AUTO UNLOADING RATE IS SELECTABLE
31435  37 1 000           STL KMXADR,I


                                   FINISHED PRELIM. RAMPING CHECKS.
          31436   KWCTRL  SYN L
                                   FOLLOWING ARE ACTUAL KW CONTROL BLOCKS.

31436  32 1 000           ENL KMXADR,I
31437  37 1 372           STL REFKW
31440  24 0 040           JMP KWLABL
          31441   KWLABL  SYN L

                          DIF REFKW,ACTKW
31441  05 0 364   .       EDR 0)
31442  32 1 372   .       ENL REFKW
31443  11 1 363   .       SUB ACTKW
31444  36 1 362   .       RJP CHKOVF
                          AS1 KWIIN
31445  37 1 361   .       STL KWIIN,
                          MPL GNKW1
31446  36 1 360   .       RJP MULTPY
31447    30455            DEC GNKW1
31450    32401            OCT LOWER
31451  37 1 357   .       STL UPPER
                          RSA 11
31452  32 0 356   .       ENL 11)
31453  36 1 355   .       RJP RSASUB
                          XFR LOWER,KWOUPT
31454  32 1 354   .       ENL LOWER
31455  37 1 353   .       STL KWOUPT

                          JPT CTNUKW
31456  24 0 056           JMP CTNUKW
                          EJE
          31457   CTNUKW  SYN L

                          IGT GNKW2,LSKWIN,KWIIN,KWIOUT
31457  32 1 352   .       ENL GNKW2
31460  36 1 351   .       RJP INTEGR
31461    30414            OCT LSKWIN
31462    30413            OCT KWIIN
31463    30415            OCT KWIOUT

                          SUM 2,KWIOUT,KWOUPT
31464  05 0 364           EDR 0)
31465  32 1 350   .       ENL KWIOUT
                          DLE 5-2
31466  10 1 353           ADD KWOUPT
31467  36 1 362           RJP CHKOVF

                          AS1 KWOUPT
31470  37 1 353           STL KWOUPT,

                                   NOW HAVE CONSTANT KW CONTROL BLOCK DONE

                                   NOW HAVE LRLIM CALCULATED.  SELECT LOWER OF THE
                                   TWO VALUES -LRLIM, KWOUPT.

31471  32 1 347   .       ENL LRLIM
31472  11 1 353           SUB KWOUPT
31473  27 0 076           PJP SELKW
31474  32 1 347           ENL LRLIM
31475  37 1 346   .       STL KWSGNL
                          JPT COMLOG
31476  24 0 101           JMP COMLOG
          31477   SELKW   SYN L
31477  32 1 353           ENL KWOUPT
31500  37 1 346           STL KWSGNL
                          JPT COMLOG
31501  24 0 101           JMP COMLOG

                                   THIS IS THE END OF THE CONSTANT KW CONTROL AREA.
                                   GO TO BASEFN AND DO THINGS COMMON TO BOTH
                                   MODES OF LOAD CONTROL
```

```
                                   EJE
                                                      FOLLOWING LOGIC IS COMMON TO MODES 3 AND 4.
          31502    COMLOG   SYN L
                            IFF BASE,FALSE,C004
                            DLE -BASE/BASE+1*1
31502  16 1 345  .          RSH BASE
                            DLE FALSE*1
31503  27 0 110             PJP C004
                            DLE 1-FALSE*2
                                                      TAKE THIS PATH WHEN IN BASE LOADING CONDITION.
          31504    BASEFN   SYN L
                            F1D BASELD,PRES2C
31504  32 1 344  .          ENL PRES2C
31505  37 1 343  .          STL VARIN1
31506  32 0 342  .          ENL BASELD+NUMPTS-1)
31507  36 1 341  .          RJP 1DIMEN
                            JPT ENMOD3
31510  24 0 125             JMP ENMOD3

          31511    C004     SYN L
                            IFF PEAK,FALSE,C005
                            DLE -PEAK/PEAK+1*1
31511  16 1 340  .          RSH PEAK
                            DLE FALSE*1
31512  27 0 117             PJP C005
                            DLE 1-FALSE*2
                                                      TAKE THIS PATH ON PEAK LOADING CONDITION.
          31513    PEAKFN   SYN L
                            F1D PEAKLD,PRES2C
31513  32 1 344             ENL PRES2C
31514  37 1 343             STL VARIN1
31515  32 0 337  .          ENL PEAKLD+NUMPTS-1)
31516  36 1 341             RJP 1DIMEN
                            JPT ENMOD3
31517  24 0 125             JMP ENMOD3

          31520    C005     SYN L
                            IFF SYSR,FALSE,BASEFN
                            DLE -SYSR/SYSR+1*1
31520  16 1 336  .          RSH SYSR
                            DLE FALSE*1
31521  27 0 103             PJP BASEFN
                            DLE 1-FALSE*2
                                                      IF NO LOAD CONDITION IS SET, GO TO LABEL C003
                                                      AND SET UP AS FOR A BASE LOAD. THIS IS THE PATH
                                                      NORMALLY TAKEN ON AN EMERGENCY START.

                                                      TAKE THIS PATH WHEN IN SYSTEM RESERVE LOADING
          31522    SYSRFN   SYN L
                            F1D SYSRLD,PRES2C
31522  32 1 344             ENL PRES2C
31523  37 1 343             STL VARIN1
31524  32 0 335  .          ENL SYSRLD+NUMPTS-1)
31525  36 1 341             RJP 1DIMEN

                                                      SAVE THE REFERENCE TEMPERATURE
                   ENMOD3   AS1 BPREF
31526  37 1 334  .          STL BPREF,
                            AS1 EXREF
31527  37 1 333  .          STL EXREF,
                                                      NOW HAVE REFERENCE TEMPERATURES CALCULATED.
                                                      IF GOING FROM A HIGHER TO A LOWER REF. VALUE
                                                      RAMP THE REFERENCE AT A RATE DETERMINED BY THE
                                                      BUTTONS

31530  11 1 332  .          SUB LASREF
31531  27 0 141             PJP DOBPEX
                                                      IF NEW REF IS HIGHER USE IT.
                                                      SEE IF DIFFERENCE IS MORE THAN SOME FINAL STEP
31532  13 0 331  .          EOR -0)
31533  11 0 330  .          SUB 5)
31534  27 0 135             PJP RAMPT
                                                      GO TO RAMPING IF NEW IS MORE THAN 5 LESS THAN
                                                      OLD.
31535  24 0 141             JMP DOBPEX

                                                      RAMP TREF DOWN TO NEW VALUE
          31536    RAMPT    SYN L
31536  32 1 332             ENL LASREF
31537  11 1 365             SUB LRATBO
31540  37 1 334             STL BPREF
31541  37 1 333             STL EXREF

                                                      DO CONTROL FUNCTION
          31542    DOBPEX   SYN L
31542  36 1 327  .          RJP BPANEX

                            XFR 10),SECBAK
31543  32 0 326  .          ENL 10)
31544  37 1 325  .          STL SECBAK
31545  32 1 324  .          ENL RESSE@
31546  10 0 323  .          ADD 1)
31547  37 0 153             STL INT52A
31550  32 1 153             ENL INT52A,I
```

–Continued

```
                                               THE CONTENTS OF THE 3RD LOCATION OF THE SEQ.
                                               RES. TBL. ALREADY CONTAIN THE BITS FOR
                                               AN INT INSTRUCTION.
31551  11 0 322  .         SUB 3)
31552  37 0 153            STL INT52A
                                               READ 52GA CCI FOR THIS UNIT
31553  30 0 000  INT52A    INT XX
31554  12 0 321  .        8AND 400)
31555  20 0 156            ZJP RDCSPD
31556  24 1 320  .         JMP ENDCRL          IF BREAKER CLOSED DO NOT CHANGE SPEED

                                               DO FOLLOWING IF 52GA IS OPEN ( MODES 3 AND 4 )
       31557     RDCSPD    SYN L
                           XFR SPLMIT,SPDREF
31557  32 1 317  .         ENL SPLMIT
31560  37 1 376            STL SPDREF
                           JPT ENDCRL
31561  24 1 320            JMP ENDCRL
                           EJE
31562     00000  EXTCFL    OCT
          31563  ENDALG    SYN L
31563  24 1 164            JMP ANLOGS,I
31564     00000  ANLOGS    ...
                                               THIS SUBROUTINE READS ALL ANALOG INPUTS NEEDED
                                               BY THE CONTROL PROGRAM

                           ............READ AND AVERAGE THE THERMOCOUPLES
                           XFR TOSSIT,EXTOSS
31565  32 1 316  .         ENL TOSSIT
31566  37 0 230            STL EXTOSS
                           XFR TOSSIT,BLTOSS
31567  32 1 316            ENL TOSSIT
31570  37 0 215            STL BLTOSS
                           MAK EXTCFL,FALSE
                           DLE FALSE*1
31571  02 0 162            CMB EXTCFL
                           DLE 1-FALSE*1
                                                      BLADE PATHS
                                                      CHECK TO SEE IF WE ARE SYNCHRONIZING.
                                                      IF SO AVERAGE 4, OTHERWISE AVERAGE 8.
                           IFF SYNCNW,FALSE,NOSNC
                           DLE -SYNCNW/SYNCNW+1*1
31572  16 1 315  .         RSH SYNCNW
                           DLE FALSE*1
31573  27 0 177            PJP NOSNC
                           DLE 1-FALSE*2
31574  32 0 326            ENL 5*NTURB)
31575  37 0 177            STL DLYSNC
31576  24 0 207            JMP AVRG4
31577     00000  DLYSNC    OCT XX
          31600  NOSNC     SYN L
31600  01 0 177            DCR DLYSNC
31601  27 0 207            PJP AVRG4
                           XFR 0),DLYSNC
31602  32 0 364            ENL 0)
31603  37 0 177            STL DLYSNC
                                               AVERAGE ALL 8 BLADE T/C S.
31604  32 0 314  :         ENL LT1VAL)                     AL= FIRST VALUE ADDR
31605  11 1 313  :         SUB TNUMBR                      AVERAGE 8 VALUES
31606  05 0 370            EDR 8)
31607  24 0 212            JMP AVBPS
          31610  AVRG4     SYN L
31610  32 0 312  .         ENL LT5VAL)
31611  11 1 313            SUB TNUMBR
31612  05 0 311  .         EDR 4)
          31613  AVBPS     SYN L               AVERAGE THE BLADES
31613  36 1 310  .         RJP TCPROC
31614     05612            OCT BLDABS          BLADE ABS LIM.
31615     00000  BLTOSS    OCT XX              DIFFERENTIAL - FILL AT RUN
31616     30402            OCT 26BA            BLADE ABS ALM ADDR
31617     31562            OCT EXTCFL          FAILURE ALM ADDR
31620  37 1 307  .         STL ANBPAV
31621  16 1 306  :         RSH ACC
31622  37 1 305  :         STL HIBPAV
                                               NOW HAVE THE BLADES AVERAGED

                           ..........          DO EXHAUST AVERAGE
31623  32 0 304  .         ENL EXHVAL)
31624  11 1 313            SUB TNUMBR                AL= FIRST EXHAUST VALUE ADDR
31625  05 0 303  .         EDR 16)                   AVERAGE 16
31626  36 1 310            RJP TCPROC
```

–Continued

```
31627       04610           OCT EXHABS         EXH ABS LIM
31630       00000   EXTOSS  OCT XX             DIFFEREN. LIM - FILL AT RUN
31631       30403           OCT 26EA
31632       31562           OCT EXTCFL

31633  37 1 302   .         STL ANEXAV
31634  16 1 306             RSH ACC
31635  37 1 301   .         STL HIEXAV
                                           NOW HAVE AVERAGES.

                                           SEE IF ANY BAD

                            IFF EXTCFL,FALSE,CBRTMP
                            DLE -EXTCFL/EXTCFL+1*1
31636  16 0 162              RSH EXTCFL
                            DLE FALSE*1
31637  27 0 250              PJP CBRTMP
                            DLE 1-FALSE*2

                                           SET EXH T/C FAILURE ALM
31640  32 1 324             ENL RESSEQ
31641  10 0 300   .        8ADD 100)
31642  37 0 250             STL ALMWRD

31643  32 1 250             ENL ALMWRD,I
31644  12 0 277   :        8AND 36777)
31645  13 0 276   :        8EOR 1000)
31646  37 1 250             STL ALMWRD,I

31647  24 0 250             JMP CBRTMP
31650       00000   ALMWRD  OCT
                            EJE
            31651   CBRTMP  SYN L
                                           READ COMBUSTOR INLET TEMP.
31651  32 0 275   :         ENL TINLET)
31652  36 1 274   :         RJP RDALG
                                           NOW HAVE THE TEMPERATURE IN AL. IT IS AT A
                                           B12. THIS CAN BE CONSIDERED AS A PER-UNIT
                                           VALUE AT A B12.
31653  16 1 306             RSH ACC
31654  37 1 273   .         STL TEMP1C

                                           READ ACTUAL FUEL DEMAND

31655  32 0 272   .         ENL FUELDM)
31656  36 1 274             RJP RDALG

31657  37 1 271   .         STL CSOVAL     SAVE ADC VALUE FOR LIGHT SECTION
31660  16 1 306             RSH ACC
                                           ADD A DELTA VALUE TO THE FUEL DEMAND SO THAT
                                           THE TRACKING SIGNAL IS ALWAYS SLIGHTLY LARGER
                                           THAN CSO.
31661  10 1 270   .         ADD DELCSO
                                           NOW HAVE ACTUAL FUEL DEMAND IN-PERMNIT AT B11.
31662  37 1 267   .         STL CSOPLS

                                    ..............................................

                                           STR ACTUAL VALUE OF CSO + A DELTA VALUE IN THE
                                           LIMIT LACATION. THIS LIMITS THE INTEGRATOR
                                           OUTPUT VALUE TO CSO+DELTA.
31663  37 1 266   .         STL LIMIT

                                    ..............................................


31664  24 1 265   .         JMP SEESPD
31665       33717           WRD
31666       32564           WRD
31667       30671           WRD
31670       30472           WRD
31671       33731           WRD
31672       24755           WRD
31673       30672           WRD
31674       33755           WRD
31675       24425           WRD
31676       01000           WRD
31677       36777           WRD
31700       00100           WRD
31701       32010           WRD
31702       24765           WRD
31703       00020           WRD
31704       24637           WRD
31705       32007           WRD
31706       00101           WRD
31707       24767           WRD
31710       23400           WRD
31711       00004           WRD
31712       24745           WRD
31713       30643           WRD
31714       24735           WRD
31715       30650           WRD
31716       30446           WRD
31717       33050           WRD
31720       31036           WRD
31721       00400           WRD
31722       00003           WRD
31723       00001           WRD
31724       30644           WRD
31725       30411           WRD
31726       00012           WRD
31727       32013           WRD
```

–Continued

```
31730     00005        WRD
31731     37777        WRD
31732     30442        WRD
31733     32012        WRD
31734     32011        WRD
31735     30602        WRD
31736     30661        WRD
31737     30570        WRD
31740     30660        WRD
31741     36403        WRD
31742     30556        WRD
31743     36464        WRD
31744     30670        WRD
31745     30657        WRD
31746     30416        WRD
31747     30420        WRD
31750     30415        WRD
31751     32402        WRD
31752     30456        WRD
31753     30417        WRD
31754     32401        WRD
31755     32576        WRD
31756     00013        WRD
31757     32400        WRD
31760     00202        WRD
31761     30413        WRD
31762     32565        WRD
31763     30673        WRD
31764     00000        WRD
31765     32713        WRD
31766     30410        WRD
31767     30444        WRD
31770     00010        WRD
31771     30501        WRD
31772     30443        WRD
31773     30445        WRD
31774     30666        WRD
31775     30636        WRD
31776     30406        WRD
31777     31161        WRD
          33720        BORG 33720
          33720 SEESPD SYN L

                                        CHECK TO SEE IF THE SPEED LOOP IS CONTROLLING.
                                        IF SO, THE VALUE OF LOWEST SENT OUT LAST TIME
                                        WILL BE GREATER THAN THE ACTUAL CSO.
33720 32 0 330         ENL LASLOW
33721 11 0 332         SUB TOLERN
33722 11 0 331         SUB CSOVAL
33723 27 0 325         PJP ISSPED       NOT ON SPEED CONTROL WHEN HERE.
                       MAK ONSPD,FALSE
                       DLE FALSE*1
33724 02 1 375  .      CMB ONSPD
                       DLE 1-FALSE*1
33725 24 0 332         JMP CTNALG

          33726 ISSPED SYN L            COME HERE WHEN ON SPEED CONTROL
                       MAK ONSPD,TRUE
                       DLE TRUE*1
                       DLE 1-TRUE*1
33726 03 1 375         SMB ONSPD
33727 24 0 332         JMP CTNALG

33730     00000 LASLOW OCT              PREV. VALUE OF CSO LIMIT  (ADC)
33731     00000 CSOVAL OCT              CURRENT VALUE OF CSO (ADC)
33732     00025 TOLERN OCT 25           TOLERENCE ON CSO VS CSO LIMIT - IF CSO IS
                                        MORE THAN THIS MUCH LOWER THAN CSO LIMIT,IT
                                        INDICATES THAT THE SPEED LOOP IS CONTROLING
                                        READ THE ACTUAL SPEED
          33733 CTNALG SYN L            CONTINUATION OF ANALOG INPUT
33733 32 0 374  .      ENL ACSPED)
33734 36 0 355  .      RJP RDALG
33735 37 1 373  .      STL SPEED

                                        READ ACTUAL KW.
33736 32 0 372  .      ENL ACKW)
33737 36 0 355         RJP RDALG
33740 16 1 371  .      RSH ACC          MOVE TO B11
33741 37 1 370  .      STL ACTKW

                                        READ COMBUSTOR PRESSURE
33742 32 0 367  .      ENL CPRES)
33743 36 0 355         RJP RDALG        PICK UP A VALUE OF COMBUSTOR PRESSURE FORM THE
                                        VALUE TABLE.  10000 OCTAL= 1 PER-UNIT =1./B12
                                        =160PSI.  SHIFT THE VALUE TO A B11.
33744 16 1 371         RSH ACC
33745 37 1 366  .      STL PRES2C

                                        IF IN MODE 1 SUBTRACT THE P2C OFFSET VALUE.
                                        THIS CORRECTS FOR POSSIBLE VARIATIONS IN THE 0
                       IFF MODE1,FALSE,NOCORR
                       DLE -MODE1/MODE1+1*1
33746 16 1 365  .      RSH MODE1
                       DLE FALSE*1
33747 27 0 352         PJP NOCORR
                       DLE 1-FALSE*2
                                        DO THE CORRECTION
```

–Continued

```
3750  32 1 366        ENL PRES2C
3751  11 1 364   .    SUB POFSET
3752  37 1 366        STL PRES2C

      33753   NOCORR SYN L

3753  24 1 363   .    JMP ENDALG
3754     00000  ADCLOC OCT
                                        THIS IS A GENERAL SUBROUTINE TO READ ANALOG
                                        VALUES.  ENTER W/ AL=VALUE LOCATION FOR A 1
                                        UNIT SYSTEM.

3755     00000  RDALG  ...
3756  11 1 362   .    SUB TNUMBR
3757  37 0 354        STL ADCLOC
3760  32 1 354        ENL ADCLOC,I
3761  24 1 355        RTN
                                        GO BACK W/ THE VALUE IN AL.
                      EJE
3762     30643        WRD
3763     31562        WRD
3764     30441        WRD
3765     30652        WRD
3766     30670        WRD
3767     24761        WRD
3770     30673        WRD
3771     00101        WRD
3772     24731        WRD
3773     30667        WRD
3774     24725        WRD
3775     32226        WRD
         32000       BORG CMASTR+1400

                                        VARIABLES WHICH ARE USED LOCALLY BY BOTH THE
                                        BLADE AND EXH. CONTROL LOOPS.

         32000   BPTEMP SYN L
         32000   EXTEMP SYN L
2000     00000          OCT             RATE CORRECTED TEMPERATURE

         32001   BPERR  SYN L
         32001   EXERR  SYN L
2001     00000          OCT             ERROR  = TEMPERATURE REF. - RATE CORRECTED TEMP.

         32002   BPIIN  SYN L
         32002   EXIIN  SYN L
2002     00000          OCT             INTEGRATOR INPUT

         32003   BPPROP SYN L
         32003   EXPROP SYN L
2003     00000          OCT             PROPORTIONAL BLOCK OUTPUT


2004     00046   30DEG  OCT 46  (ADC/2) EQUIVALENT OF 30 DEG. IN THE 800-900 DEG RANGE
2005     00040   25DEG  OCT 40  (ADC/2) EQUIVALENT OF 25 DEG. IN THE 800-900 DEG RANGE
2006     37747   MNS20  OCT -30 (ADC/2) EQUIVALENT OF-20 DEG. IN THE 800-900 DEG RANGE

                                        THIS IS THE PROPORTIONAL + RESET +RATE
                                        CONTROLLER FOR BLADE PATH AND EXHAUST
                                        TEMPERATURES.  IT USES A REFERENCE GENERATED BY
                                        THE FUNCTIONS IN MODE 1 AND 3.
2007     00000   HIBPAV OCT             HIGH AVERAGE BLADE PATH TEMP.
2010     00000   HIEXAV OCT             HIGH AVE EXHAUST TEMP

2011     00000   BPREF  OCT             REFERENCE TEMP FOR THE BLADE PATH CONTROL
2012     00000   EXREF  OCT             REFERENCE FOR THE EXHAUST TEMP CONTROL
                                        FOLLOWING SECTION IS THE BLADE PATH TEMPERATURE
                                        CONTROL FUNCTION.

2013     00000   BPANEX ...
                        XFR BPREF,LASREF
2014  32 0 011          ENL BPREF
2015  37 1 367   .      STL LASREF

                                        ONLY ADD THE BLADE PATH OFFSET IN MODES 3 AND 4
                                        TO MAKE THE REF CURVES FOR BLADE PATH APPEAR
                                        HIGHER AND THUS LEAVE EXHAUST TEMPERATURE
                                        IN CONTROL.
                        IFF MODE4,TRUE,ADDELT
                        DLE -MODE4/MODE4+1*1
2016  16 1 366   .      RSH MODE4
                        DLE TRUE*1
                        DLE 1-TRUE*2
2017  27 0 020          PJP L+2
                        JPT ADDELT
2020  24 0 024          JMP ADDELT
                        IFF MODE3,TRUE,ADDELT
                        DLE -MODE3/MODE3+1*1
2021  16 1 365   .      RSH MODE3
                        DLE TRUE*1
                        DLE 1-TRUE*2
2022  27 0 023          PJP L+2
```

I claim:

1. A gas turbine electric power plant comprising:

a. a gas turbine including compressor, combustion and turbine elements;

b. a generator drivably coupled to said turbine for generating electric power;

c. means for supplying fuel to said gas turbine combustion element;

d. means for selectively coupling said generator to an external power system;

e. means for controlling the operation of said plant including a computer and means for operating said computer to effect control action by said control means in a predetermined manner, said control means also including means for actuating said coupling means when a particular selected parameter of said actuating means reaches a predetermined value to effect coupling of said generator to the external power system;

f. means, responsively coupled to said control means, for operating said fuel supply means to cause fuel to be supplied to said combustion element in controlled quantities, and g. detection means responsively connected to said actuating means, said coupling means and said control means for monitoring the actual value of said selected parameter at the time said coupling means is actuated and for generating one or more dynamic calibration signals representative of the difference between the predetermined and actual values of said selected parameter for use by said control means.

2. An electric power plant as set forth in claim 1 which further includes means for generating a first time-based signal representative of the output of said generator and means for generating a second time-based signal representative of the external power system voltage, and wherein said detection means includes means for detecting phase angle differences between said first and second signals.

3. An electric power plant as set forth in claim 2 wherein a plurality of calibration values is provided by said detection means and said computer operating means further includes means for selecting, subject to a predetermined criterion, an optimal calibration value from among said plurality of calibration values.

4. An electric power plant as set forth in claim 3 wherein said criterion is related to time of selection.

5. An electric power plant as set forth in claim 3 wherein said computer operating means further includes means for determining a set of calibration values from among said plurality of calibration values upon which to impose said selection criterion.

6. An electric power plant as set forth in claim 3 wherein said criterion for selection is related to the occurrence of a predetermined event.

7. An electric power plant as set forth in claim 6 wherein said criterion for selection is the occurrence of a scheduled event.

8. An electric power plant as set forth in claim 3 wherein said criterion for selection is directly related to the magnitude of said plurality of calibration values.

9. An electric power plant as set forth in claim 5 wherein said criterion for selection is directly related to the magnitude of said plurality of calibration values.

* * * * *